United States Patent
Tel et al.

(10) Patent No.: US 11,347,150 B2
(45) Date of Patent: *May 31, 2022

(54) COMPUTATIONAL METROLOGY

(71) Applicant: ASML NETHERLANDS B.V., Veldhoven (NL)

(72) Inventors: Wim Tjibbo Tel, Helmond (NL); Bart Peter Bert Segers, Tessenderlo (BE); Everhardus Cornelis Mos, Best (NL); Emil Peter Schmitt-Weaver, Eindhoven (NL); Yichen Zhang, Eindhoven (NL); Petrus Gerardus Van Rhee, Nijmegen (NL); Xing Lan Liu, Ukkel (BE); Maria Kilitziraki, Veldhoven (NL); Reiner Maria Jungblut, Eindhoven (NL); Hyunwoo Yu, Hwaseong-si (KR)

(73) Assignee: ASML Netherlands B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/197,167

(22) Filed: Mar. 10, 2021

(65) Prior Publication Data

US 2021/0191278 A1  Jun. 24, 2021

Related U.S. Application Data

(63) Continuation of application No. 16/481,143, filed as application No. PCT/EP2018/053412 on Feb. 12, 2018, now Pat. No. 10,990,018.

(Continued)

(51) Int. Cl.
| | | |
|---|---|---|
| G03F 7/00 | (2006.01) | |
| G06N 3/02 | (2006.01) | |
| G03F 7/20 | (2006.01) | |

(52) U.S. Cl.
CPC .......... G03F 7/70441 (2013.01); G03F 7/705 (2013.01); G03F 7/70508 (2013.01);
(Continued)

(58) Field of Classification Search
CPC ............. G06F 2219/18; G06F 2219/22; G03F 7/70441; G03F 7/705; G03F 7/70508;
(Continued)

(56) References Cited

U.S. PATENT DOCUMENTS

| | | | |
|---|---|---|---|
| 5,007,284 A | 4/1991 | Slone | |
| 6,937,914 B1 * | 8/2005 | Bode ................ | G05B 19/41865 700/121 |

(Continued)

FOREIGN PATENT DOCUMENTS

| | | |
|---|---|---|
| CN | 103034067 | 4/2013 |
| CN | 102103330 | 3/2014 |

(Continued)

OTHER PUBLICATIONS

Taiwanese Office Action issued in corresponding Taiwanese Patent Application No. 109123142, dated Mar. 8, 2021.

(Continued)

*Primary Examiner* — Phallaka Kik
(74) *Attorney, Agent, or Firm* — Pillsbury Winthrop Shaw Pittman LLP

(57) ABSTRACT

A method, involving determining a first distribution of a first parameter associated with an error or residual in performing a device manufacturing process; determining a second distribution of a second parameter associated with an error or residual in performing the device manufacturing process; and determining a distribution of a parameter of interest associated with the device manufacturing process using a function operating on the first and second distributions. The function may include a correlation.

22 Claims, 23 Drawing Sheets

Related U.S. Application Data

(60) Provisional application No. 62/462,201, filed on Feb. 22, 2017, provisional application No. 62/545,578, filed on Aug. 15, 2017.

(52) U.S. Cl.
CPC ...... *G03F 7/70625* (2013.01); *G03F 7/70633* (2013.01); *G03F 7/70641* (2013.01); *G03F 7/70683* (2013.01); *G06N 3/02* (2013.01)

(58) Field of Classification Search
CPC ............. G03F 7/70625; G03F 7/70633; G03F 7/70641; G03F 7/70683; G06N 3/02
USPC ............. 716/53, 51, 56; 703/14; 700/95, 98, 700/120, 121; 702/83, 84
See application file for complete search history.

(56) References Cited

U.S. PATENT DOCUMENTS

| | | | |
|---|---|---|---|
| 6,961,116 B2 | 11/2005 | Den Boef et al. | |
| 7,265,364 B2 | 9/2007 | Teunissen et al. | |
| 7,508,976 B1 | 3/2009 | Yang et al. | |
| 8,572,518 B2 | 10/2013 | Tyminski et al. | |
| 8,756,028 B2* | 6/2014 | Chu | H01L 22/12 702/81 |
| 8,856,694 B2 | 10/2014 | Ye et al. | |
| 10,394,973 B2* | 8/2019 | Jin | G06F 17/18 |
| 10,990,018 B2* | 4/2021 | Tel | G03F 7/70491 |
| 2002/0158607 A1 | 10/2002 | Yang | |
| 2002/0165636 A1* | 11/2002 | Hasan | G05B 23/0216 700/121 |
| 2005/0219515 A1 | 10/2005 | Morohoshi | |
| 2006/0066855 A1 | 3/2006 | Den Boef et al. | |
| 2007/0021860 A1 | 1/2007 | Simons et al. | |
| 2008/0275586 A1 | 11/2008 | Ko et al. | |
| 2008/0275676 A1 | 11/2008 | Lin et al. | |
| 2009/0276075 A1* | 11/2009 | Good | G07C 3/146 700/110 |
| 2010/0233600 A1 | 9/2010 | Den Boef et al. | |
| 2010/0243431 A1* | 9/2010 | Kuboi | H01J 37/3023 204/192.33 |
| 2011/0027704 A1 | 2/2011 | Cramer et al. | |
| 2011/0043791 A1 | 2/2011 | Smilde et al. | |
| 2011/0080567 A1 | 4/2011 | Hoekerd et al. | |
| 2011/0153265 A1 | 6/2011 | Staals et al. | |
| 2011/0205510 A1 | 8/2011 | Menchtchikov et al. | |
| 2012/0065920 A1* | 3/2012 | Nagumo | G01R 31/2621 702/117 |
| 2012/0191236 A1* | 7/2012 | Ausschnitt | G03F 7/705 700/105 |
| 2012/0198396 A1* | 8/2012 | Kajiwara | H01L 22/20 716/54 |
| 2012/0242970 A1 | 9/2012 | Smilde et al. | |
| 2012/0262109 A1 | 10/2012 | Toya et al. | |
| 2013/0185042 A1* | 7/2013 | Taoka | G03F 7/70441 703/6 |
| 2013/0230797 A1 | 9/2013 | Van Der Sanden et al. | |
| 2013/0295698 A1* | 11/2013 | Pforr | G03F 1/38 438/14 |
| 2013/0331975 A1* | 12/2013 | Saulsbury | G05B 19/41865 700/117 |
| 2015/0120216 A1* | 4/2015 | Vukkadala | G03F 7/705 702/35 |
| 2015/0147918 A1 | 5/2015 | Matsuda et al. | |
| 2015/0235108 A1 | 8/2015 | Pandev | |
| 2016/0006156 A1 | 1/2016 | Shimizu | |
| 2016/0072213 A1 | 3/2016 | Ichio et al. | |
| 2016/0148850 A1 | 5/2016 | David | |
| 2016/0246185 A1 | 8/2016 | Ypma et al. | |
| 2016/0349627 A1* | 12/2016 | Van Der Schaar | G03F 9/7076 |
| 2016/0357115 A1 | 12/2016 | Kok | |
| 2016/0364513 A1* | 12/2016 | Foreman | G06F 30/367 |
| 2016/0370710 A1 | 12/2016 | Wardenier et al. | |
| 2016/0370711 A1 | 12/2016 | Schmitt-Weaver et al. | |
| 2017/0045823 A1 | 2/2017 | Quintanilha | |
| 2017/0235230 A1 | 8/2017 | Ebert et al. | |
| 2019/0018326 A1* | 1/2019 | Van Der Schaar | G01N 21/47 |

FOREIGN PATENT DOCUMENTS

| | | |
|---|---|---|
| CN | 102033435 | 6/2014 |
| CN | 106062634 | 10/2016 |
| EP | 1744217 | 1/2007 |
| JP | 2005302777 | 10/2005 |
| JP | 2006053550 | 2/2006 |
| JP | 2007242809 | 9/2007 |
| JP | 3999775 | 10/2007 |
| JP | 2008091721 | 4/2008 |
| JP | 2012089896 | 5/2012 |
| JP | 2015158594 | 9/2015 |
| TW | 200710596 | 3/2007 |
| TW | 200846389 | 12/2008 |
| TW | 201516598 | 5/2015 |
| TW | I547685 | 1/2016 |
| TW | 201835676 | 10/2018 |
| WO | 2009078708 | 6/2009 |
| WO | 2009106279 | 9/2009 |
| WO | 2015124391 | 8/2015 |
| WO | 2016087069 | 6/2016 |
| WO | 2016177568 | 11/2016 |
| WO | 2017144379 | 8/2017 |

OTHER PUBLICATIONS

International Search Report and Written Opinion issued in corresponding PCT Patent Application No. PCT/EP2018/053412, dated Jul. 9, 2018.
Lee, Hong-Goo, et al.: "Virtual overlay metrology for fault detection supported with integrated metrology and machine learning", Proc. of SPIE, vol. 9424, Mar. 19, 2015.
Tel. W.T., et al.: "Efficient hybrid metrology for focus, CD, and overlay", Proc. of SPIE, vol. 10145, Mar. 28, 2017.
Schmitt-Weaver, Emil, et al.: "Computational overlay metrology with adaptive data analytics", Proc. of SPIE, vol. 10145, Mar. 28, 2017.
Schmitt-Weaver, E., et al.: "Overlay improvements using a real time machine learning algorithm", Proc. of SPIE, vol. 9050, Apr. 2014.
Taiwanese Office Action issued in corresponding Taiwanese Patent Application No. 107105689, dated Dec. 27, 2019.
Japanese Office Action issued in corresponding Japanese Patent Application No. 2019-565618, dated Oct. 13, 2020.
Korean Office Action issued in corresponding Korean Patent Application No. 10-2019-7027439, dated Dec. 23, 2020.
Chinese Office Action issued in corresponding Chinese Patent Application No. 201880013446.4, dated Dec. 12, 2020.

* cited by examiner

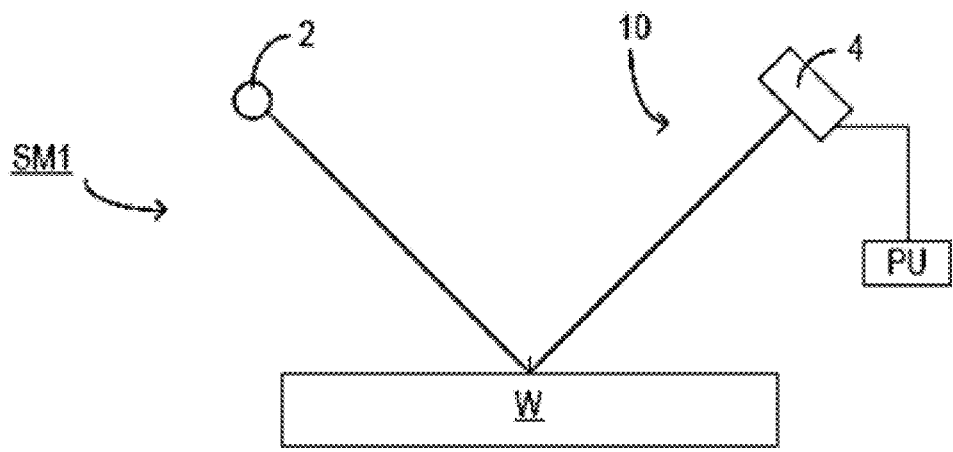
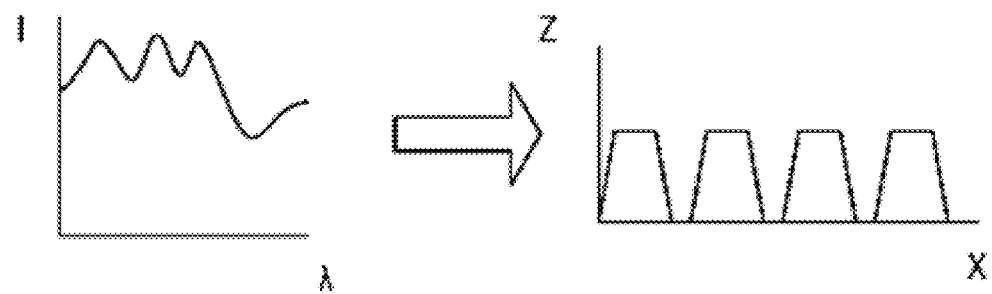
Fig. 3

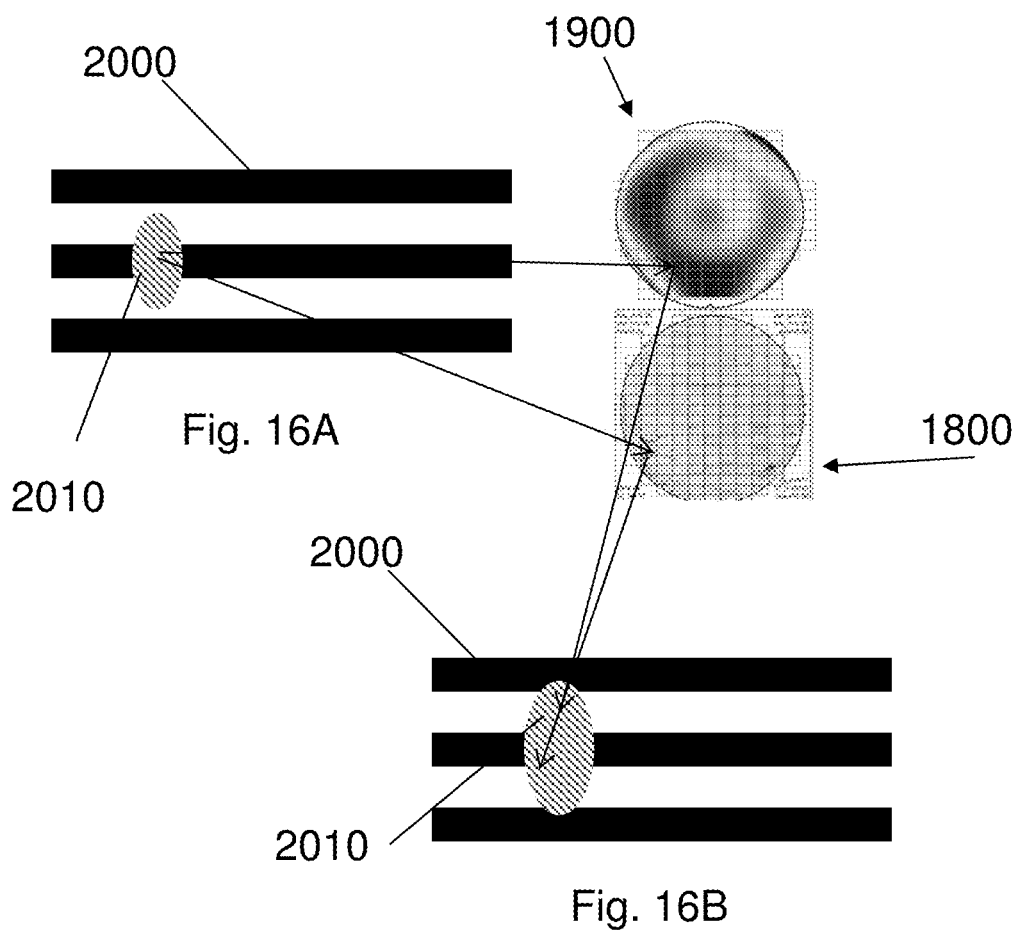
Fig. 16A
Fig. 16B
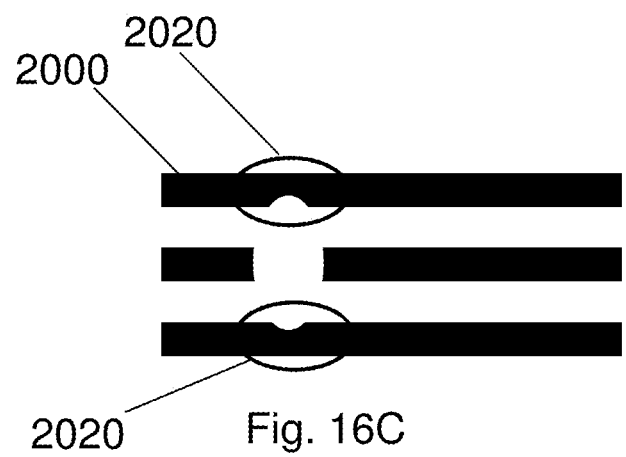
Fig. 16C

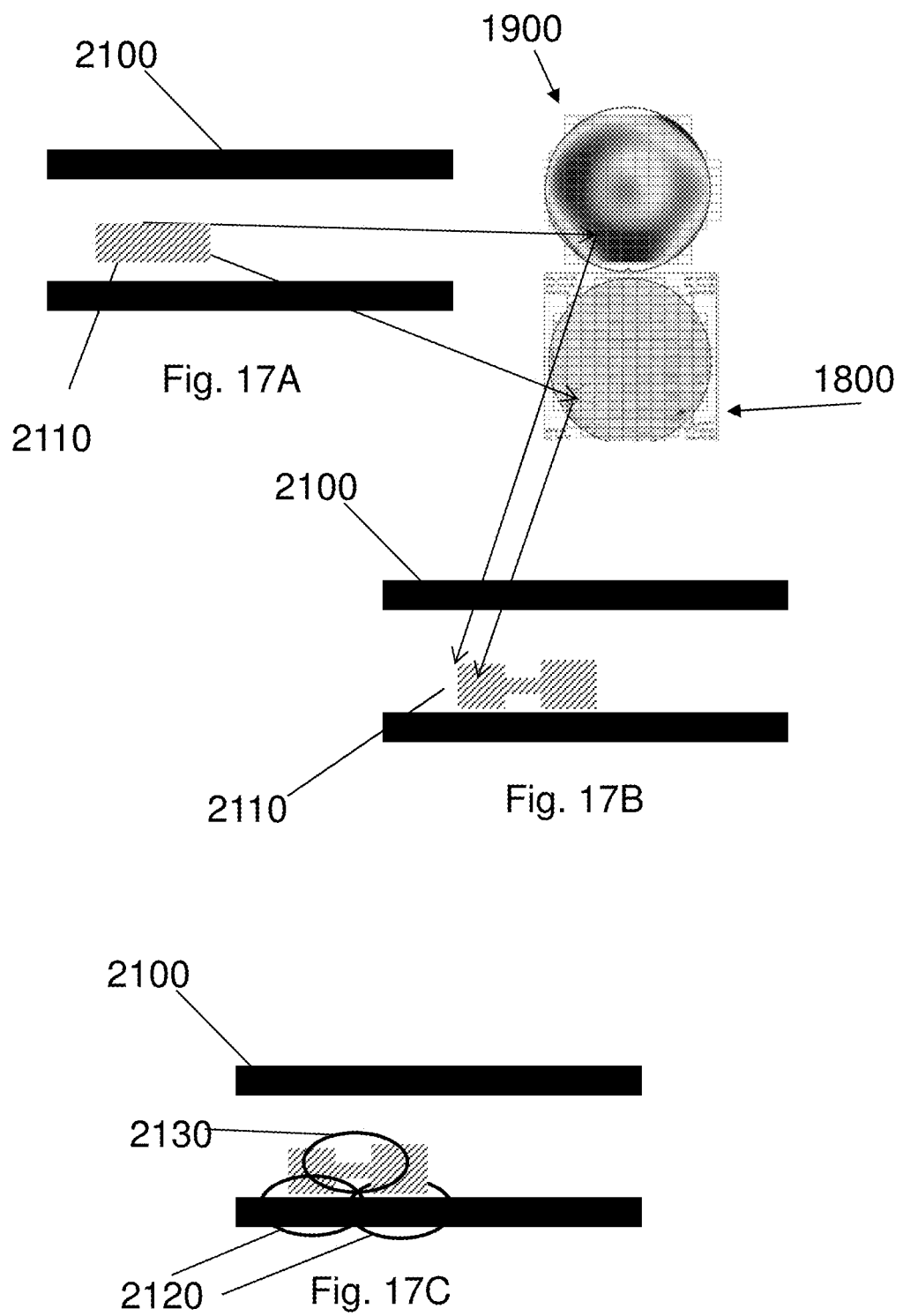

COMPUTATIONAL METROLOGY

This application is a continuation of co-pending U.S. patent application Ser. No. 16/481,143, filed Jul. 26, 2019, which is the U.S. national phase entry of PCT Patent Application No. PCT/EP2018/053412, which was filed on Feb. 12, 2018, which claims the benefit of priority of U.S. Provisional Patent Application No. 62/462,201, which was filed on Feb. 22, 2017, and of U.S. Provisional Patent Application No. 62/545,578, which was filed on Aug. 15, 2017, each of the foregoing applications is incorporated herein in its entirety by reference.

FIELD

The present disclosure relates to techniques of improving the performance of a device manufacturing process. The techniques may be used in connection with a lithographic apparatus or a metrology apparatus.

BACKGROUND

A lithography apparatus is a machine that applies a desired pattern onto a target portion of a substrate. Lithography apparatus can be used, for example, in the manufacture of integrated circuits (ICs). In that circumstance, a patterning device, which is alternatively referred to as a mask or a reticle, may be used to generate a circuit pattern corresponding to an individual layer of the IC, and this pattern can be imaged onto a target portion (e.g. comprising part of, one or several dies) on a substrate (e.g. a silicon wafer) that has a layer of radiation-sensitive material (resist). In general, a single substrate will contain a network of adjacent target portions that are successively exposed. Known lithography apparatus include so-called steppers, in which each target portion is irradiated by exposing an entire pattern onto the target portion in one go, and so-called scanners, in which each target portion is irradiated by scanning the pattern through the beam in a given direction (the "scanning"-direction) while synchronously scanning the substrate parallel or anti parallel to this direction.

Prior to transferring the circuit pattern from the patterning device to the substrate, the substrate may undergo various procedures, such as priming, resist coating and a soft bake. After exposure, the substrate may be subjected to other procedures, such as a post-exposure bake (PEB), development, a hard bake and measurement/inspection of the transferred circuit pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

SUMMARY

In an embodiment, there is disclose a method comprising: determining a first distribution of a first parameter associated with an error or residual in performing a device manufacturing process; determining a second distribution of a second parameter associated with an error or residual in performing the device manufacturing process; and determining, by a hardware computer, a distribution of a parameter of interest associated with the device manufacturing process using a function operating on the first and second distributions.

In an embodiment, there is provided a method comprising: obtaining an underlying contribution of a lithographic apparatus to overlay as part of a patterning process; and combining, by a hardware computer, the underlying contribution with a further contribution to overlay of a substrate to obtain an estimate of overlay for the substrate.

In an embodiment, there is provided a method, comprising: determining a first distribution of measured alignment data in performing a device manufacturing process; determining a second distribution of alignment data derived from a processing parameter in the device manufacturing process; and determining, by a hardware computer system, a distribution of alignment data associated with the device manufacturing process as a function of the first and second distributions.

In an embodiment, there is provided a method comprising: obtaining an alignment data distribution across at least part of a substrate processed using a patterning process, based on measured alignment data; and combining, by a hardware computer, the alignment data distribution with an alignment fingerprint attributable to a processing parameter other than measured alignment to obtain an estimate of alignment data for the substrate.

In an embodiment, there is provided a computer program product comprising a non-transitory computer readable medium having instructions recorded thereon, the instructions when executed by a computer implementing any of the methods herein.

BRIEF DESCRIPTION OF THE DRAWINGS

FIG. 3 schematically depicts an example inspection apparatus and metrology technique.

FIGS. 16A, 16B and 16C schematically depict an embodiment of a defect analysis process.

FIGS. 17A, 17B and 17C schematically depict an embodiment of a defect analysis process.

DETAILED DESCRIPTION

Before describing embodiments in detail, it is instructive to present an example environment in which embodiments may be implemented.

Figure 1:
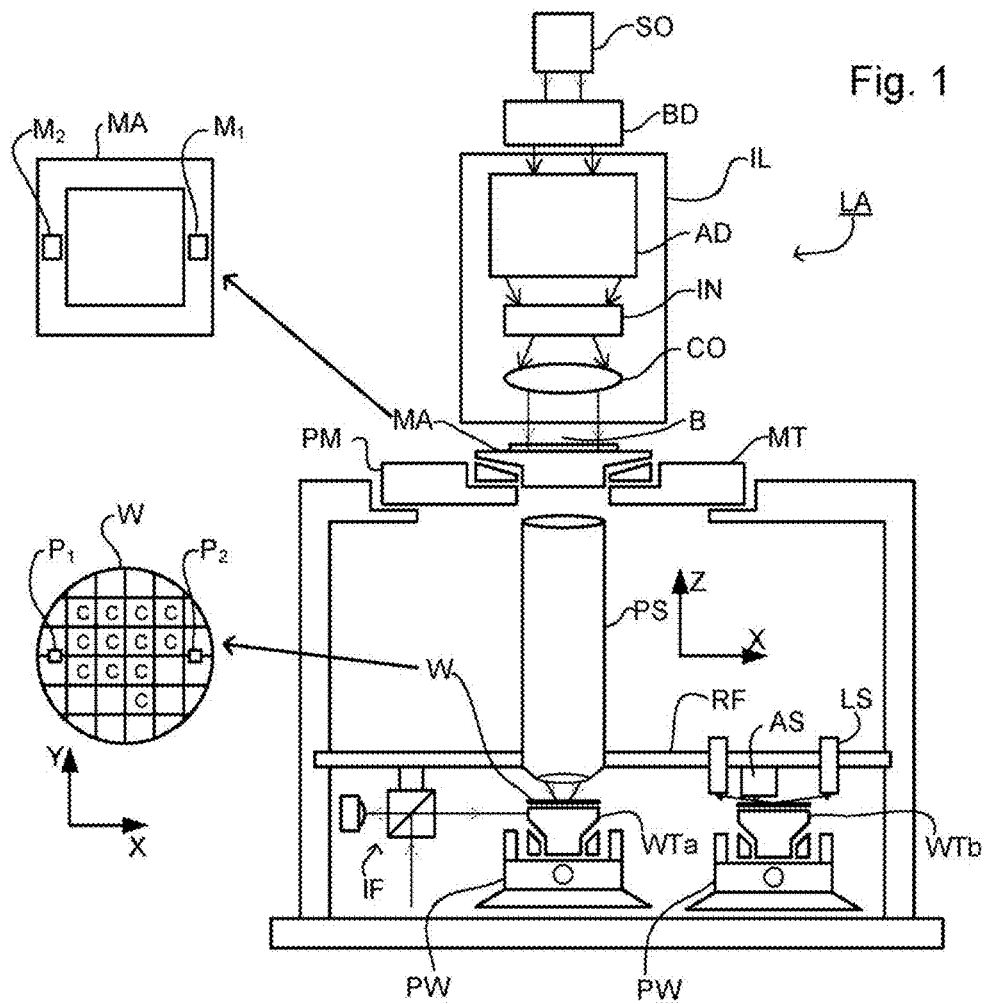
FIG. 1 schematically depicts a lithography apparatus according to an embodiment.

FIG. 1 schematically depicts an embodiment of a lithographic apparatus LA. The apparatus comprises:

an illumination system (illuminator) IL configured to condition a radiation beam B (e.g. UV radiation or DUV radiation);

a support structure (e.g. a mask table) MT constructed to support a patterning device (e.g. a mask) MA and connected to a first positioner PM configured to accurately position the patterning device in accordance with certain parameters;

a substrate table (e.g. a wafer table) WT (e.g., WTa, WTb or both) constructed to hold a substrate (e.g. a resist-coated wafer) W and connected to a second positioner PW configured to accurately position the substrate in accordance with certain parameters; and a projection system (e.g. a refractive projection lens system) PS configured to project a pattern imparted to the radiation beam B by patterning device MA onto a target portion C (e.g. comprising one or more dies and often referred to as fields) of the substrate W, the projection system supported on a reference frame (RF).

As here depicted, the apparatus is of a transmissive type (e.g. employing a transmissive mask). Alternatively, the apparatus may be of a reflective type (e.g. employing a programmable mirror array of a type as referred to above, or employing a reflective mask).

The illuminator IL receives a beam of radiation from a radiation source SO. The source and the lithographic apparatus may be separate entities, for example when the source is an excimer laser. In such cases, the source is not considered to form part of the lithographic apparatus and the radiation beam is passed from the source SO to the illuminator IL with the aid of a beam delivery system BD comprising for example suitable directing mirrors and/or a beam expander. In other cases the source may be an integral part of the apparatus, for example when the source is a mercury lamp. The source SO and the illuminator IL, together with the beam delivery system BD if required, may be referred to as a radiation system.

The illuminator IL may alter the intensity distribution of the beam. The illuminator may be arranged to limit the radial extent of the radiation beam such that the intensity distribution is non-zero within an annular region in a pupil plane of the illuminator IL. Additionally or alternatively, the illuminator IL may be operable to limit the distribution of the beam in the pupil plane such that the intensity distribution is non-zero in a plurality of equally spaced sectors in the pupil plane. The intensity distribution of the radiation beam in a pupil plane of the illuminator IL may be referred to as an illumination mode.

So, the illuminator IL may comprise adjuster AM configured to adjust the (angular/spatial) intensity distribution of the beam. Generally, at least the outer and/or inner radial extent (commonly referred to as σ-outer and σ-inner, respectively) of the intensity distribution in a pupil plane of the illuminator can be adjusted. The illuminator IL may be operable to vary the angular distribution of the beam. For example, the illuminator may be operable to alter the number, and angular extent, of sectors in the pupil plane wherein the intensity distribution is non-zero. By adjusting the intensity distribution of the beam in the pupil plane of the illuminator, different illumination modes may be achieved. For example, by limiting the radial and angular extent of the intensity distribution in the pupil plane of the illuminator IL, the intensity distribution may have a multi-pole distribution such as, for example, a dipole, quadrupole or hexapole distribution. A desired illumination mode may be obtained, e.g., by inserting an optic which provides that illumination mode into the illuminator IL or using a spatial light modulator.

The illuminator IL may be operable alter the polarization of the beam and may be operable to adjust the polarization using adjuster AM. The polarization state of the radiation beam across a pupil plane of the illuminator IL may be referred to as a polarization mode. The use of different polarization modes may allow greater contrast to be achieved in the image formed on the substrate W. The radiation beam may be unpolarized. Alternatively, the illuminator may be arranged to linearly polarize the radiation beam. The polarization direction of the radiation beam may vary across a pupil plane of the illuminator IL. The polarization direction of radiation may be different in different regions in the pupil plane of the illuminator IL. The polarization state of the radiation may be chosen in dependence on the illumination mode. For multi-pole illumination modes, the polarization of each pole of the radiation beam may be generally perpendicular to the position vector of that pole in the pupil plane of the illuminator IL. For example, for a dipole illumination mode, the radiation may be linearly polarized in a direction that is substantially perpendicular to a line that bisects the two opposing sectors of the dipole. The radiation beam may be polarized in one of two different orthogonal directions, which may be referred to as X-polarized and Y-polarized states. For a quadrupole illumination mode the radiation in the sector of each pole may be linearly polarized in a direction that is substantially perpendicular to a line that bisects that sector. This polarization mode may be referred to as XY polarization. Similarly, for a hexapole illumination mode the radiation in the sector of each pole may be linearly polarized in a direction that is substantially perpendicular to a line that bisects that sector. This polarization mode may be referred to as TE polarization.

In addition, the illuminator IL generally comprises various other components, such as an integrator IN and a condenser CO. The illumination system may include various types of optical components, such as refractive, reflective, magnetic, electromagnetic, electrostatic or other types of optical components, or any combination thereof, for directing, shaping, or controlling radiation.

Thus, the illuminator provides a conditioned beam of radiation B, having a desired uniformity and intensity distribution in its cross section.

The support structure MT supports the patterning device in a manner that depends on the orientation of the patterning device, the design of the lithographic apparatus, and other conditions, such as for example whether or not the patterning device is held in a vacuum environment. The support structure can use mechanical, vacuum, electrostatic or other clamping techniques to hold the patterning device. The support structure may be a frame or a table, for example, which may be fixed or movable as required. The support structure may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a pattern in a target portion of the substrate. In an embodiment, a patterning device is any device that can be used to impart a radiation beam with a pattern in its cross-section so as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

A patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam, which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

The projection system PS has an optical transfer function which may be non-uniform, which can affect the pattern imaged on the substrate W. For unpolarized radiation such effects can be fairly well described by two scalar maps, which describe the transmission (apodization) and relative phase (aberration) of radiation exiting the projection system PS as a function of position in a pupil plane thereof. These scalar maps, which may be referred to as the transmission map and the relative phase map, may be expressed as a linear combination of a complete set of basis functions. A particularly convenient set is the Zernike polynomials, which form a set of orthogonal polynomials defined on a unit circle. A determination of each scalar map may involve determining the coefficients in such an expansion. Since the Zernike polynomials are orthogonal on the unit circle, the Zernike coefficients may be determined by calculating the inner product of a measured scalar map with each Zernike polynomial in turn and dividing this by the square of the norm of that Zernike polynomial.

The transmission map and the relative phase map are field and system dependent. That is, in general, each projection system PS will have a different Zernike expansion for each field point (i.e. for each spatial location in its image plane). The relative phase of the projection system PS in its pupil plane may be determined by projecting radiation, for example from a point-like source in an object plane of the projection system PS (i.e. the plane of the patterning device MA), through the projection system PS and using a shearing interferometer to measure a wavefront (i.e. a locus of points with the same phase). A shearing interferometer is a common path interferometer and therefore, advantageously, no secondary reference beam is required to measure the wavefront. The shearing interferometer may comprise a diffraction grating, for example a two dimensional grid, in an image plane of the projection system (i.e. the substrate table WT) and a detector arranged to detect an interference pattern in a plane that is conjugate to a pupil plane of the projection system PS. The interference pattern is related to the derivative of the phase of the radiation with respect to a coordinate in the pupil plane in the shearing direction. The detector may comprise an array of sensing elements such as, for example, charge coupled devices (CODs).

The projection system PS of a lithography apparatus may not produce visible fringes and therefore the accuracy of the determination of the wavefront can be enhanced using phase stepping techniques such as, for example, moving the diffraction grating. Stepping may be performed in the plane of the diffraction grating and in a direction perpendicular to the scanning direction of the measurement. The stepping range may be one grating period, and at least three (uniformly distributed) phase steps may be used. Thus, for example, three scanning measurements may be performed in the y-direction, each scanning measurement being performed for a different position in the x-direction. This stepping of the diffraction grating effectively transforms phase variations into intensity variations, allowing phase information to be determined. The grating may be stepped in a direction perpendicular to the diffraction grating (z direction) to calibrate the detector.

The diffraction grating may be sequentially scanned in two perpendicular directions, which may coincide with axes of a co-ordinate system of the projection system PS (x and y) or may be at an angle such as 45 degrees to these axes. Scanning may be performed over an integer number of grating periods, for example one grating period. The scanning averages out phase variation in one direction, allowing phase variation in the other direction to be reconstructed. This allows the wavefront to be determined as a function of both directions.

The transmission (apodization) of the projection system PS in its pupil plane may be determined by projecting radiation, for example from a point-like source in an object plane of the projection system PS (i.e. the plane of the patterning device MA), through the projection system PS and measuring the intensity of radiation in a plane that is conjugate to a pupil plane of the projection system PS, using a detector. The same detector as is used to measure the wavefront to determine aberrations may be used.

The projection system PS may comprise a plurality of optical (e.g., lens) elements and may further comprise an adjustment mechanism AM configured to adjust one or more of the optical elements so as to correct for aberrations (phase variations across the pupil plane throughout the field). To achieve this, the adjustment mechanism may be operable to manipulate one or more optical (e.g., lens) elements within the projection system PS in one or more different ways. The projection system may have a co-ordinate system wherein its optical axis extends in the z direction. The adjustment mechanism may be operable to do any combination of the following: displace one or more optical elements; tilt one or more optical elements; and/or deform one or more optical elements. Displacement of an optical element may be in any direction (x, y, z or a combination thereof). Tilting of an optical element is typically out of a plane perpendicular to the optical axis, by rotating about an axis in the x and/or y directions although a rotation about the z axis may be used for a non-rotationally symmetric aspherical optical element. Deformation of an optical element may include a low frequency shape (e.g. astigmatic) and/or a high frequency shape (e.g. free form aspheres). Deformation of an optical element may be performed for example by using one or more actuators to exert force on one or more sides of the optical element and/or by using one or more heating elements to heat one or more selected regions of the optical element. In general, it may not be possible to adjust the projection system PS to correct for apodization (transmission variation across the pupil plane). The transmission map of a projection system PS may be used when designing a patterning device (e.g., mask) MA for the lithography apparatus LA. Using a computational lithography technique, the patterning device MA may be designed to at least partially correct for apodization.

The lithographic apparatus may be of a type having two (dual stage) or more tables (e.g., two or more substrate tables WTa, WTb, two or more patterning device tables, a substrate table WTa and a table WTb below the projection system without a substrate that is dedicated to, for example, facilitating measurement, and/or cleaning, etc.). In such "multiple stage" machines the additional tables may be used in parallel, or preparatory steps may be carried out on one or more tables while one or more other tables are being used for exposure. For example, alignment measurements using an alignment sensor AS and/or level (height, tilt, etc.) measurements using a level sensor LS may be made.

The lithographic apparatus may also be of a type wherein at least a portion of the substrate may be covered by a liquid having a relatively high refractive index, e.g. water, so as to fill a space between the projection system and the substrate. An immersion liquid may also be applied to other spaces in the lithographic apparatus, for example, between the patterning device and the projection system. Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

So, in operation of the lithographic apparatus, a radiation beam is conditioned and provided by the illumination system IL. The radiation beam B is incident on the patterning device (e.g., mask) MA, which is held on the support structure (e.g., mask table) MT, and is patterned by the patterning device. Having traversed the patterning device MA, the radiation beam B passes through the projection system PS, which focuses the beam onto a target portion C of the substrate W. With the aid of the second positioner PW and position sensor IF (e.g. an interferometric device, linear encoder, 2-D encoder or capacitive sensor), the substrate table WT can be moved accurately, e.g. so as to position different target portions C in the path of the radiation beam B. Similarly, the first positioner PM and another position sensor (which is not explicitly depicted in FIG. 1) can be used to accurately position the patterning device MA with respect to the path of the radiation beam B, e.g. after mechanical retrieval from a mask library, or during a scan. In general, movement of the support structure MT may be realized with the aid of a long-stroke module (coarse positioning) and a short-stroke module (fine positioning), which form part of the first positioner PM. Similarly, movement of the substrate table WT may be realized using a long-stroke module and a short-stroke module, which form part of the second positioner PW. In the case of a stepper (as opposed to a scanner) the support structure MT may be connected to a short-stroke actuator only, or may be fixed. Patterning device MA and substrate W may be aligned using patterning device alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the patterning device MA, the patterning device alignment marks may be located between the dies.

The depicted apparatus could be used in at least one of the following modes:

1. In step mode, the support structure MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed. In step mode, the maximum size of the exposure field limits the size of the target portion C imaged in a single static exposure.

2. In scan mode, the support structure MT and the substrate table WT are scanned synchronously while a pattern imparted to the radiation beam is projected onto a target portion C (i.e. a single dynamic exposure). The velocity and direction of the substrate table WT relative to the support structure MT may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In another mode, the support structure MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

Although specific reference may be made in this text to the use of lithography apparatus in the manufacture of ICs, it should be understood that the lithography apparatus described herein may have other applications, such as the manufacture of integrated optical systems, guidance and detection patterns for magnetic domain memories, liquid-crystal displays (LCDs), thin film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist) or a metrology or inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

The terms "radiation" and "beam" used herein encompass all types of electromagnetic radiation, including ultraviolet (UV) radiation (e.g. having a wavelength of 365, 248, 193, 157 or 126 nm) and extreme ultra-violet (EUV) radiation (e.g. having a wavelength in the range of 5-20 nm), as well as particle beams, such as ion beams or electron beams.

Various patterns on or provided by a patterning device may have different process windows. i.e., a space of processing variables under which a pattern will be produced within specification. Examples of pattern specifications that relate to potential systematic defects include checks for necking, line pull back, line thinning, CD, edge placement, overlapping, resist top loss, resist undercut and/or bridging. The process window of all the patterns on a patterning device or an area thereof may be obtained by merging (e.g., overlapping) process windows of each individual pattern. The boundary of the process window of all the patterns contains boundaries of process windows of some of the individual patterns. In other words, these individual patterns limit the process window of all the patterns. These patterns can be referred to as "hot spots" or "process window limiting patterns (PWLPs)," which are used interchangeably herein. When controlling a patterning process, it is possible and economical to focus on the hot spots. When the hot spots are not defective, it is most likely that all the patterns are not defective.

Figure 2:
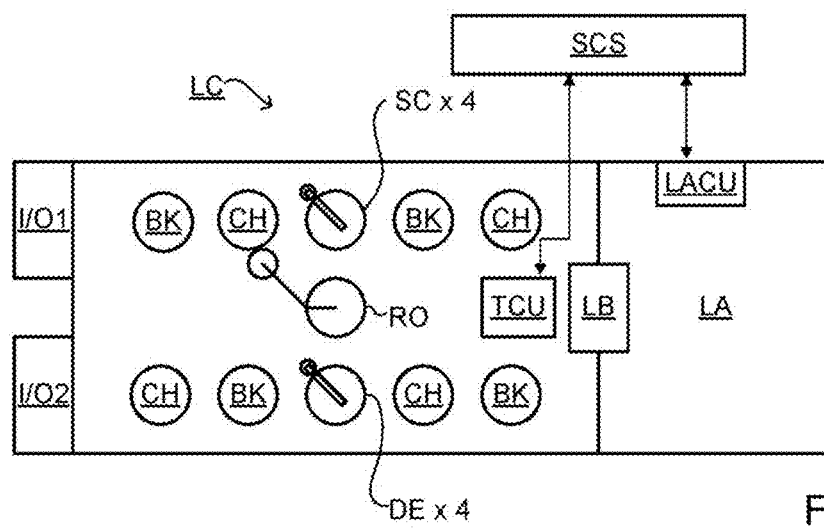
FIG. 2 schematically depicts an embodiment of a lithographic cell or cluster.

As shown in FIG. 2, the lithographic apparatus LA may form part of a lithographic cell LC, also sometimes referred to a lithocell or cluster, which also includes apparatuses to perform pre- and post-exposure processes on a substrate. Conventionally these include one or more spin coaters SC to deposit one or more resist layers, one or more developers DE to develop exposed resist, one or more chill plates CH and/or one or more bake plates BK. A substrate handler, or robot, RO picks up one or more substrates from input/output port I/O1, I/O2, moves them between the different process apparatuses and delivers them to the loading bay LB of the lithographic apparatus. These apparatuses, which are often collectively referred to as the track, are under the control of a track control unit TCU which is itself controlled by the supervisory control system SCS, which also controls the lithographic apparatus via lithography control unit LACU. Thus, the different apparatuses can be operated to maximize throughput and processing efficiency.

In order that a substrate that is exposed by the lithographic apparatus is exposed correctly and consistently and/or in order to monitor the patterning process (e.g., a device manufacturing process) that includes at least one pattern transfer step (e.g., an optical lithography step), it is desirable to inspect a substrate or other object to measure or determine one or more properties such as alignment, overlay (which can be, for example, between structures in overlying layers or between structures in a same layer that have been provided separately to the layer by, for example, a double patterning process), line thickness, critical dimension (CD), focus offset, a material property, etc. Accordingly a manufacturing facility in which lithocell LC is located also typically includes a metrology system MET which measures some or all of the substrates W that have been processed in the lithocell or other objects in the lithocell. The metrology system MET may be part of the lithocell LC, for example it may be part of the lithographic apparatus LA (such as alignment sensor AS).

The one or more measured parameters may include, for example, overlay between successive layers formed in or on the patterned substrate, critical dimension (CD) (e.g., critical linewidth) of, for example, features formed in or on the patterned substrate, focus or focus error of an optical lithography step, dose or dose error of an optical lithography step, optical aberrations of an optical lithography step, etc. This measurement may be performed on a target of the product substrate itself and/or on a dedicated metrology target provided on the substrate. The measurement can be performed after-development of a resist but before etching or can be performed after-etch.

There are various techniques for making measurements of the structures formed in the patterning process, including the use of a scanning electron microscope, an image-based measurement tool and/or various specialized tools. As discussed above, a fast and non-invasive form of specialized metrology tool is one in which a beam of radiation is directed onto a target on the surface of the substrate and properties of the scattered (diffracted/reflected) beam are measured. By evaluating one or more properties of the radiation scattered by the substrate, one or more properties of the substrate can be determined. This may be termed diffraction-based metrology. One such application of this diffraction-based metrology is in the measurement of feature asymmetry within a target. This can be used as a measure of overlay, for example, but other applications are also known. For example, asymmetry can be measured by comparing opposite parts of the diffraction spectrum (for example, comparing the −1st and +1st orders in the diffraction spectrum of a periodic grating). This can be done as described above and as described, for example, in U.S. patent application publication US 2006-066855, which is incorporated herein in its entirety by reference. Another application of diffraction-based metrology is in the measurement of feature width (CD) within a target. Such techniques can use the apparatus and methods described hereafter.

Thus, in a device fabrication process (e.g., a patterning process or a lithography process), a substrate or other objects may be subjected to various types of measurement during or after the process. The measurement may determine whether a particular substrate is defective, may establish adjustments to the process and apparatuses used in the process (e.g., aligning two layers on the substrate or aligning the patterning device to the substrate), may measure the performance of the process and the apparatuses, or may be for other purposes. Examples of measurement include optical imaging (e.g., optical microscope), non-imaging optical measurement (e.g., measurement based on diffraction such as ASML YieldStar metrology tool, ASML SMASH metrology system), mechanical measurement (e.g., profiling using a stylus, atomic force microscopy (AFM)), and/or non-optical imaging (e.g., scanning electron microscopy (SEM)). The SMASH (SMart Alignment Sensor Hybrid) system, as described in U.S. Pat. No. 6,961,116, which is incorporated by reference herein in its entirety, employs a self-referencing interferometer that produces two overlapping and relatively rotated images of an alignment marker, detects intensities in a pupil plane where Fourier transforms of the images are caused to interfere, and extracts the positional information from the phase difference between diffraction orders of the two images which manifests as intensity variations in the interfered orders.

Metrology results may be provided directly or indirectly to the supervisory control system SCS. If an error is detected, an adjustment may be made to exposure of a subsequent substrate (especially if the inspection can be done soon and fast enough that one or more other substrates of the batch are still to be exposed) and/or to subsequent exposure of the exposed substrate. Also, an already exposed substrate may be stripped and reworked to improve yield, or discarded, thereby avoiding performing further processing on a substrate known to be faulty. In a case where only some target portions of a substrate are faulty, further exposures may be performed only on those target portions which are good.

Within a metrology system MET, a metrology apparatus is used to determine one or more properties of the substrate, and in particular, how one or more properties of different substrates vary or different layers of the same substrate vary from layer to layer. As noted above, the metrology apparatus may be integrated into the lithographic apparatus LA or the lithocell LC or may be a stand-alone device.

To enable the metrology, one or more targets can be provided on the substrate. In an embodiment, the target is specially designed and may comprise a periodic structure. In an embodiment, the target is a part of a device pattern, e.g., a periodic structure of the device pattern. In an embodiment, the device pattern is a periodic structure of a memory device (e.g., a Bipolar Transistor (BPT), a Bit Line Contact (BLC), etc. structure).

In an embodiment, the target on a substrate may comprise one or more 1-D periodic structures (e.g., gratings), which are printed such that after development, the periodic structural features are formed of solid resist lines. In an embodiment, the target may comprise one or more 2-D periodic structures (e.g., gratings), which are printed such that after development, the one or more periodic structures are formed of solid resist pillars or vias in the resist. The bars, pillars or vias may alternatively be etched into the substrate (e.g., into one or more layers on the substrate).

In an embodiment, one of the parameters of interest of a patterning process is overlay. Overlay can be measured using dark field scatterometry in which the zeroth order of diffraction (corresponding to a specular reflection) is blocked, and only higher orders processed. Examples of dark field metrology can be found in PCT patent application publication nos. WO 2009/078708 and WO 2009/106279, which are hereby incorporated in their entirety by reference. Further developments of the technique have been described in U.S. patent application publications US2011-0027704, US2011-0043791 and US2012-0242970, which are hereby incorporated in their entirety by reference. Diffraction-based overlay using dark-field detection of the diffraction orders enables overlay measurements on smaller targets. These targets can be smaller than the illumination spot and may be surrounded by device product structures on a substrate. In an embodiment, multiple targets can be measured in one radiation capture.

FIG. 3 depicts an example inspection apparatus (e.g., a scatterometer). It comprises a broadband (white light) radiation projector 2 which projects radiation onto a substrate W. The redirected radiation is passed to a spectrometer detector 4, which measures a spectrum 10 (intensity as a function of wavelength) of the specular reflected radiation, as shown, e.g., in the graph in the lower left. From this data, the structure or profile giving rise to the detected spectrum may be reconstructed by processor PU, e.g. by Rigorous Coupled Wave Analysis and non-linear regression or by comparison with a library of simulated spectra as shown at the bottom right of FIG. 3. In general, for the reconstruction the general form of the structure is known and some variables are assumed from knowledge of the process by which the structure was made, leaving only a few variables of the structure to be determined from the measured data. Such an inspection apparatus may be configured as a normal-incidence inspection apparatus or an oblique-incidence inspection apparatus.

Figure 4:
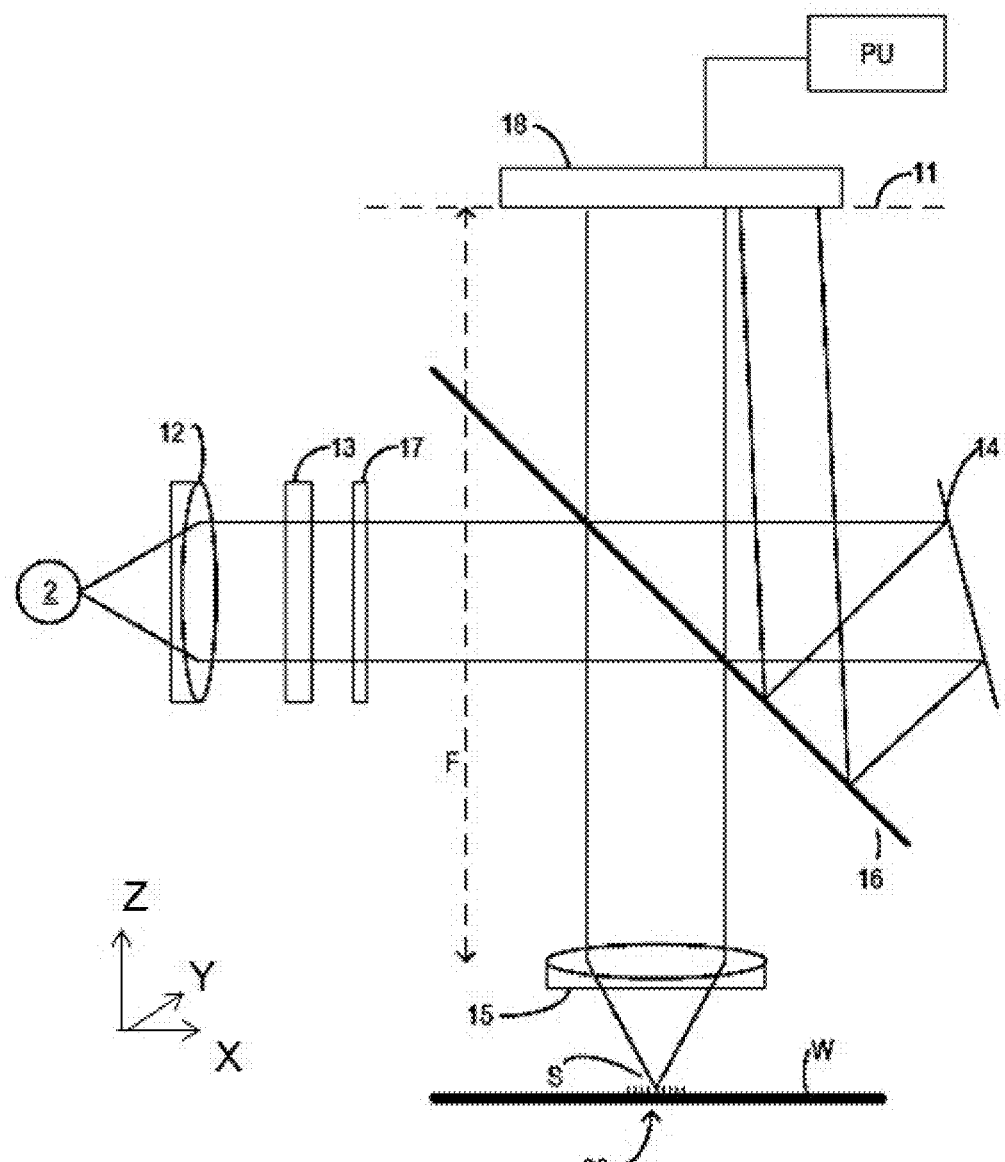
FIG. 4 schematically depicts an example inspection apparatus.

Another inspection apparatus that may be used is shown in FIG. 4. In this device, the radiation emitted by radiation source 2 is collimated using lens system 12 and transmitted through interference filter 13 and polarizer 17, reflected by partially reflecting surface 16 and is focused into a spot S on substrate W via an objective lens 15, which has a high numerical aperture (NA), desirably at least 0.9 or at least 0.95. An immersion inspection apparatus (using a relatively high refractive index fluid such as water) may even have a numerical aperture over 1.

As in the lithographic apparatus LA, one or more substrate tables may be provided to hold the substrate W during measurement operations. The substrate tables may be similar or identical in form to the substrate table WT of FIG. 1. In an example where the inspection apparatus is integrated with the lithographic apparatus, they may even be the same substrate table. Coarse and fine positioners may be provided to a second positioner PW configured to accurately position the substrate in relation to a measurement optical system. Various sensors and actuators are provided for example to acquire the position of a target of interest, and to bring it into position under the objective lens 15. Typically many measurements will be made on targets at different locations across the substrate W. The substrate support can be moved in X and Y directions to acquire different targets, and in the Z direction to obtain a desired location of the target relative to the focus of the optical system. It is convenient to think and describe operations as if the objective lens is being brought to different locations relative to the substrate, when, for example, in practice the optical system may remain substantially stationary (typically in the X and Y directions, but perhaps also in the Z direction) and only the substrate moves. Provided the relative position of the substrate and the optical system is correct, it does not matter in principle which one of those is moving in the real world, or if both are moving, or a combination of a part of the optical system is moving (e.g., in the Z and/or tilt direction) with the remainder of the optical system being stationary and the substrate is moving (e.g., in the X and Y directions, but also optionally in the Z and/or tilt direction).

The radiation redirected by the substrate W then passes through partially reflecting surface 16 into a detector 18 in order to have the spectrum detected. The detector 18 may be located at a back-projected focal plane 11 (i.e., at the focal length of the lens system 15) or the plane 11 may be re-imaged with auxiliary optics (not shown) onto the detector 18. The detector may be a two-dimensional detector so that a two-dimensional angular scatter spectrum of a substrate target 30 can be measured. The detector 18 may be, for example, an array of CCD or CMOS sensors, and may use an integration time of, for example, 40 milliseconds per frame.

A reference beam may be used, for example, to measure the intensity of the incident radiation. To do this, when the radiation beam is incident on the partially reflecting surface 16 part of it is transmitted through the partially reflecting surface 16 as a reference beam towards a reference mirror 14. The reference beam is then projected onto a different part of the same detector 18 or alternatively on to a different detector (not shown).

One or more interference filters 13 are available to select a wavelength of interest in the range of, say, 405-790 nm or even lower, such as 200-300 nm. The interference filter may be tunable rather than comprising a set of different filters. A grating could be used instead of an interference filter. An aperture stop or spatial light modulator (not shown) may be provided in the illumination path to control the range of angle of incidence of radiation on the target.

The detector 18 may measure the intensity of redirected radiation at a single wavelength (or narrow wavelength range), the intensity separately at multiple wavelengths or integrated over a wavelength range. Furthermore, the detector may separately measure the intensity of transverse magnetic- and transverse electric-polarized radiation and/or the phase difference between the transverse magnetic- and transverse electric-polarized radiation.

The target 30 on substrate W may be a 1-D grating, which is printed such that after development, the bars are formed of solid resist lines. The target 30 may be a 2-D grating, which is printed such that after development, the grating is formed of solid resist pillars or vias in the resist. The bars, pillars or vias may be etched into or on the substrate (e.g., into one or more layers on the substrate). The pattern (e.g., of bars, pillars or vias) is sensitive to change in processing in the patterning process (e.g., optical aberration in the lithographic projection apparatus (particularly the projection system PS), focus change, dose change, etc.) and will manifest in a variation in the printed grating. Accordingly, the measured data of the printed grating is used to reconstruct the grating. One or more parameters of the 1-D grating, such as line width and/or shape, or one or more parameters of the 2-D grating, such as pillar or via width or length or shape, may be input to the reconstruction process, performed by processor PU, from knowledge of the printing step and/or other inspection processes.

In addition to measurement of a parameter by reconstruction, angle resolved scatterometry is useful in the measurement of asymmetry of features in product and/or resist patterns. A particular application of asymmetry measurement is for the measurement of overlay, where the target 30 comprises one set of periodic features superimposed on another. The concepts of asymmetry measurement using the instrument of FIG. 3 or FIG. 4 are described, for example, in U.S. patent application publication US2006-066855, which is incorporated herein in its entirety. Simply stated, while the positions of the diffraction orders in the diffraction spectrum of the target are determined only by the periodicity of the target, asymmetry in the diffraction spectrum is indicative of asymmetry in the individual features which make up the target. In the instrument of FIG. 4, where detector 18 may be an image sensor, such asymmetry in the diffraction orders appears directly as asymmetry in the pupil image recorded by detector 18. This asymmetry can be measured by digital image processing in unit PU, and calibrated against known values of overlay.

Figure 5:
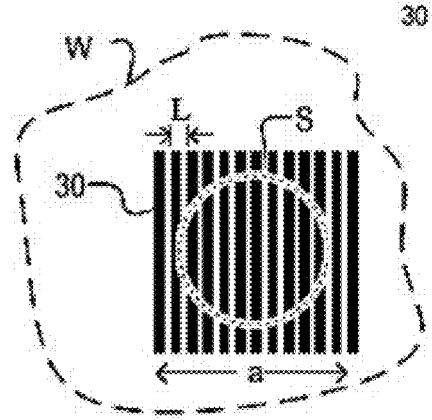
FIG. 5 illustrates the relationship between an illumination spot of an inspection apparatus and a metrology target.

FIG. 5 illustrates a plan view of a typical target 30, and the extent of illumination spot S in the apparatus of FIG. 4. To obtain a diffraction spectrum that is free of interference from surrounding structures, the target 30, in an embodiment, is a periodic structure (e.g., grating) larger than the width (e.g., diameter) of the illumination spot S. The width of spot S may be smaller than the width and length of the target. The target in other words is 'underfilled' by the illumination, and the diffraction signal is essentially free from any signals from product features and the like outside the target itself. The illumination arrangement 2, 12, 13, 17 may be configured to provide illumination of a uniform intensity across a back focal plane of objective 15. Alternatively, by, e.g., including an aperture in the illumination path, illumination may be restricted to on axis or off axis directions.

Figure 6:
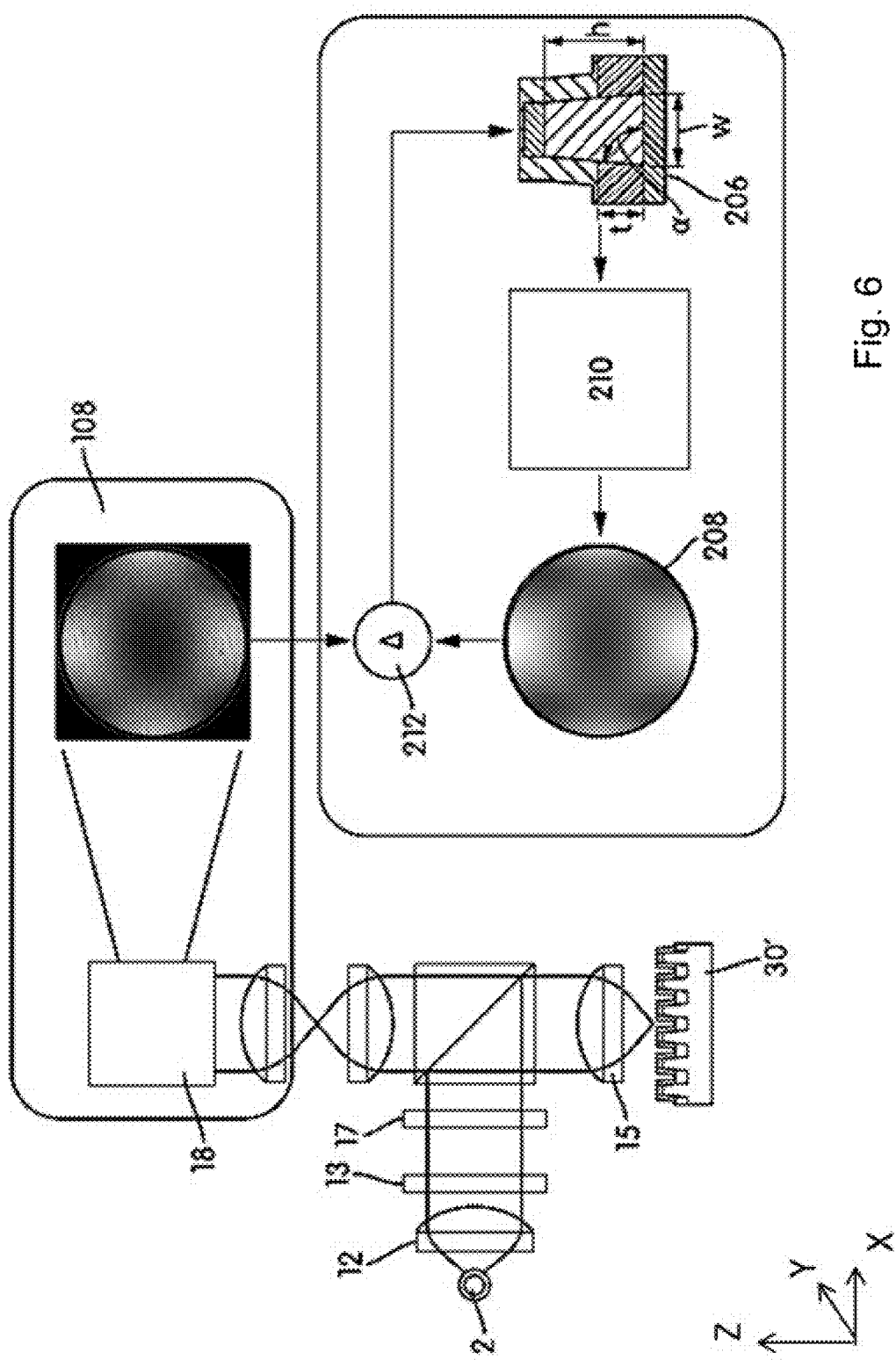
FIG. 6 schematically depicts a process of deriving a plurality of variables of interest based on measurement data.

FIG. 6 schematically depicts an example process of the determination of the value of one or more variables of interest of a target pattern 30' based on measurement data obtained using metrology. Radiation detected by the detector 18 provides a measured radiation distribution 108 for target 30'.

For a given target 30', a radiation distribution 208 can be computed/simulated from a parameterized model 206 using, for example, a numerical Maxwell solver 210. The parameterized model 206 shows example layers of various materials making up, and associated with, the target. The parameterized model 206 may include one or more of variables for the features and layers of the portion of the target under consideration, which may be varied and derived. As shown in FIG. 6, the one or more of the variables may include the thickness t of one or more layers, a width w (e.g., CD) of one or more features, a height h of one or more features, and/or a sidewall angle α of one or more features. Although not shown, the one or more of the variables may further include, but is not limited to, the refractive index (e.g., a real or complex refractive index, refractive index tensor, etc.) of one or more of the layers, the extinction coefficient of one or more layers, the absorption of one or more layers, resist loss during development, a footing of one or more features, and/or line edge roughness of one or more features. The initial values of the variables may be those expected for the target being measured. The measured radiation distribution 108 is then compared at 212 to the computed radiation distribution 208 to determine the difference between the two. If there is a difference, the values of one or more of the variables of the parameterized model 206 may be varied, a new computed radiation distribution 208 calculated and compared against the measured radiation distribution 108 until there is sufficient match between the measured radiation distribution 108 and the computed radiation distribution 208. At that point, the values of the variables of the parameterized model 206 provide a good or best match of the geometry of the actual target 30'. In an embodiment, there is sufficient match when a difference between the measured radiation distribution 108 and the computed radiation distribution 208 is within a tolerance threshold.

Figure 7:
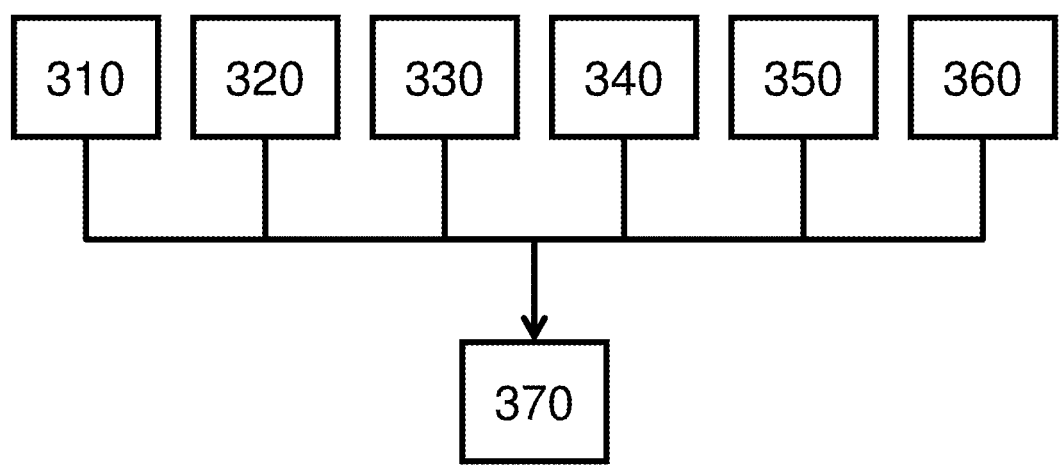
FIG. 7 shows example categories of processing variables.

Variables of a patterning process are called "processing variables." The patterning process may include processes upstream and downstream to the actual transfer of the pattern in a lithography apparatus. FIG. 7 shows example categories of the processing variables 370. The first category may be variables 310 of the lithography apparatus or any other apparatuses used in the lithography process. Examples of this category include variables of the illumination, projection system, substrate stage, etc. of a lithography apparatus. The second category may be variables 320 of one or more procedures performed in the patterning process. Examples of this category include focus control or focus measurement, dose control or dose measurement, bandwidth, exposure duration, development temperature, chemical composition used in development, etc. The third category may be variables 330 of the design layout and its implementation in, or using, a patterning device. Examples of this category may include shapes and/or locations of assist features, adjustments applied by a resolution enhancement technique (RET), CD of mask features, etc. The fourth category may be variables 340 of the substrate. Examples include characteristics of structures under a resist layer, chemical composition and/or physical dimension of the resist layer, etc. The fifth category may be characteristics 350 of temporal variation of one or more variables of the patterning process. Examples of this category include a characteristic of high frequency stage movement (e.g., frequency, amplitude, etc.), high frequency laser bandwidth change (e.g., frequency, amplitude, etc.) and/or high frequency laser wavelength change. These high frequency changes or movements are those above the response time of mechanisms to adjust the underlying variables (e.g., stage position, laser intensity). The sixth category may be characteristics 360 of processes upstream of, or downstream to, pattern transfer in a lithographic apparatus, such as spin coating, post-exposure bake (PEB), development, etching, deposition, doping and/or packaging.

As will be appreciated, many, if not all of these variables, will have an effect on a parameter of the patterning process and often a parameter of interest. Non-limiting examples of parameters of the patterning process may include critical dimension (CD), critical dimension uniformity (CDU), focus, overlay, edge position or placement, sidewall angle, pattern shift, etc. Often, these parameters express an error from a nominal value (e.g., a design value, an average value, etc.). The parameter values may be the values of a characteristic of individual patterns or a statistic (e.g., average, variance, etc.) of the characteristic of a group of patterns.

The values of some or all of the processing variables, or a parameter related thereto, may be determined by a suitable method. For example, the values may be determined from data obtained with various metrology tools (e.g., a substrate metrology tool). The values may be obtained from various sensors or systems of an apparatus in the patterning process (e.g., a sensor, such as a leveling sensor or alignment sensor, of a lithography apparatus, a control system (e.g., a substrate or patterning device table control system) of a lithography apparatus, a sensor in a track tool, etc.). The values may be from an operator of the patterning process.

Now, increasingly metrology has become a burden mostly in terms of time taken. This is, for example, particularly the case in the advent of multiple patterning techniques in the semiconductor industry. With multiple patterning techniques such as litho-etch-litho-etch (LELE) and/or sidewall assisted double patterning (SADP), the number of processing steps has increased significantly and therefore, so has the amount of metrology steps used for control and yield monitoring. Moreover, the amount of metrology increases for each node (i.e., reduction in feature size) as more layers are used in multiple patterning steps, and more patterning steps are used per layer.

Additionally or alternatively, there is an increased desire for defect determination and/or guided defect inspection. This involves substantially denser focus, overlay, and/or CD metrology than before.

Additionally or alternatively, there are ever tightening specifications on on-device CD, overlay, and/or focus performance. This drives manufacturing equipment specifications of, e.g., exposure tools and processing tools (e.g., deposition, etch, track, chemical mechanical polishing (CMP), etc.), from one node to the next. So, this drives tighter control and monitoring of performance which in turn drives the demand for ever increasing amounts of metrology for control and monitoring.

Additionally or alternatively, in line with tightening of the specifications on on-device CD, focus, and/or overlay performance, higher order corrections may be needed. A higher order correction is essentially a corrective action which is selective on a small spatial scale across all or part of the substrate (e.g. correction with a high spatial resolution). Higher order correction involves a denser sampling per substrate for metrology, thereby increasing the metrology burden perhaps beyond practical limits of metrology equipment productivity.

Additionally or alternatively, substrate to substrate variation may require further individual substrate level control (compared to, e.g., lot level control) and associated monitoring in order to achieve the desired CD, focus, and/or overlay performance. This may lead to measuring more substrates per lot and thus drive an increase in the amount of measurements used, perhaps beyond practical limits of metrology equipment productivity.

But, in order to meet the increased data demands, only adding metrology equipment or increasing metrology equipment productivity may not suffice. Moreover, it may not solve all problems such as obtaining dense CD, focus and/or overlay profiles across a substrate in a timely manner.

So, metrology efficiency is desirable. This is to obtain, e.g., higher density of data per substrate and data for a higher number of substrates per lot.

Therefore, in an embodiment, there is provided a method to, e.g., help improve metrology efficiency. In the method, metrology data from multiple sources is combined and manipulated in order to derive accurate estimated values of one or more patterning process parameters (e.g., CD, focus, overlay, edge placement, etc.) for each of a plurality of locations across a substrate. In an embodiment, then, there is provided dense metrology data (e.g., for each square mm) for, e.g., all of the substrates processed in a patterning process and for, e.g., all of the layers processed on such substrates in the patterning process.

In effect, in an embodiment, the results of the method is a "virtual" or emulated distribution of values of one or more patterning process parameters across the substrate, which is achieved through such combination of various metrology data. This method can offer then an efficient method for hybrid metrology for one or more patterning process parameters (e.g., focus, CD, overlay, etc.). And, while embodiments herein will consider primarily particular examples of patterning process parameters namely focus, CD and overlay, it will appreciated that one or more other or additional patterning process parameters can be the subject of the techniques herein.

As noted above, the method involves combination of metrology and other data from various sources. In an embodiment, the method involves combining measurements of a patterning process parameter of interest with data from one or more devices in the patterning process, such as data from one or more sensors of the lithographic apparatus. This combination of data will then be used to predict on-product performance in the form of, e.g., a patterning process parameter, such as CD, overlay, focus, pattern shift, edge placement (e.g., edge placement error), etc. and/or a parameter derived therefrom, such as yield, defects (e.g., risk of defect, defect counts, etc.), etc.

Thus, a principle underlying the method is to isolate and estimate individual root-causes of the change of a patterning process parameter of interest which are then combined to compute the on-product performance. The goal is to use as much of the available information as possible to avoid ever increasing amounts of off-line (and/or on-line) metrology to determine a patterning process parameter of interest using tools such as described in respect of FIGS. 3-6.

Thus, in an embodiment, it is desirable to identify the various contributions to the change of a patterning process parameter of interest (such as CD error, focus error, overlay, etc.). Those contributions can then be used in various combinations to achieve a desired estimate of the on-product performance. Typically, those contributions will be an error and/or a residual. For example, a device may produce an error in making a correction, which can then realize in a change of the patterning process parameter of interest. As another example, a sensor system may measure an error, which error is or contributes to a change of the patterning process parameter. As a further example, a device or a mathematical model used to determine a setting of the device may not be able to realize a certain desired or best physical effect (e.g., a difference between a desired physical correction and the physical correction that can be achieved by a device, a difference between a desired physical effect such as dose, focus, etc. and the physical effect than can be achieved by a device, a difference between a desired physical correction or effect and the correction or effect capable of being determined by a mathematical model, etc.) and thus realize a residual that is or contributes to a change of the patterning process parameter. In an embodiment, a contribution can be determined experimentally or empirically.

Each of these contributions to a patterning process parameter of interest as spatially distributed across a die, a field or a substrate can then be characterized as a fingerprint. And, similarly, the combined contributions across the die, the field or the substrate can be characterized as a fingerprint.

So, a plurality of these contributions can be combined to yield a derived fingerprint. For example, a focus fingerprint on a product substrate can be, for instance, a composite of focus contributions due to unflatness of that substrate, a focus error associated with the projection system of the lithographic apparatus during the substrate's exposure, a height error made by the substrate position control loop during exposure, and a residual fingerprint of the focus setup of the lithographic apparatus. An example of this is described below in respect of FIG. 9.

Figure 10:
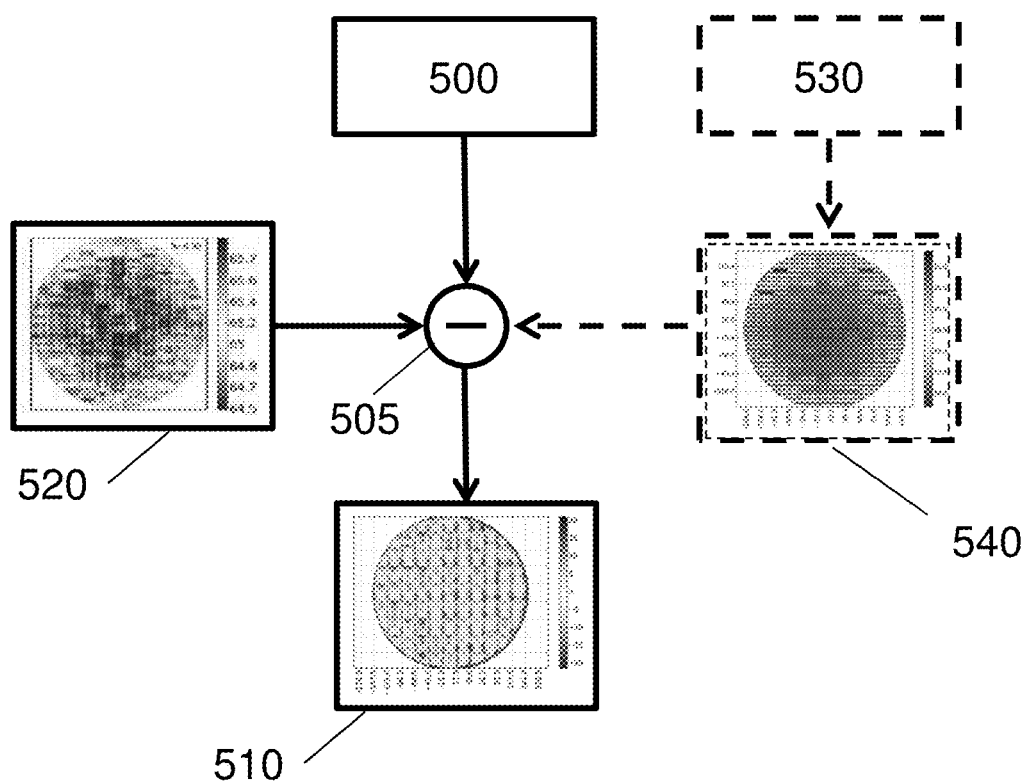
FIG. 10 schematically shows an example of deriving a contribution to a processing variable from metrology data.

Similarly, a derived or measured fingerprint can have one or more fingerprints removed therefrom to yield a (further) derived fingerprint. For example, a measured focus fingerprint of a substrate can have removed therefrom the focus contributions of unflatness of that substrate, a focus error associated with the projection system of the lithographic apparatus during the substrate's exposure, a height error made by the substrate position control loop during exposure, and a residual fingerprint of the focus setup of the lithographic apparatus. This can yield a residual focus fingerprint due to errors not captured by the removed fingerprints. An example of this is described below in respect of FIG. 10.

Thus, in an embodiment, the method can, for example, break down a fingerprint into individual contribution fingerprints and/or derive a fingerprint by combining fingerprints.

Figure 8:
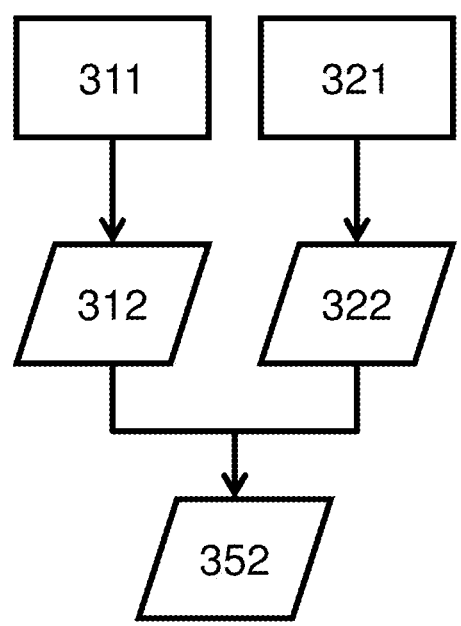
FIG. 8 schematically shows that changes of processing variables may have contributions to metrology data.

So, referring to FIG. 8, an embodiment of the combination of contributions (fingerprints) is depicted. A change of a processing variable 311 (e.g., in the focus context, a height error) may have a contribution 312 to a patterning process parameter 352 (e.g., in the context of focus, focus) for a pattern on a substrate and that a change of a processing variable 321 (e.g. in the focus context, a residual of the focus setup) may have a contribution 322 to the patterning process parameter 352. Namely, the patterning process parameter 352 may have combined contributions of changes of one or more processing variables. These contributions 312 and 322 may be simply additive (which may include weighted or linear addition) or be combined by other functions (e.g., using (de)convolution, using a neural network, RMS addition, scaling, etc.). The patterning process parameter 352 may have contributions of changes in other variables. So, with this realization as discussed further hereafter, various contributions can be determined or can be used to derive estimates of a patterning process parameter. In an embodiment, the contribution 312 and/or 322 may be determined by modeling the one or more applicable processing variables. The contribution 312 and/or 322 may be expressed as a function of the one or more applicable processing variables. The function may be linear or non-linear.

Figure 9:
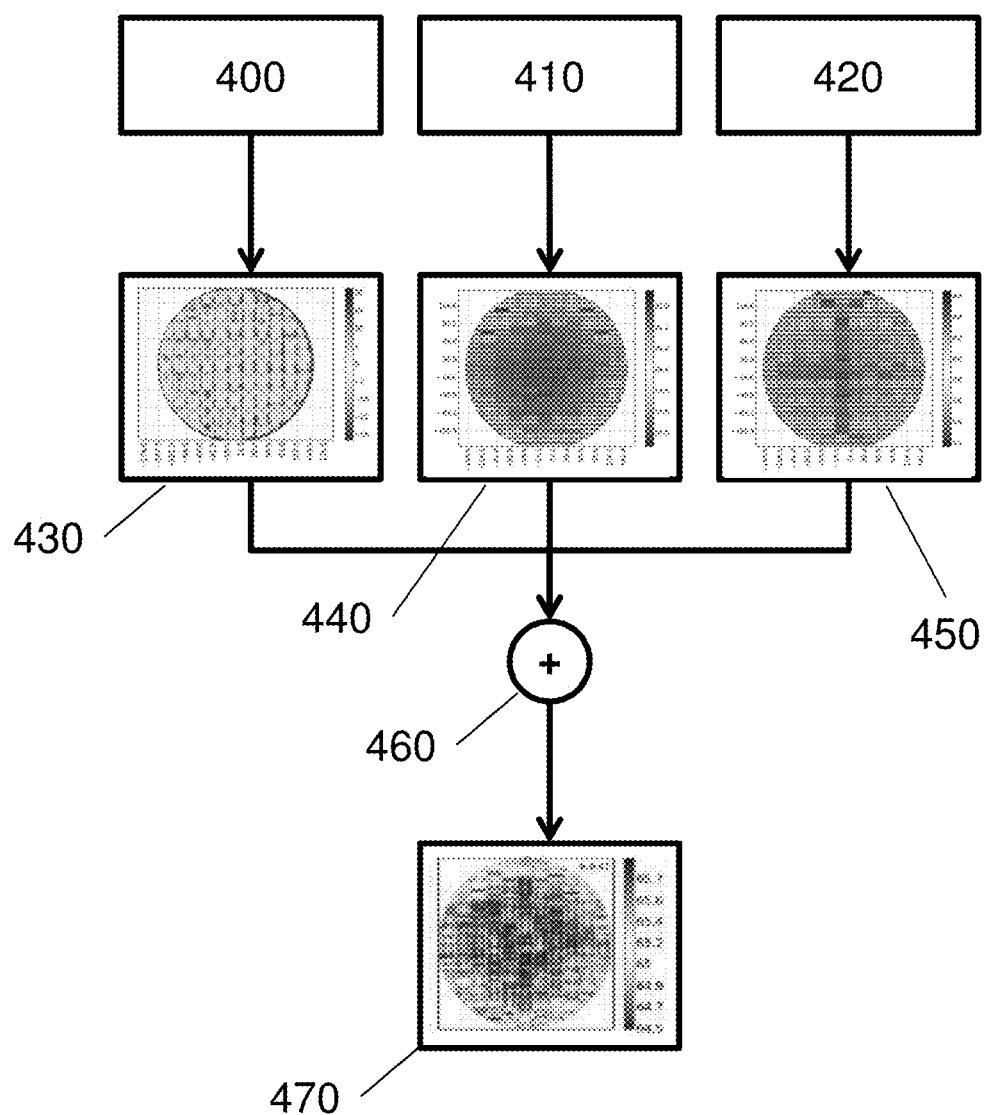
FIG. 9 schematically shows an example of deriving a combined contribution to a patterning process parameter.

FIG. 9 schematically shows an example of obtaining a derived contribution 470 to a patterning process parameter of a substrate, the derived contribution being a combination of contributions (one or more of which may be a derived contribution) of multiple processing variables. In this case, the derived contribution 470 is (de)focus. So, the derived contribution 470 can be obtained using contributions of multiple processing variables such as focus error (FE) associated with the projection system of the lithographic apparatus during the substrate's exposure 400, a height error (e.g., moving standard deviation ($MSD_z$)) made by the substrate position control loop during exposure 410, and unflatness (P) of that substrate 420. Significantly, this data can be obtained from the lithographic apparatus and can be a by-product of producing a substrate as part of a patterning process. None of these identified contributions necessarily requires a measurement of a feature patterned on the substrate using, for example, tools such as described in respect of FIGS. 3-6. The contributions can be obtained, as applicable, by simulation, mathematical modeling and/or measurement/experimentation. For example, the contributions can be obtained by simulation based on physical models, empirical modeling and/or dedicated measurements.

So, in the focus case, an example of the contribution to focus of processing variable 400 is shown as contribution 430, an example of the contribution to focus of processing variable 410 is shown as contribution 440, and an example of the contribution to focus of processing variable 420 is shown as contribution 450. Each of these contributions is then combined together 460 to realize derived contribution 470. While element 460 (and other elements in the Figures) shows a plus sign, the operation at 460 need not be addition, e.g., it can be a multiplication, convolution, through use of a neural network etc. The operation may be different for one or more contributions than another one or more contributions (e.g., an addition of 430 to 440 and a convolution of the sum with contribution 450). In an example, the combined contribution can be expressed as $F(x,y)=a_1*F(FE)(x,y)+b_1*F(MSD_z)(x,y)+c_1*F(P)(x,y)+\ldots$. The various functions can be obtained by simulation, mathematical modeling and/or measurement/experimentation. Moreover, there may be cross terms that are not shown here (such as focus as a function of FE times MSD, etc.). To obtain an absolute value of focus, a nominal value or simulated value of the focus can be combined with the contributions. The coefficients such as $a_1$, $b_1$, $c_1$ are sensitivities of the focus with respect to the respective processing variables or their functions. In this example, the contributions are across a substrate but in an embodiment, one or more of the contributions may per die/field (which could then be repeated across the substrate depending on, e.g., applicable conditions at each of the instances). As noted above, the contribution 470 may be characterized as a fingerprint since it can be spatially defined across the substrate/die/field. Further, the contribution's translation into an absolute value may be characterized as a fingerprint since it can be spatially defined across the substrate/die/field. As will be appreciated, data from processing of multiple substrates using the patterning process can be used to derive the respective contributions. This data can already be available since it could be the by-product of processing the substrates.

Now, in the context of CD, the same technique described in respect of FIG. 9 can be used. For example, the derived contribution 470 to CD can be the combination of contributions (which can include a derived contribution) attributable to multiple processing variables such as focus (F) 400, moving standard deviation ($MSD_z$) 410 of movement of the substrate in the normal direction of the substrate, and moving standard deviation ($MSD_x$) 420 of movement of the substrate in a direction parallel to the substrate. So, in this case, an example of the contribution to CD of focus (F) 400 would be contribution 430, an example of the contribution to CD of moving standard deviation ($MSD_z$) 410 would be contribution 440, and an example of the contribution to CD of moving standard deviation ($MSD_x$) 420 would be contribution 440. Each of these contributions is then combined together 460 to realize derived contribution 470. In an example, the combined contribution can be expressed as $CD(x,y)=a_1*CD(F^2)(x,y)+b_1*CD(MSD_x)(x,y)+c_1*CD(MSD_z^2)(x,y)+\ldots$. Moreover, there may be cross terms that are not shown here and the relations may be different (e.g., a relation, such as focus and/or MSDz, may not be purely quadratic, and could have linear and $3^{rd}$ order terms). In an embodiment, the contributions 430, 440, 450 may be respectively focus (F) 400, moving standard deviation ($MSD_z$) 410 and moving standard deviation ($MSD_x$) 420 distributions in which case a CD model would be used to combine them into a CD distribution. Moreover, there may be cross terms that are not shown here (such as CD as a function of F times MSD, etc.). To obtain an absolute value of CD, a nominal value or simulated value of the CD can be combined with the contributions. The coefficients such as $a_1$, $b_1$, $c_1$ are sensitivities of the CD with respect to the processing variables or their functions.

Applying the principles described above, FIG. 10 schematically shows an example of obtaining a derived contribution 510 from patterned substrate metrology data for a patterning process parameter of interest of a substrate by removing a contribution to the patterning process parameter of interest. Patterned substrate metrology data in this context are values of a parameter of interest obtained by measuring a feature (e.g., a device pattern feature, a metrology target separate from the device pattern, etc.) on substrate that is at least partially processed by the patterning process. Such metrology data can typically be obtained using metrology or inspection tools such as described in respect of FIGS. 3-6.

Patterned substrate metrology data 500 for a parameter of interest may have at least two contributions. So, one or more contributions within the patterned substrate metrology data can be obtained by removing one or more other contributions within the patterned substrate metrology data. Thus, a contribution 510 may be obtained by removing 505 a contribution 520 from the patterned substrate metrology data 500. While element 505 (and other elements in the Figures) shows a minus sign, the operation at 505 need not be subtraction, e.g., it can be a multiplication, (de)convolution, through use of a neural network, etc. Contribution 520 can be a derived contribution, such as contribution 470, or can be a contribution derived from other data, such as any one or more of contributions 430, 440 and 450. Further, multiple contributions can be removed. For example, optional contribution 540, associated with a processing variable 530, can be removed from the patterned substrate metrology data 500 along with contribution 520. As will be appreciated, data from processing of multiple substrates using the patterning process can be used to obtain the patterned substrate metrology data.

In an embodiment, the patterned substrate metrology data is from a pattern separate from a device pattern, for example a metrology feature of at a non-functional area of a die, between dies or on a test substrate. So, for example, the contribution of one or more processing variables can be removed from such metrology data, thereby obtaining a remaining contribution of one or more processing variables to such metrology data. The comparable contribution to metrology data of a device pattern on the same or different substrate can then be obtained based on the remaining contribution, without the need of actually obtaining the metrology data from the device pattern. For example, the contribution to the metrology of the device pattern may be estimated to be the same as the remaining contribution because the applicable one or more processing variables have comparable effect to the device pattern and the separate pattern. In an embodiment, the separate pattern is a pattern for testing purpose (e.g., a metrology target) and performing metrology on the separate pattern does not impact a device pattern on the substrate.

Therefore, by combining contributions and/or removing contributions from patterned substrate metrology data, estimates of a parameter of interest of a substrate can be obtained without necessarily having to obtain patterned substrate metrology data for that substrate. This is done by recognizing the nature of the various contributions.

In an embodiment, a contribution of one or more processing variables may be apparatus (e.g., lithographic apparatus) specific; that is, the contribution is specific to a certain actual apparatus or combination of apparatuses. Thus, in an embodiment, the contribution of the one or more processing variables may be used repeatedly across every substrate. Therefore, the contribution of one or more processing variables may be pre-characterized and obtained from a database for various combination/removal processes. The contribution may be apparatus specific as a whole or a specific part (e.g., etch chamber) of the apparatus. Examples of such variables may include, but are not limited to, various characteristics of a process upstream or downstream to pattern transfer in the lithographic apparatus, such as spin coating, post exposure bake, development, etching, deposition, doping, and/or packaging.

In an embodiment, a contribution of one or more processing variables is not specific to a particular substrate (and so can be used across substrates). Thus, the contribution of one or more processing variables may be pre-characterized and obtained from a database later for various combination/removal processes. This contribution of one or more processing variables can be applied to a specific substrate by combining it with data of the one or more variables for the specific substrate and a sensitivity relationship. Examples of such variables may include, but is not limited to, variables of the illumination, projection system, focus, dose, bandwidth, exposure duration, a characteristic of high frequency stage movement (e.g., moving standard deviation (MSD) of movement of the substrate stage, moving average of the movement of the substrate stage, frequency, amplitude, etc.), a high frequency laser bandwidth change (e.g., frequency, amplitude, etc.), a high frequency laser wavelength change, and/or flatness of the substrate.

In an embodiment, the contribution of one or more processing variables may be substrate specific. For example, the contribution may be determined for each substrate or a specific group of substrates. Examples of such variables may include, but are not limited to, substrate geometry (height map, deformation map), substrate processing conditions, variables of the illumination, variables of the projection system, focus, dose, bandwidth, exposure duration, a characteristic of high frequency stage movement (e.g., moving standard deviation (MSD) of movement of the substrate stage, moving average of the movement of the substrate stage, etc.), a high frequency laser bandwidth change (e.g., frequency, amplitude, etc.), a high frequency laser wavelength change, and/or flatness of the substrate.

In an embodiment, the contribution of one or more processing variables may be pattern or patterning device specific; that is, the contribution is specific to a certain actual patterning device or specific pattern to be provided by a patterning device. This contribution can be further substrate independent. Thus, the pattern or patterning device specific contribution may be pre-characterized and obtained from a database later for various combination processes. Examples of such variables may include, but are not limited to, patterning device feature CD, a shape and/or location of an assist feature, an adjustment applied by a resolution enhancement technique (RET), etc.

In an embodiment, the contribution associated with different processing variables may have different spatial uniformity. For example, the contribution of some processing variables may be essentially spatially uniform across the entire substrate, while the contribution of some other processing variables may be not so spatially uniform across the entire substrate. This difference may be attributed to the different nature of the processing variables. For example, the contribution of one or more processing variables associated with the resist layer, development of the resist layer, and/or etching of the substrate tend to be essentially spatially uniform because the entire substrate is usually coated with the resist layer, developed or etched at a same time and under a same condition, or tends to be symmetric because of, for example, rotation of the substrate during a number of these processes. For example, the contribution of one or more processing variables associated with the pattern transfer or the lithography apparatus tends to be less spatially uniform because the pattern transfer tends to be location specific and the one or more processing variables may change between pattern transfer for one location and pattern transfer for another location. Therefore, if the contribution that is not essentially spatially uniform can be removed from patterned substrate metrology data, an essentially spatially uniform contribution can be obtained from the patterned substrate metrology data.

So, in a specific example, processing variable data can be gathered from the lithographic apparatus for each point exposed on the substrate, such as leveling information, moving average (MA) of movement of the substrate, MSDxyz, dose, laser bandwidth, pupil shape, etc. This data is typically already available in a lithographic apparatus, e.g., in diagnostic files. From this data, the contribution described above can be generated using a model for the parameter of interest that describes the sensitivity of the parameter of interest to the one or more processing variables. The one or more sensitivities can be obtained from simulation or from experiments. The contribution generated in this fashion is what would be expected to be seen during a measurement after resist development, assuming the track and resist model calibration would be perfect. Once the substrate is measured, e.g., after develop or after etch, the contribution is removed from patterned substrate metrology data. The remaining contribution is now the contribution by the pre- or post-pattern transfer process (e.g., by the track and/or etch apparatus, which is generally interfield) and the patterning device (intrafield). The lithographic apparatus errors would have been corrected from the patterned substrate metrology data. Similarly, the patterning device contribution may be measured and its contribution removed to leave the contribution by the pre- or post-pattern transfer processes. A contribution can be removed per process flow (e.g., a combination of patterning process steps and/or apparatus used) or per particular apparatus or part thereof (e.g., etch apparatus or etch chamber).

So, through these techniques, contributions to a parameter of interest can be obtained through modeled relationships or by removing known contributions from patterned substrate metrology data. Moreover, one or more contributions can be apparatus specific but also substrate independent. But one or more other contributions can be substrate specific. Thus, by appropriate mixing and matching of contributions, an estimate of a parameter of interest at a certain point in the patterning process can be estimated.

Therefore, some specific examples of the application of these contributions will now be described in the context of focus, CD and overlay to determine an estimate of the respective focus, CD and overlay for a substrate. As will be appreciated, additional or other parameters of interest can be processed and estimated.

To enable these examples, various data are used. For example, the lithographic apparatus has significant metrology capability integrated therein that is used for pattern transfer control. Examples of such integrated metrology are position measurement devices (e.g., sensor IF) of the substrate and/or patterning device for servo control, a levelling sensor (e.g. sensor LS) for measurement of the substrate surface for levelling control, an alignment sensor (e.g., sensor AS) to measure the orientation, position and/or deformation of the substrate to enable overlay control, and/or an aberration sensor (e.g., the shearing interferometer described above) in order control the wavefront of the projection system. The lithographic apparatus will use data from these sensors for control at a level where its overall CD, overlay, and/or focus budgets are satisfied but at the same time also keep track of residuals and/or errors that are left after control. These residuals and/or errors may be used to calculate what CD, overlay, and/or focus error is made during pattern transfer, i.e. the lithographic apparatus' contribution to the CD, overlay, and/or focus fingerprints. As will be appreciated, other apparatuses used in the patterning process may have similar information for the applicable metrology of the apparatus.

Further, lithographic apparatus setup or control can use one or more mathematical models to determine the respective calibration or control correction. However, such one or more models may have a built-in assumption or limit leading to a non-zero residual error. Such a model residual can be used to calculate what CD, overlay, and/or focus error is made, i.e. the model's contribution to the CD, overlay, and/or focus fingerprints. As will be appreciated, other apparatuses used in the patterning process can have similar model information.

Further, a lithographic apparatus may be setup by using in-resist measurements to help remove any global and local fingerprints of one or more parameters (e.g., focus, overlay, etc.). But the global fingerprint can drift over time from the last time calibration was performed. For monitoring and control of this setup state, monitor substrates can be exposed and measured to monitor the global fingerprint. The monitor substrates can be basic substrates with a well-defined pattern in the substrate onto which a resist layer is applied, exposed with a pattern in relation to the well-defined pattern, developed and then measured. Once measured, the resist on the monitor substrate can be stripped to leave the well-defined pattern so that a new layer of resist can be applied. Based on those measurements, corrections can be made to the lithographic apparatus and so those corrections need to be factored in determining the contributions. In an embodiment, the monitor substrates can be used to determine overlay by using the well-defined pattern and/or to determine focus by using the resist pattern.

Turning to a focus example, the technique involves essentially two main parts. A first part is effectively a setup process to determine an underlying focus contribution of the lithographic apparatus that is not reflected in one or more types of lithographic apparatus processing variables that are used to determine an estimate of focus for a particular substrate in the estimation process. The second part is the estimation process of using a focus contribution associated with those one or more types of lithographic apparatus processing variables for the substrate under consideration to determine the estimate of focus for the particular substrate.

So, in the setup process according to an embodiment, patterned substrate focus metrology data is obtained for one or more substrates and then the contributions of one or more types of lithographic apparatus processing variables are removed similarly to as described above in FIG. 10. One type of contribution that can be removed is the focus contribution of a substrate height residual or error map associated with, e.g., the levelling sensor of the lithographic apparatus. A further type of contribution that can be removed is the focus contribution of projection system image plane deviation (IPD), which can be obtained, e.g., from a shearing interferometer and/or a projection system model residual. A further type of contribution that can be removed is the focus contribution of patterning device and/or substrate servo control (e.g., MA), which can be obtained from the applicable positioner, a position measurement device (e.g., sensor IF) and/or a residual of a servo control model. As discussed above, the translation from a processing variable to the focus contribution can be determined through simulation, mathematical modelling and/or experimentation.

As needed, the contribution fingerprints can be re-gridded to a same grid (which can be the same as the grid of one of the contribution fingerprints or a different grid). Similarly, the contribution fingerprints can be re-gridded to the patterned substrate metrology data, or vice versa. In an embodiment, the re-g ridding comprises up sampling or down sampling.

In an embodiment, a filtering (e.g., moving average, deconvolution, FFT, etc.) is applied to a contribution, desirably before combining it with another contribution.

In an embodiment, the underlying focus contribution of the lithographic apparatus can effectively be determined once and used for various focus estimates and thus the amount of metrology can be significantly reduced compared to measuring each substrate. In an embodiment, the patterned substrate focus metrology data can be obtained by relatively sparse sampling of locations on the substrate (e.g., 500 targets or less on a substrate) and/or of the number of substrates from one or more lots (e.g., 10 or less substrates from a lot of 25 or more substrates).

In an embodiment, the patterned substrate focus metrology data can be a measured focus fingerprint of a monitor substrate as described above. Thus, data that is already being captured can be used. So, the measured focus fingerprint can be corrected for the lithographic apparatus impact as derived from lithographic apparatus sensor information, such as the focus contribution of projection system image plane deviation (IPD), the focus contribution of the substrate height residual or error map, and/or the focus contribution of patterning device and/or substrate servo control, to arrive at the underlying focus contribution of the lithographic apparatus.

The underlying focus contribution of the lithographic apparatus is then stored for use in on-product estimations of focus. The underlying focus contribution of the lithographic apparatus can be determined for multiple lithographic apparatuses. The underlying focus contribution of the lithographic apparatus can be determined for a particular combination of devices of the lithographic apparatus used. For example, the lithographic apparatus may have more than one substrate table on which the substrate could be exposed and so the underlying focus contribution of the lithographic apparatus can be determined for a specific combination and/or multiple combinations of devices used.

Then, for the on-product estimation, the errors or residuals of one or more types of lithographic apparatus processing variables relevant to focus are obtained for a substrate of interest and the focus contribution thereof is determined. For example, the focus contribution of projection system image plane deviation (IPD), the focus contribution of the substrate height residual or error map, and/or the focus contribution of patterning device and/or substrate servo control can be obtained for the substrate of interest. A further type of contribution that can be added is the focus contribution of patterning device errors attributable to the patterning device being used for the particular substrate of interest, which could be obtained by measurement. This contribution may be particularly used if the applicable underlying focus contribution of the lithographic apparatus was obtained without using the patterning device for the substrate of interest.

Further, an applicable underlying focus contribution of the lithographic apparatus, as described above, is obtained.

Then, the applicable underlying focus contribution of the lithographic apparatus is combined, similarly to as described above in respect of FIG. 9, with the one or more specific focus contributions of the substrate of interest to obtain an estimated focus fingerprint for the substrate of interest. So, an estimate of focus error can be determined at any, or almost any, location on any substrate.

Now, turning to a CD example, in principle, there are a number of processing variables that can cause CD variation in a substrate. In this embodiment, certain CD variations across the substrate are considered. In particular, there are considered the CD variation contribution in respect of focus, focus blur, dose, and overall process. The patterning device, which is an intrafield contributor to CD variation, can also be considered but will not be further described for convenience only.

The focus contribution to CD can be based on focus contribution as described above, specifically the combination of the underlying lithographic apparatus focus contribution with the focus contributions of one or more processing variables of the lithographic apparatus for a substrate under consideration. This dense focus information can be, in principle, converted into a ΔCD contribution across the field and/or across substrate for any pattern feature given that, for example, the Bossung behavior of the feature (after-litho and/or after-etch) can be known through experiment or simulation. Hence, for any location (x, y) on the substrate with a focus value, a CD value can be calculated corresponding to that substrate location (x, y):

$$CD(HDFM_{x,y}) = \Phi_1(HDFM_{x,y})$$

wherein HDFM corresponds to a focus map such as the derived high density focus map as described above in the focus example.

The focus blur contribution to CD can be obtained using lithographic apparatus data, such as servo information (e.g., MSD in the z direction). The focus blur information can be converted into a ΔCD contribution across a scan direction and across the substrate. This focus blur data to CD conversion is also feature specific and can be known through experiment or simulation:

$$CD(fblur_{x,y}) = \Phi_2(fblur_{x,y})$$

wherein fblur corresponds to focus blurring.

The dose contribution to CD is due to the lithographic apparatus's dose variation (e.g. determined by a dose mapping system). The dose variation across the substrate during exposure can be translated into a ΔCD contribution using a suitable dose sensitivity of the applicable feature, which can be known through experiment or simulation:

$$CD(dose_{x,y}) = \Phi_3(dose_{x,y})$$

The overall process contribution to CD is a CD variation arising from various process steps as part of the patterning process separate from the pattern transfer alone. Thus, in an embodiment, the overall process contribution is the state of CD variation after the final etch step and not attributable to the various other CD variations considered in estimating the CD variation. Thus, in an embodiment, this contribution is the cumulative effect of all unaccounted for process variations arising from, e.g., film deposition variation, baking and/or developing variation, and/or etch process variation. Examples of processing variables that contribute to the overall process contribution to CD may include a characteristic of structures under a resist layer, chemical composition and/or physical dimension of the resist layer, and/or a characteristic of one or more processes upstream, or downstream, to the pattern transfer in a lithography apparatus, such as spin coating, post exposure bake, development, etching, deposition, doping and/or packaging. And, while the overall process contribution to CD is described in terms of after etch, the overall process contribution can be obtained for different points in the patterning process, e.g., obtained after development but before etch.

So, similar to the setup process of the focus example, all of these ΔCD contributions due to focus, focus blur and dose can be used and subtracted from substrate CD measurements to estimate the overall process contribution. That is, in an embodiment, an after etch overall process contribution can be generated from an anchor feature CD measurement after etch, from which the ΔCD contributions for focus, focus blur and dose (for the anchor feature) are removed. As noted, the overall process contribution is estimated from a suitable anchor feature. So, in an embodiment, the overall process contribution for other features can be determined from the anchor feature. For example, the remainder of the overall process contribution can be expressed as a proportion of the anchor feature's characteristic. Where the overall process contribution is obtained for a different point in the patterning process, e.g., obtained after development but before etch, an after develop but before etch CD measurement can be used.

In an embodiment, the overall process contribution can effectively be determined once and used for various CD estimates and thus the amount of metrology can be significantly reduced compared to measuring each substrate. In an embodiment, the patterned substrate focus metrology data can be obtained by relatively sparse sampling of locations on the substrate (e.g., 500 targets or less on a substrate) and/or of the number of substrates from one or more lots (e.g., 10 or less substrates from a lot of 25 or more substrates).

The overall process contribution is then stored for use in on-product estimations of CD. The overall process contribution can be determined for a particular and/or multiple apparatus configurations (e.g., one or more specific etch chambers, one or more specific combinations of etch chamber and bake plate, one or more specific combinations of substrate table and etch chamber, etc.).

Then, similar to the focus estimation step described above, an estimation of on-product CD can be obtained. In an embodiment, the errors or residuals of one or more types of lithographic apparatus processing variables relevant to CD are obtained for a substrate of interest and the CD contribution thereof is determined. For example, the CD contribution of focus, focus blur and/or dose can be obtained for the substrate of interest. A further type of contribution that can be added is the CD contribution of patterning device errors attributable to the patterning device being used for the particular substrate of interest, which could be obtained by measurement.

Further, an applicable overall process contribution to CD, as described above, is obtained. Then, the applicable overall process contribution to CD is combined, similarly to as described above in respect of FIG. 9, with the one or more specific CD contributions of the substrate of interest to obtain an estimated CD fingerprint for the substrate of interest. So, an estimate of CD error can be determined at any, or almost any, location on any substrate.

Moreover, the estimate can be obtained for one or more specific pattern features of interest on a substrate, such as a hot spot. As noted above, the overall process contribution to CD was determined for a particular anchor feature, but can be scaled for the one or more specific features of interest. Further, the CD contribution of one or more types of lithographic apparatus processing variables (such as focus, focus blur and/or dose) can be computed based on an appropriate sensitivity for the one or more specific features between the CD variation and the one or more types of lithographic apparatus processing variables. Such sensitivity can be obtained, e.g., by simulation and/or experiment. Thus, multiple CD substrate fingerprints can be obtained, each for a different hot spot or other feature of interest of a pattern.

The methodology can be improved, e.g., with more parameters in one or more pertinent models, e.g., patterning device and/or aberration models. The methodology can be extended by, e.g., estimating the overall process contribution by breaking it up into different contributors, e.g. deposition, lithography, and/or etch with different sensitivities to different features.

In an embodiment, a dose correction applied as part of the patterning process can be corrected for in the results. For example, the lithocell may apply a dose correction using, for example, ASML's Dosemapper system. So, this correction is accounted for in the determination of the estimate of CD.

Turning now to an overlay example, data is used from at least two different pattern transfers onto the substrate. The techniques are similar to those described above in respect of the focus and CD examples.

This technique involves essentially two main parts. A first part is effectively a setup process to determine an underlying overlay contribution of the lithographic apparatus that is not reflected in one or more types of lithographic apparatus processing variables that are used to determine an estimate of overlay for a particular substrate in the estimation process. Optionally, an overall process overlay contribution can also be determined similar to the overall process CD contribution of the CD example discussed above. The second part is the estimation process of using an overlay contribution associated with those one or more types of lithographic apparatus processing variables for the substrate under consideration for each of the at least two pattern transfers to determine the estimate of overlay for the particular substrate.

So, in the setup process according to an embodiment, patterned substrate overlay metrology data is obtained for one or more substrates and then the contributions of one or more types of lithographic apparatus processing variables for each of at least two pattern transfers are removed similarly to as described above in FIG. 10. One type of contribution that can be removed is the overlay contribution of a substrate height map obtained, for example, from the levelling sensor of the lithographic apparatus. A difference can be found for the substrate height maps for two pattern transfers and then the difference can be converted to an overlay value and thus the overlay contribution. For example, the Z height difference can be turned into X and/or Y displacements by considering the height difference as a warpage or bend of the substrate and using first principles to calculate the X and/or Y displacements (e.g., the displacement can be the variation in Z versus the variation in X or Y times half the thickness of the substrate in, e.g., a clamped region of the substrate or the displacement can be calculated using Kirchoff-Love plate theory in, e.g., an unclamped region of the substrate). In an embodiment, the translation of the height to the overlay contribution can be determined through simulation, mathematical modelling and/or experimentation. So, by using such substrate height information per pattern transfer, the overlay impact due to a focus or chuck spot can be observed and accounted for.

A further type of contribution that can be removed is the overlay contribution of patterning device and/or substrate servo control (e.g., MA) in the X and/or Y directions (including rotation around Z), which can be obtained from the applicable positioner, a position measurement device (e.g., sensor IF) and/or a residual of a servo control model. A difference can be found for the servo control values across the substrate for two pattern transfers and then the difference can represent the overlay contribution. Where needed, the translation from servo control values to the overlay contribution can be determined through simulation, mathematical modelling and/or experimentation.

A further type of contribution that can be removed is the overlay contribution of projection system aberrations (which can be obtained, e.g., from a shearing interferometer) and/or projection system model residual. The translation from the aberrations and/or residual to the overlay contribution can be determined through simulation, mathematical modelling and/or experimentation.

A further type of contribution that can be removed is the overlay contribution of an alignment system model residual, which can be provided by the lithographic apparatus. The translation from the residual to the overlay contribution can be determined through simulation, mathematical modelling and/or experimentation. In an embodiment, the alignment system model residual can be different for different pattern transfer steps and thus a combination/difference of the alignment system model residuals for the different pattern transfer steps can be used to obtain the overlay contribution. In an embodiment, the alignment model residual can be corrected for substrate height.

As needed, the contribution fingerprints can be re-gridded to a same grid. Similarly, the contribution fingerprints can be re-gridded to the patterned substrate metrology data, or vice versa.

In an embodiment, the underlying overlay contribution of the lithographic apparatus can effectively be determined once and used for various overlay estimates and thus the amount of metrology can be significantly reduced compared to measuring each substrate. In an embodiment, the patterned substrate overlay metrology data can be obtained by relatively sparse sampling of locations on the substrate (e.g., 500 targets or less on a substrate) and/or of the number of substrates from one or more lots (e.g., 10 or less substrates from a lot of 25 or more substrates).

In an embodiment, the patterned substrate overlay metrology data can be a measured overlay fingerprint of a monitor substrate as described above. Thus, data that is already being captured can be used. So, the measured overlay fingerprint can be corrected for the lithographic apparatus impact as derived from lithographic apparatus sensor information, such as the overlay contribution of the projection system, the overlay contribution of the substrate height, the overlay contribution of alignment model residual, and/or the overlay contribution of patterning device and/or substrate servo control, to arrive at the underlying overlay contribution of the lithographic apparatus. In an embodiment, the measured overlay fingerprint data would be captured once for a first pattern transfer of the product substrate and then captured against for a second pattern transfer (with rework of the monitor substrate between pattern transfers). In an embodiment, the patterned substrate overlay metrology data is an overlay delta fingerprint obtained from the difference between the overlay fingerprint measured from the one or more monitor substrates after the first pattern transfer and the overlay fingerprint measured from the one or more monitor substrates after the second pattern transfer. So, by exposing a set of monitor substrates at about the same time as product layers, the lithographic apparatus contribution to overlay in terms of short term drift can be quantified. That is, with then overlay delta fingerprint, the lithographic apparatus contribution on interfield overlay due to short term drift between the first and second pattern transfers can be obtained.

Optionally, where an after-etch overlay is desired, an etch process contribution to overlay can be determined, which is an overlay variation arising from the etching. To obtain the etch process overlay contribution, after-develop but before etch patterned substrate metrology data can be removed from after-etch patterned substrate metrology data to obtain the etch process overlay contribution. In an embodiment, the etch process overlay contribution can effectively be determined once and used for overlay estimates and thus the amount of metrology can be significantly reduced compared to measuring each substrate. In an embodiment, the patterned substrate overlay metrology data can be obtained by relatively sparse sampling of locations on the substrate (e.g., 500 targets or less on a substrate) and/or of the number of substrates from one or more lots (e.g., 10 or less substrates from a lot of 25 or more substrates). The etch process fingerprint induced at a first or second pattern transfer could be deduced with a delta fingerprint between after develop but before etch overlay measurement and after etch overlay measurement after etch of the other of the first or second pattern transfer, assuming the etch fingerprint after each pattern transfer is the same.

The underlying overlay contribution of the lithographic apparatus (and the optional etch process overlay contribution) is then stored for use in on-product estimations of overlay. The underlying overlay contribution of the lithographic apparatus can be determined for multiple lithographic apparatuses. The underlying overlay contribution of the lithographic apparatus can be determined for a particular combination of devices of the lithographic apparatus used. For example, the lithographic apparatus may have more than one substrate table on which the substrate could be exposed and so the underlying overlay contribution of the lithographic apparatus can be determined for a specific combination and/or multiple combinations of devices used. The etch process overlay contribution can be determined for a particular and/or multiple apparatus configurations (e.g., one or more specific etch chambers).

Then, for the on-product estimation, the errors or residuals of one or more types of lithographic apparatus processing variables relevant to overlay are obtained for a substrate of interest and the overlay contribution thereof is determined. For example, the overlay contribution of the projection system, the overlay contribution of the substrate height, the overlay contribution of alignment model residual, and/or the overlay contribution of patterning device and/or substrate servo control, to arrive at the underlying overlay contribution of the lithographic apparatus can be obtained for the substrate of interest. In an embodiment, only the overlay contribution of the substrate height is obtained.

Further, an applicable underlying overlay contribution of the lithographic apparatus, as described above, is obtained and optionally the applicable etch process overlay contribution is obtained. Then, the applicable underlying overlay contribution of the lithographic apparatus (and optionally the optional etch process overlay contribution) is combined, similarly to as described above in respect of FIG. 9, with the one or more specific overlay contributions of the substrate of interest to obtain an estimated overlay fingerprint for the substrate of interest. So, an estimate of overlay can be determined at any almost location on any substrate.

In an embodiment, an overlay correction applied as part of the patterning process can be corrected for in the results. For example, the lithocell may apply an overlay correction, e.g., based on the measurements of the monitor substrates using, for example, ASML's Baseliner system. So, this correction is accounted for in the determination of the estimate of overlay.

In an embodiment, in a multiple patterning process, it is desirable that both exposure and lithographic apparatus conditions, e.g., exposure dose, patterning device transmission, patterning device qualification errors, illumination settings, lithographic apparatus substrate clamping errors, etc., are very similar between the first and second pattern transfer steps. Furthermore, the exposure and heating signature at intrafield level would be expected to be similar between the first and second pattern transfer steps and therefore such effects on overlay should be small.

Further, in an embodiment, a plurality of the predictions can be combined. For example, an overlay prediction and CD prediction can be combined. For example, in a multiple patterning situation that creates structures adjacent each other using different pattern transfer steps and those structures have a gap between them, a combination of the CD one or more of the different pattern transfer steps as well as an overlay for the different pattern transfer steps can give a better prediction of a size of the gap than an overlay or CD estimate alone.

Figure 11:
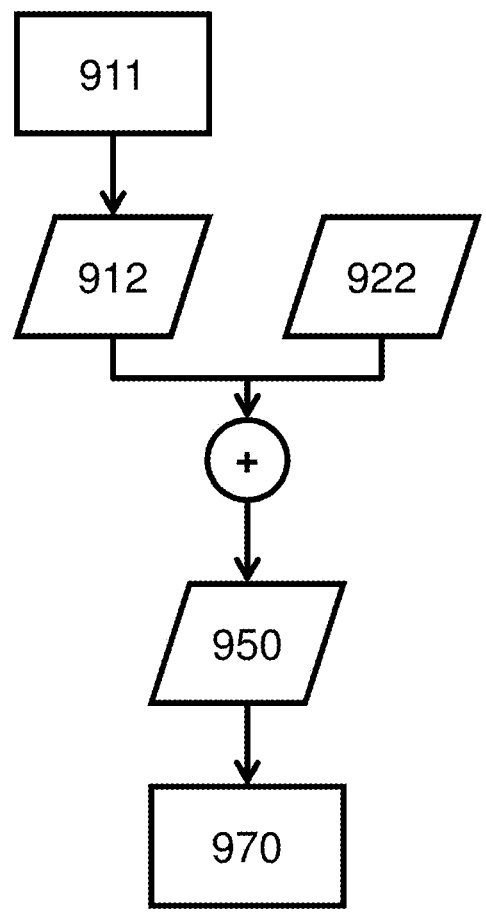
FIG. 11 schematically shows a flow for a method, according to an embodiment.

FIG. 11 then schematically shows a flow for a method, according to an embodiment. In particular, it shows how a generalized contribution, such as the underlying focus contribution of the lithographic apparatus, the overall process contribution to CD, and/or the underlying overlay contribution of the lithographic apparatus (and optionally the applicable etch process overlay contribution), can be applied to specific information for a substrate of interest to obtain an estimate of a parameter of interest for the substrate. So, contribution 912 corresponding to one or more processing variables of a particular substrate and, e.g., for a hot spot. This can be determined by modeling, from device information, etc. Further, a contribution 922 applicable to a plurality of substrates, such as the underlying focus contribution of the lithographic apparatus, the overall process contribution to CD, and/or the underlying overlay contribution of the lithographic apparatus (and optionally the applicable etch process overlay contribution), is obtained. The contribution 922 may be obtained used any of the techniques described herein. The contribution 912 may be determined for a plurality of substrates (e.g., for every substrate of interest) while the contribution 922 may be used repeatedly across many substrates. The contribution 912 and the contribution 922 are combined to obtain an estimate 950 of the parameter of interest for, e.g., a hot spot, without necessarily requiring obtaining patterned substrate metrology data for the hot spot. In procedure 970, an action is taken, such as whether there is a defect at the hot spot, is determined based on the estimate of the parameter of interest.

Thus, device sensor data can be exploited to enhance in-resist and/or after etch metrology to obtain a computed metrology that can, for example, provide dense metrology per substrate without having to have dense sampling of substrates and/or providing metrology for many, if not every, substrate without having to obtain patterned substrate metrology data for each such substrate. Further, the dense computed metrology can enable, for example, higher order corrections. The computed metrology can also enable greater control, including possibly per substrate control, without having to obtain patterned substrate metrology data for each such substrate and/or without having to measure patterned substrate metrology data densely on substrates.

Moreover, the estimates from these computed metrology technique can enable various applications, such as patterning process control (e.g., adjustment of one or more process variables), patterning processing monitoring, fault detection, defect prediction, patterning process design, etc.

In an embodiment, a derived contribution (such as derived using FIG. 10) can be used to parameterize a mathematical model for determining the contribution of change of one or more processing variables to a parameter of interest. That is, a mathematical model can be fitted against the derived contribution, thereby obtaining the values of one or more parameters, constants, etc. of the mathematical model. So, as an example, it is desirable to have a model and any sensitivities represented in the model to adapt to changes in a process and/or substrate stack. So, in an embodiment, a predicted substrate fingerprint for every substrate that will be measured can be generated. For this, a model of a parameter of interest can be established, e.g., for CD, a model comprising $CD=a1*DOSE+a2*FOCUS^2+a3*MSDx+a4*MSDy+a5*MSDz+\ldots$. With measurement of a substrate, the pre- and/or post-process (e.g., track/etch) fingerprint and the patterning device fingerprint can be removed. The remaining fingerprint measurements can be compared to the predicted values. In this situation, there are now a set of equations (as many equations as measurement points) where the CD, dose, focus, MSD-xyz, aberrations, etc. are known. This set of equations can be solved for the sensitivities (a1, a2, . . . ) that are desired. When this is performed for a number of substrates measured for a certain device pattern, there will be plenty of data to re-estimate the sensitivities desired. If data from multiple lithographic apparatuses are used and/or data from focus exposure matrix exposures are used in the same fashion, sufficient variation in the input signals (e.g., focus, dose, MSD, CD, etc.) can enable proper estimation of sensitivities. Further, the technique can be applied to other parameters of interest such as depth of focus, exposure latitude, overlay, edge position, etc.

In an embodiment, a training algorithm could be used to add further accuracy. For example, when the sensitivities for aberration are solved, a boundary condition can be taken into account that the aberration can only vary over the slit and pre-filter the CD (or overlay) data before fitting these sensitivities. In an embodiment, the sensitivities can become robust against variations in the patterning process by re-assessing them from time to time or continuously.

Referring back to FIG. 6 and its associated description, in an embodiment, one or more of the variables in the parameterized model 206 can have a stronger impact on the computed radiation distribution than one or more other variables. For example, a small percentage change of one or more variables may result in a significant difference in the computed radiation distribution. Such a variable may be referred to as a strong variable. A strong variable may include, but is not limited to, a critical dimension of a feature. On the other hand, a significant percentage change of one or more other variables may result in a small difference in the computed radiation distribution. Such a variable may be referred to as a weak variable. A weak variable may include, but is not limited to, the sidewall angle of a feature, a height of a feature, a thickness of a layer, resist loss during development, footing of a feature, a refractive index of a layer, an absorption of a layer, and/or an extinction coefficient of the layer.

Both strong and weak variables in the parameterized model 206 may be used by a user (e.g., a human, a control system, etc.) for evaluating one or more steps of the patterning process. Specifically, one or more weak variables may be useful to determine whether there is a defect on the target 30' or other pattern, which can be used in one or more processes upstream, or downstream, to the pattern transfer in a lithography apparatus, such as spin coating, PEB, development, etching, deposition, doping, and/or packaging. For example, when the sidewall angle of a pattern on the substrate exceeds a certain threshold, one or more defects may likely be produced during subsequent etching. As such, a defect likely due to etching may be predicted before the etching process takes place based on a value of sidewall angle of the pattern on the substrate. Such examples are non-limiting.

However, it is challenging to determine the values of the weak variables based on the measurement directly. This is because the signals that may be used to determine the values of the weak variables in the inspection system are usually quite weak, and sometimes, too weak to be detected. In addition, it is difficult to provide a certain level of the accuracy of determining the values of weak variables particularly when there are many variables in the parameterized model and the values of the strong variables are unknown.

In order to obtain more accurate values of one or more weak variables for various uses (e.g., to predict a defect) through a reconstruction process as described in FIG. 6, it is desirable to determine the values of the one or more strong variables (e.g., a CD) in the parameterized model outside of the reconstruction process per se.

Figure 12:
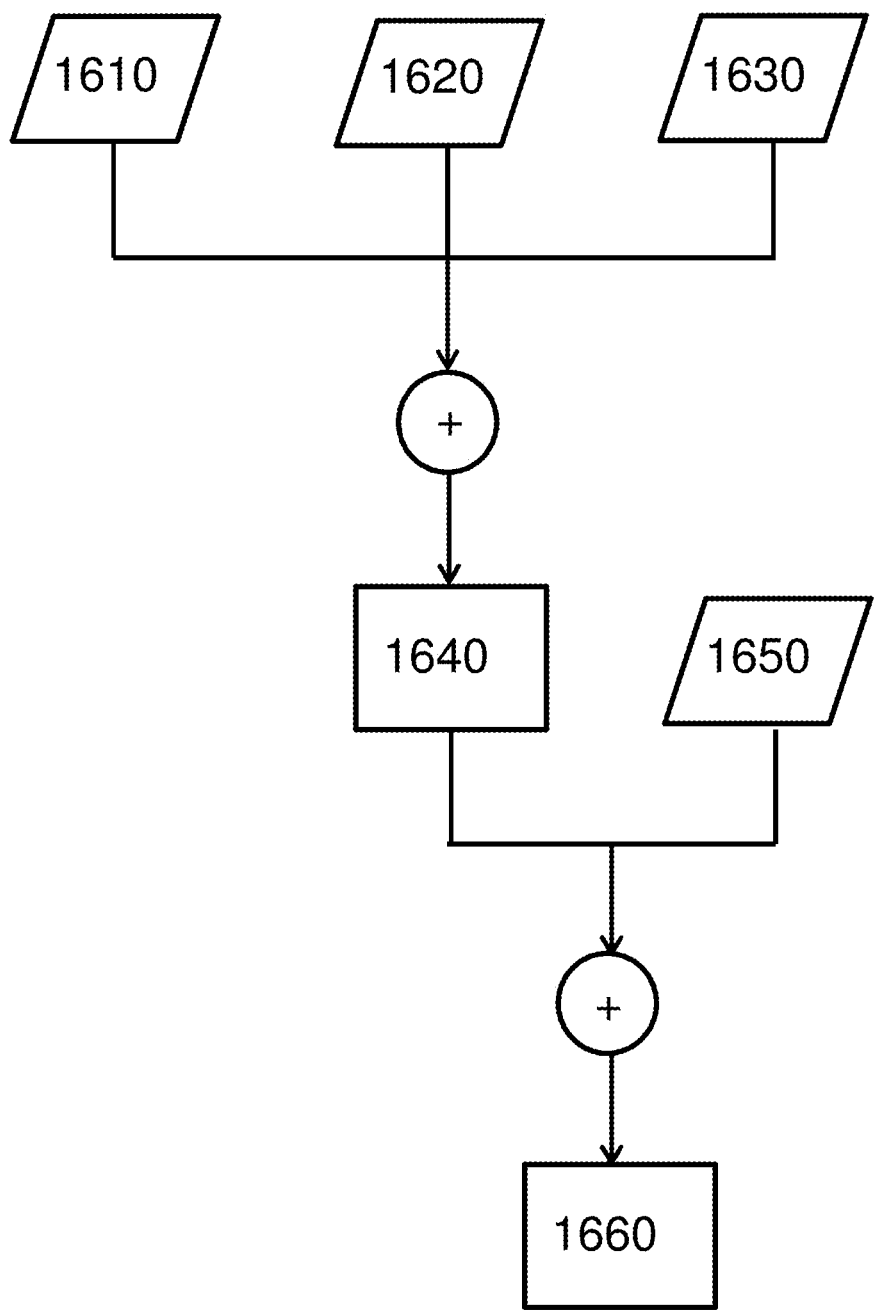
FIG. 12 schematically shows a flow for a method, according to an embodiment.

FIG. 12 shows a flow of a method to determine values of a strong variable on a substrate (which can avoid performing metrology of the strong variable on the substrate) according to an embodiment. The process can be applied to obtain values of a plurality of different strong variables. As shown, a fingerprint of the strong variable 1640 for a substrate may be obtained by combining a first contribution 1610 from a first group of one or more variables related to the lithographic apparatus (such as focus, dose, MSD, aberration, pupil shape, etc. and which can be spatially specified per die/field and repeated across the substrate under application conditions or spatially specified across the substrate), a second contribution 1620 from a second group of one or more variables related to one or more fabrication processes prior to, or after, pattern transfer in the lithographic apparatus (such as etch, development, etc. and which can be spatially specified across the substrate), and a third contribution 1630 from a third group of one or more variables related to the patterning device used in the patterning process (such as mask CD, etc. and which can be spatially specified per die/field and repeated across the substrate under application conditions or spatially specified across the substrate). The fingerprint of the strong variable 1640 can be obtained for any specific portion of the substrate, such as the portion of target 30'.

The first group of one or more variables related to the lithographic apparatus may be one or more variables as described above. The first contribution 1610 may be lithographic apparatus specific; that is, the first contribution 1610 is specific to a certain actual lithographic apparatus. In an embodiment, the first contribution 1610 is not specific to a particular substrate (and so can be used across substrates). Thus, the first contribution 1610 may be pre-characterized and obtained from a database later for the reconstruction process. This first contribution 1610 can be applied to a specific substrate by combining it with data of the one or more variables for the specific substrate and a sensitivity relationship. The first contribution 1610 may be substrate specific. For example, the first contribution 1610 may be determined for each substrate or a specific group of substrates so that the fingerprint of the strong variable 1640 is specific to the substrate or group of substrates. Examples of the first group of variables may include, but is not limited to, variables of the illumination, projection system, focus, dose, bandwidth, exposure duration, a characteristic of high frequency stage movement (e.g., moving standard deviation (MSD) of movement of the substrate stage, moving average of the movement of the substrate stage, etc.), a high frequency laser bandwidth change (e.g., frequency, amplitude, etc.), a high frequency laser wavelength change, and/or flatness of the substrate.

The third group of one or more variables related to the patterning device may be one or more variables as described above. The third contribution 1630 may be pattern or patterning device specific; that is, the third contribution 1630 is specific to a certain actual patterning device or specific pattern to be provided by a patterning device. The third contribution 1630 can be substrate independent. Thus, the third contribution 1630 may be pre-characterized and obtained from a database later for the reconstruction process. Examples of the third group of variables may include, but is not limited to, mask CD, a shape and/or location of an assist feature, an adjustment applied by a resolution enhancement technique (RET), etc.

The second group of one or more variables related to one or more fabrication processes prior to, or after, pattern transfer in the lithographic apparatus may be one or more variables as described above. Like the first contribution 1610, the second contribution 1620 may be substrate independent or substrate dependent. In an embodiment, the second contribution 1620 may be used repeatedly across every substrate. Therefore, the second contribution 1620 may be pre-characterized and obtained from a database during the reconstruction process. Examples of the second group of one or more variables may include, but is not limited to, various characteristics of a process upstream or downstream to pattern transfer in the lithographic apparatus, such as spin coating, PEB, development, etching, deposition, doping, and/or packaging.

The first contribution 1610, the second contribution 1620 and/or the third contribution 1630 may be characterized by experimentation or taken from prior production data, e.g., using the flows of any of FIGS. 8-11. In an embodiment, the third contribution 1630 (i.e., the patterning device fingerprint) may be obtained by measuring the patterning device directly using a patterning device metrology tool.

After the fingerprint 1640 of the strong variable is determined, a value of the strong variable 1660 may be obtained by combining the fingerprint 1640 of the strong variable and a certain value 1650 of the strong variable. In an embodiment, the certain value of the strong variable can be a nominal design value. In an embodiment, the strong variable may be an average of a group of measurements of the strong variable on the substrate. The group of measurements of the strong variable may be performed with respect to a same feature in two or more dies on the substrate.

Given the values of one or more strong variables in the parameterized model (e.g., by fixing the values of the one or more strong variables, or restricting the value of each of the one or more strong variables within a predetermined range (e.g., within 10%, within 5%, within 3%, within 1%), one or more weak variables may be adjusted until the computed radiation distribution is substantially similar to the measured radiation distribution, or a difference between the computed radiation distribution and the measured radiation distribution is within a predetermined tolerance threshold. When the computed radiation distribution is substantially similar to the measured radiation distribution, or the difference is within the predetermined tolerance threshold, values of the one or more weak variables may be output.

As described above, the values of one or more weak variables may be used to predict whether there would be a defect due to one or more downstream processes after exposure, e.g., PEB, development of a resist layer, etching, deposition, doping, and/or packaging. If a defect is predicted, a value of one or more of the variables of the first group of one or more variables, the second group of one or more variables, and/or the third group of one or more variables may be adjusted to obtain a new fingerprint of the strong variable. This is done so that a new set of values of one or more weak variables may be reconstructed using the process described above. Such adjustment may be performed iteratively until no defect is predicted based on a new set of values of the one or more weak variables.

In a further application of the contribution/fingerprint discussed above, a contour of a pattern can be predicted using one or more contributions/fingerprints. In this context, a contour is an outline of a shape of a feature of a pattern transferred to a substrate. A contour can be, for example, visualized by processing an image (e.g., scanning electron microscope image) of a substrate to extract the outer boundary of shape of a pattern feature transferred to the substrate. But a contour can also be generated by mathematical processes (e.g., simulation) to create an electronic representation of a pattern feature as it is expected to be transferred to the substrate. While a contour will typically be in the form of a line, the contour as used herein can be generalized more to data describing the boundary of the feature. The contour need not be continuous; that is, the outline and/or data can be discontinuous around the feature if the discontinuous outline and/or data sufficiently describes the boundary of the feature. In an embodiment, the contour can be two-dimensional (i.e., defined a plane) or three-dimensional. In an embodiment, the contour can extend in a plane substantially parallel to the surface of the substrate on which the pattern is formed. In an embodiment, the contour can extend in a plane substantially perpendicular to the surface of the substrate on which the pattern is formed; in which case it can be characterized as a profile and can be of two-dimensional or three-dimensional form.

Figure 13:
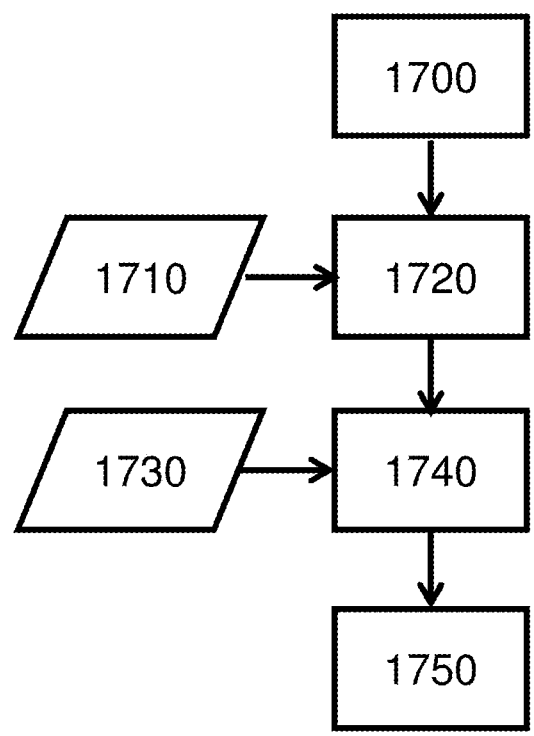
FIG. 13 schematically shows a flow for a method, according to an embodiment.

To predict the contour, one or more contributions/fingerprints can be obtained as described herein and used to select a certain nominal contour and/or modify a nominal contour, in order to arrive at a predicted contour. Referring to FIG. 13, an embodiment of a flowchart of a method of prediction of a contour is depicted. At 1700, a nominal contour of the feature of a pattern is determined. In an embodiment, the nominal contour is a contour as expected in resist. In an embodiment, the nominal contour is a contour as expected in a developed resist.

In an embodiment, the nominal contour can be obtained by mathematical calculation via a model and/or simulation. In an embodiment, the simulator or model, e.g., a simulator such as ASML's Tachyon product, can determine an expected contour of a feature of a pattern at applicable design values for one or more processing variables for the patterning process of the feature. This contour obtained by calculation can then be designated as a nominal contour. Similarly, the simulator or model can determine contours at various different values of the one or more processing variables (e.g., one or more optical settings or conditions such as different focus settings or conditions, different dose settings or conditions, different projection system aberration settings or conditions, different illumination pupil shape settings or conditions, etc.) to obtain a plurality of contours of the feature, each contour at a different value of the one or more processing variables. These contours obtained by calculation can then be designated as nominal contours with each nominal contour associated with a different value of the one or more processing variables. In an embodiment, the nominal contours are determined for different focus settings or conditions and so each of the nominal contours can be associated with a different focus setting or condition (such as a certain variance from best focus). While the description below focuses on focus settings or conditions, the nominal contours can be determined for different settings or conditions than focus and can be determined for various combinations of settings or conditions.

In an embodiment, the impact of the one or more processing variables for which the nominal contour is determined on one or more other processing variables, is evaluated. In an embodiment, the one or more other processing variables evaluated are one or more processing variables that have impact on the shape and/or size of the contour. So, in an embodiment, where the nominal contour is determined for a focus setting, the impact of focus on one or more other processing variables (such as CD) is determined. In an embodiment, this impact can be determined using a focus exposure matrix (FEM) type process, wherein a certain pattern is evaluated at at least different focus settings or conditions. The CD at those different focus settings or conditions can then be determined so as to evaluate how much a change in CD is due to focus. In an embodiment, the impact described above can be determined experimentally using one or more processed substrates which are then measured by a metrology tool. In an embodiment, the impact described above can be determined using a simulator.

Additionally or alternatively to determining the nominal contour(s) by calculation, in an embodiment, the nominal contour(s) can be obtained by experiment. For example, the feature can be created on one or more substrates at applicable design values of one or more processing variables for the patterning process and then measured (e.g., using a scanning electron microscope) to derive the contour of the feature. This contour obtained by measurement can then be designated as a nominal contour. Additionally or alternatively, the feature can be created on one or more substrates at various different values of one or more processing variables (e.g., one or more optical settings or conditions as discussed above) and then measured (e.g., using a scanning electron microscope) to derive a plurality of contours of the feature, each contour at a different value of the one or more processing variables. These contours obtained by measurement can then be designated as nominal contours with each nominal contour associated with a different value of the one or more processing variables. So, as a particular example, each of the nominal contours can be associated with a different focus setting or condition (such as a certain variance from best focus).

So, in an embodiment, the nominal contour(s) can provide an indication of the shape of the contour. For example, the nominal contour(s) can provide an indication of the shape of the contour at a particular focus condition. So, in the case of multiple nominal contours obtained a plurality of different focus conditions, each nominal contour can provide an indication of the shape of the predicted contour at the applicable focus condition.

Thus, in an embodiment and as will be discussed further, with nominal contours that are each associated with a different value of one or more processing variables (e.g., focus), the shape of a contour can be predicted, for any value of the one or more processing variables, by reference to the nominal contours. Where a nominal contour is not available for a particular value of the one or more processing variables, a contour can be generated by interpolation, extrapolation, etc. So, as an example, for any focus value on a certain location on a substrate, the shape of the contour of the applicable pattern feature(s) of interest can be predicted.

So, at 1710, a first contribution/fingerprint can be obtained for the one or more processing variables for which the nominal contour(s) has been determined. The first contribution/fingerprint can be obtained using any of the techniques described herein. In an embodiment, the first contribution/fingerprint corresponds to a situation prior to etch.

Figure 14:
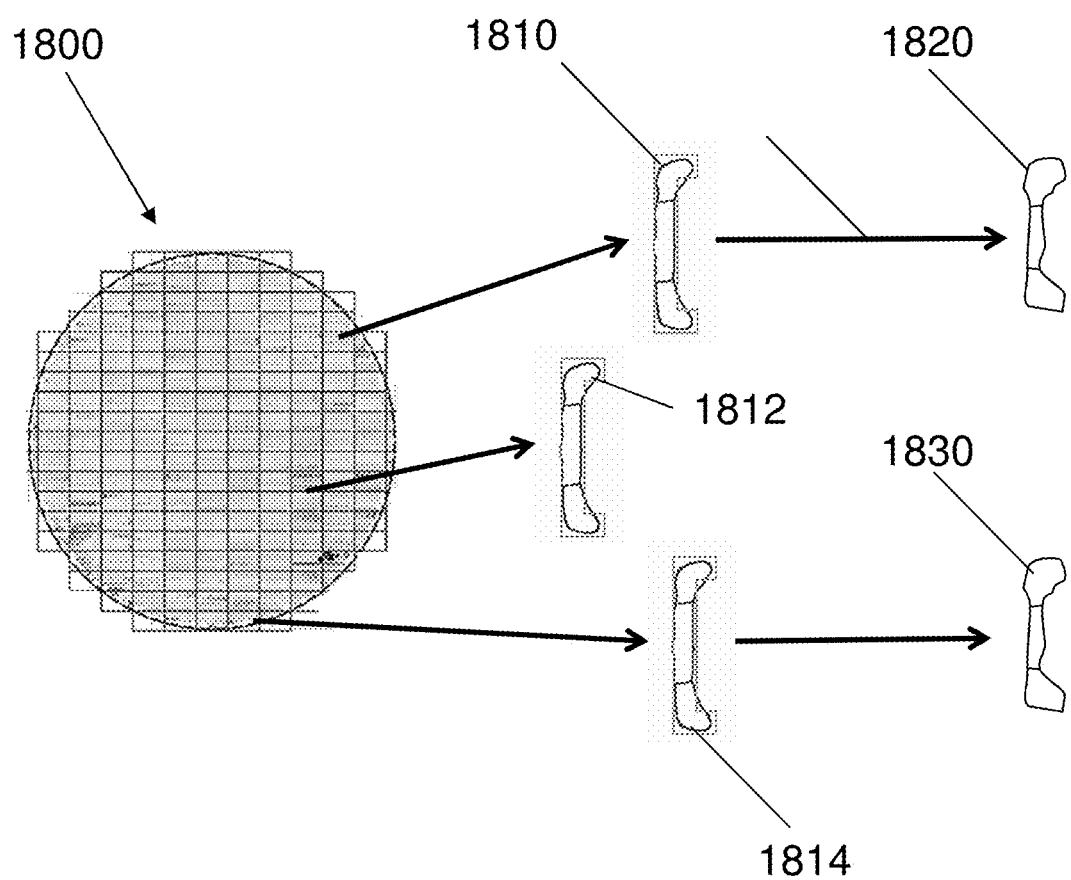
FIG. 14 schematically depicts an example contribution/fingerprint and an embodiment of selection of a contour.

In an embodiment, the first contribution/fingerprint is of focus and thus, in an embodiment, the first contribution/fingerprint is an across substrate focus map. In an embodiment, the first contribution/fingerprint can be generated based on data obtained from the lithographic apparatus used to pattern the substrate. For example, the lithographic apparatus can provide focus information (e.g., focus residual errors, etc.) and/or a characteristic of high frequency stage movement (e.g., MSD) to construct the focus map. FIG. 14 shows an example focus map 1800 for a patterning process, wherein different shades schematically represent different variances from a nominal focus (e.g., best focus, an average focus, etc.).

At 1720, the first contribution/fingerprint 1710 is used to select a nominal contour for a feature of interest. For example, at a particular location on the substrate and for a particular feature of interest, a value for the one or more processing variables for which the nominal contour(s) has been determined, can be determined from the first contribution/fingerprint 1710 and then used to select the associated nominal contour(s). Thus, in an example, where the first contribution/fingerprint 1710 is a focus map, the focus estimate at a substrate location within the focus map can be used to obtain the associated nominal contour as a prediction of the contour. Thus, a predicted contour can be determined per feature and per substrate location.

Referring to FIG. 14 again, an example of such selection is depicted. In FIG. 14, nominal contours 1810, 1812, 1814 at best focus are shown. Now, at the location on the focus map 1800 associated with nominal contour 1812, the focus map indicates that focus was at or near best focus. Accordingly, for that location, the nominal contour 1812 would be selected as a predicted contour. For the location associated with nominal contour 1810, the focus map indicates that focus was at a negative defocus −F. So, in that case, instead of using the nominal contour 1810, a nominal contour determined for negative defocus −F, namely nominal contour 1820 would be selected. As seen in FIG. 14, the nominal contour 1820 has the characteristics of the feature but has a different shape due to negative defocus −F. Similarly, for the location associated with nominal contour 1814, the focus map indicates that focus was at a positive defocus +F. So, in that case, instead of using the nominal contour 1814, a nominal contour determined for positive defocus +F, namely nominal contour 1830 would be selected. As seen in FIG. 14, the nominal contour 1830 has the characteristics of the feature but has a different shape due to positive defocus +F. Thus, with a focus of −F, the nominal contour at best focus changes shape and similarly, with a focus of +F, the nominal contour at best focus changes shape. So, for example, if F is variance from best focus and +F and −F have the same absolute value, then the respective contour shape changes may be the same as shown in FIG. 14.

Referring back to FIG. 13, at 1730, a second contribution/fingerprint can be obtained for one or more processing variables other than the one or more processing variables for which the nominal contour(s) has been determined. The second contribution/fingerprint 1730 can be obtained using any of the techniques described herein. In an embodiment, the second contribution/fingerprint corresponds to a situation post-etch.

Figure 15:
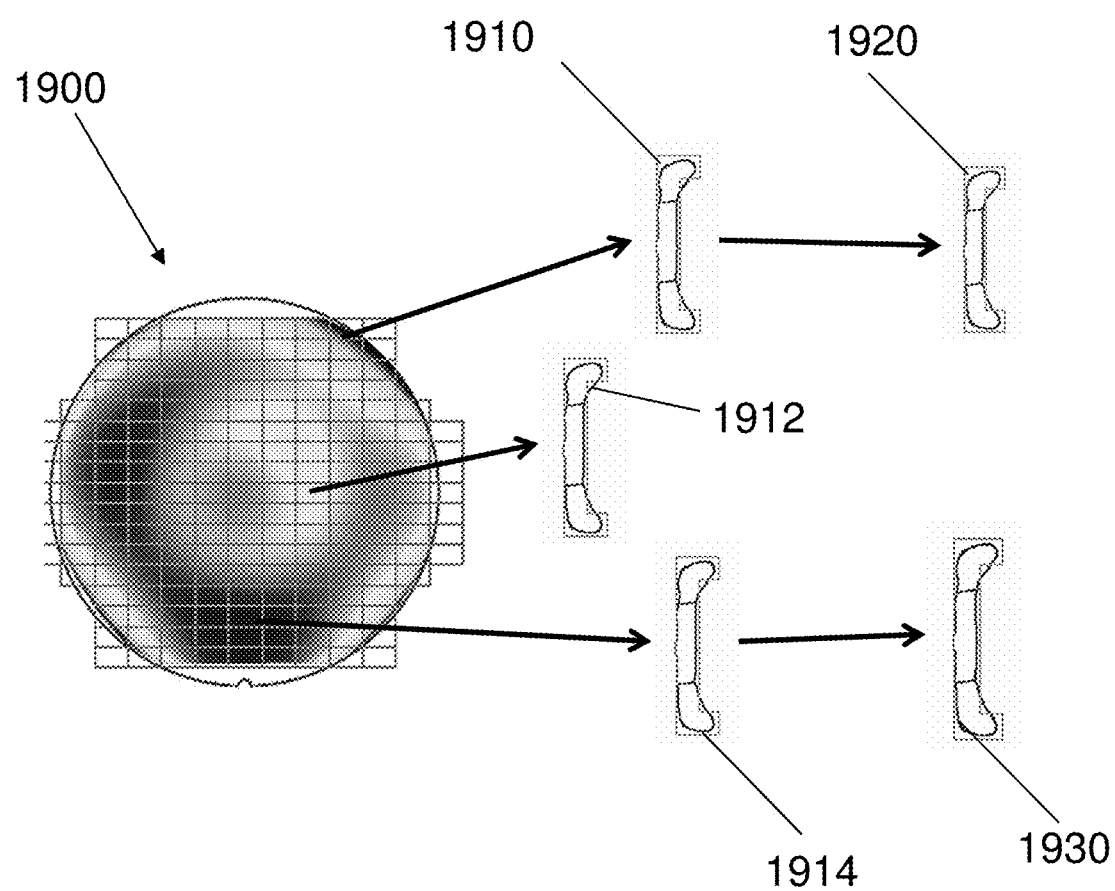
FIG. 15 schematically depicts an example contribution/fingerprint and an embodiment of modification of a contour.

In an embodiment, the second contribution/fingerprint 1730 is of critical dimension and thus, in an embodiment, the second contribution/fingerprint is an across substrate critical dimension map (e.g., critical dimension uniformity map). In an embodiment, the contribution/fingerprint can be generated based on data measured, using a metrology tool, on one or more substrates having the pattern after the etching step of the patterning process. FIG. 15 shows an example critical dimension map 1900 for a patterning process, wherein different shades schematically represent different variances from a nominal critical dimension (e.g., design critical dimension, an average critical dimension, etc.). So, for example, critical dimension map 1800 can represent critical dimension measured on an anchor aspect and plotted as a % of average critical dimension.

In an embodiment, the second contribution/fingerprint is corrected for the impact of the one or more processing variables associated with the first contribution/fingerprint on the one or more processing variables of the second contribution/fingerprint. So, for example, wherein the first contribution/fingerprint is a focus map and the second contribution/fingerprint is a critical dimension map, the second contribution/fingerprint can be corrected for the impact of focus (e.g., the focus information (e.g., focus residual errors, etc.) and/or a characteristic of high frequency stage movement)) on the critical dimension in the second contribution/fingerprint. Details of determining such an impact were described above. For example, a FEM can be used to isolate the focus impact on CD arising during the pattern transfer step and then remove that impact from after-etch CD measurements. Additionally or alternatively, various lithographic apparatus signals can be processed to arrive at an estimate of the focus during pattern transfer and its impact on CD and then remove that impact from after-etch CD measurements. As will be appreciated, the correction can be made in various ways, including incorporating the correction directly into the second contribution/fingerprint, making a correction after a value is selected from the second contribution/fingerprint as discussed below in relation to 1740, etc.

At 1740, the second contribution/fingerprint 1730 is used to modify a nominal contour for a feature of interest. In an embodiment, the nominal contour is the nominal contour selected at 1720. However, the selection at 1720 could be skipped (but the modification performed) if a given nominal contour is already selected for the feature of interest without using the selection step at 1720. Similarly, the modification at 1740 could be skipped if a nominal contour is selected at step 1720 and it doesn't require modification.

So, at 1740, for example, at a particular location on the substrate and for a particular feature of interest, a value for the one or more other processing variables is obtained from the second contribution/fingerprint 1730 and the value is then used to determine an appropriate modification of the nominal contour. In an embodiment, the modification is a change in size of the nominal contour. Thus, in an example, where the second contribution/fingerprint 1730 is a critical dimension map, the critical dimension estimate at a substrate location within the critical dimension map can be used to modify the size of the nominal contour (e.g., the nominal contour selected at 1720) as a prediction of the contour. Thus, a predicted contour can be determined per feature and per substrate location.

In an embodiment, a value of one or more other processing variables obtained at a certain location from the second contribution/fingerprint 1730 is assumed to apply to the entire feature of interest. So, if the critical dimension of a feature represented in the second contribution/fingerprint 1730 deviates from a certain critical dimension (e.g., average critical dimension) by a certain amount (e.g., 5%), then all critical dimensions of any feature at the same location will deviate by the same amount. Thus, this assumption means that a complete contour is resized by the same amount as the deviation in critical dimension. So, assuming a complete contour size of feature at a certain location on the substrate changes relatively the same amount as the critical dimension of an anchor aspect at the same location that has been measured to obtain the second contribution/fingerprint 1730, then a nominal contour can be shrunk by x % when critical dimension decreases by x % and the nominal contour expands by x % when the critical dimension increases by x %. The change is provided uniformly across the whole contour.

Referring to FIG. 15 again, an example of such change in size is depicted. In FIG. 15, nominal contours 1910, 1912, 1914 are shown. Now, at the location on the critical dimension map 1900 associated with nominal contour 1912 (which can be selected using step 1720), the critical dimension map indicates that the critical dimension corresponds to a nominal critical dimension (e.g., design critical dimension, an average critical dimension, etc.) Accordingly, for that location, the nominal contour 1912 would be selected as a predicted contour. For the location associated with nominal contour 1910, the critical dimension map indicates that critical dimension was lower by a certain amount (e.g., −x %). So, in that case, instead of using the nominal contour 1910, the nominal contour 1910 is shrunken by the certain amount (e.g., −x %) to obtain predicted contour 1920. As seen in FIG. 15, the contour 1920 has the characteristics of the feature but has a smaller size due to the lower critical dimension. Similarly, for the location associated with nominal contour 1914, the critical dimension map indicates that critical dimension was higher by a certain amount (e.g., +x %). So, in that case, instead of using the nominal contour 1914, the nominal contour 1914 is increased in size by the certain amount (e.g., +x %) to obtain predicted contour 1930. As seen in FIG. 15, the contour 1930 has the characteristics of the feature but has a larger size due to the higher critical dimension. Thus, with a critical dimension of −x %, the nominal contour is uniformly shrunken but still retains its shape, and with a critical dimension of +x %, the nominal contour is uniformly increased in size but still retains its shape.

So, in an embodiment, given these two assumptions (namely that a value of a certain one or more processing variables (e.g., focus) can predict contour shape and a value of a certain one or more other processing variables (e.g., CD) can predict contour size), a contour shape and size can be predicted for feature based on a value selected from one or more contributions/fingerprints. In particular, for every location on a substrate, the complete contours for one or more features of interest can be predicted. In an embodiment, the feature of interest is a determined hot spot.

In a particular embodiment, a contour is predicted from critical dimension and focus measurements. In a particular embodiment, a contour is estimated using critical dimension and focus fingerprints.

At 1750, the predicted contour can be used in various applications. For example, the contour can be checked in of itself, or in relation to one or more other contours, to determine whether a defect is predicted (e.g., there can be made one or more checks for necking, bridging, line pull back, line thinning, overlapping, resist top loss, and/or resist undercut). This technique can be useful in particular, for example, for determining bridging defects. These defects are caused by two features touching each other, which can in principle happen at any point on the contours of two features (depending on the particular CD, focus, and/or overlay conditions at that location). Use of contours enables more robust evaluation of such defects compared with, e.g., evaluation of dimensions at cut lines on the adjacent features.

As another example, the contour can be used to evaluate edge placement position and/or error (which could also be used to identify a defect such as bridging). In effect, this technique can provide a computational form of metrology to determine edge placement error. For example, with a predicted contour, a "virtual" edge placement error can be predicted. This can be used, for example, in multi-patterning defect predictions that are edge placement error driven. Thus, edge placement error driven defects can be estimated using CD and focus fingerprints.

An example where the predicted contour can be used to determine a potential defect is in a spacer-and-cut layer process. An example of this is presented in FIGS. 16A-C. FIG. 16A depicts an example spacer-and-cut layer process wherein lines 2000 are "cut" using a pattern 2010. FIG. 16A depicts the nominal process where the lines 2000 and pattern 2010 are at the desired alignment, size, etc. The result of such a process would be a clean cut of the middle line 2000 by pattern 2010. Now, the process of FIG. 13 can be applied using the maps 1800 and 1900 shown schematically in FIG. 16 to arrive at a determination of the predicted contours of lines 2000 and pattern 2010. In this example, shown in FIG. 16B, it is determined that the contour of pattern 2010 has been predicted to increase in size (although in this example the shape has not changed but it could have), while the predicted contours of lines 2000 are as expected. Now, FIG. 16C shows the result if the predicted contour of pattern 2010 were used in the spacer-and-cut layer process. As seen at 2020, the pattern 2010 would undesirably cut a portion of the upper and lower lines 2000. Thus, in an embodiment, the predicted operation of the spacer-and-cut layer process could be flagged as producing a potential defect when pattern 2010 is used to cut lines 2000.

As another example, the predicted contour can be used to determine a potential defect in a litho-etch litho-etch (LELE) process. An example of this is presented in FIGS. 17A-C. FIG. 17A depicts an example litho-etch and litho-etch process wherein lines 2100 are created in a first litho-etch process and the pattern 2110 is interleaved with the lines 2100 through a second litho-etch process. FIG. 17A depicts the nominal process where the lines 2100 and pattern 2110 are at the desired alignment, size, etc. The result of such a process would be a designed separation between the pattern 2110 and the lines 2100. Now, the process of FIG. 13 can be applied using the maps 1800 and 1900 shown schematically in FIG. 17 to arrive at a determination of the predicted contours of lines 2100 and pattern 2110. In this example, shown in FIG. 17B, it is determined that the contour of pattern 2110 has been predicted to increase in size and change in shape, while the predicted contours of lines 2100 are as expected. Now, FIG. 17C shows the result if the predicted contour of pattern 2110 were used in the litho-etch and litho-etch process. As seen at 2120, the pattern 2110 would undesirably be too close to the lower line 2100 (e.g., the space between the features is below a certain threshold); that is it be an overlap area or violate a minimum distance requirement. This could result in a bridging defect. Further, the pattern 2110 could have a necking defect 2130 where the feature has changed in shape such that is has become too narrow (e.g., the width has gone below a threshold). Thus, in an embodiment, the predicted operation of the litho-etch and litho-etch process could be flagged as producing one or more potential defects when pattern 2110 is created in conjunction with lines 2100. Thus, in an embodiment, for defect prediction in a multiple exposure LELE type application, the predicted contour should be able to improve the prediction capability of necking and/or bridging defects compared to using only defect indicators/cut-lines.

In another possible use of the predicted contour, the predict contour can be used in model calibration, particularly calibration of an optical proximity correction model. The predicted contour enables the correction of etch fingerprints and/or focus fingerprints in measured gauges (contours). For example, this predicted contour can be used to calibrate a mask data preparation after-etch model.

Thus, in an embodiment, this technique enables contour prediction from a virtual substrate; thus, the technique combines metrology with computation in order to generate contours without having to measure them. In an embodiment, the technique enables prediction of variability in contours and edge placement error across a substrate, given appropriate fingerprints (e.g., an after etch critical dimension fingerprint and a lithographic apparatus focus fingerprint). In an embodiment, the technique enables better prediction capability for multi-patterning. In an embodiment, the technique enables pattern control by using edge placement optimization based on a predicted contour.

In a further embodiment, the techniques described herein can be applied to alignment measurement. As is known in the art, various alignment marks (e.g., in the form of diffraction gratings) are provided at least on the substrate and the patterning device (e.g., mask). Alignment marks can also be provided on other structures, such as the substrate table. The alignment marks are measured with an alignment sensor to determine the spatial position of one or more particular locations in a plane on a surface of the substrate and/or on the patterning device (including, e.g., a relative position between locations on the substrate and the patterning device). The measured spatial positions are used to facilitate proper positioning in, e.g., the X-Y plane of the transfer of the pattern onto the substrate, i.e., that the pattern is provided to the proper location on the patterning receiving surface of the substrate.

Such proper positioning is particularly significant where a pattern has been previously applied on the substrate and a subsequent pattern should be aligned with that prior pattern; misalignment of patterns can be characterized as an overlay error as described herein. To help facilitate proper alignment of a first device pattern with a subsequently applied second device pattern, an alignment mark for use in proper positioning of the second device pattern can be generated when the first device pattern is generated. For example, the patterning device pattern for generating the first device pattern can have one or more alignment mark patterns that are transferred to the substrate when the first device pattern is transferred to the substrate. So, those one or more alignment marks associated with the first device pattern are processed along with the first device pattern to generate an alignment mark structure in a layer in the substrate associated with the first device pattern. Then, when the second device pattern is desired to be applied, those one or more alignment marks associated with the first device pattern can be measured (often typically through one or more layers, such as resist, applied over top) to determine the location of, e.g., the first device pattern so that a second device pattern associated with the first device pattern can be accurately placed.

An accurate alignment helps assure good overlay performance and thereby high yield in production. But space constraints on a substrate designed for creating devices means that alignment marks cannot be provided everywhere on that substrate (after all, the large majority of that substrate should be used to apply patterns for generating devices). Further, time constraints limit the number of alignment marks per production substrate that can be measured during production while maintaining adequate throughput (e.g., number of production substrates processed per hour) of the manufacturing systems.

So, in a typical arrangement, a certain number of alignment marks are measured across the substrate (which will typically have a plurality of dies/fields spread across the substrate where a pattern is transferred from the patterning device) to provide fairly good spatial coverage across the substrate of the positions of locations on that substrate. In an example scheme, a substrate alignment metrology sequence can measure 20-100 alignment marks (locations) across the substrate. The result of those measurements captures a global fingerprint across the substrate with a relatively low spatial frequency per substrate. The measurement results are used in conjunction with an alignment mathematical model. The aim of the model is to represent deviations between the transferred positions of device pattern features compared with an ideal grid so that, e.g., appropriate corrections by an apparatus in the device manufacturing process can be made based on the output of the model. As will be appreciated, more alignment marks than 20-100 can be provided across the substrate but just 20-100 (e.g., 20-40) alignment marks are sampled due to, e.g., the throughput constraints. Further, all or a large portion of these sampled alignment marks can be provided in areas not usable for device patterns, e.g., in a scribe lane.

But this kind of relatively sparse sampling of alignment marks does not capture a substrate fingerprint with high spatial frequency. As a result, overlay performance may suffer.

In order to capture local effects (i.e., obtain a higher spatial frequency), an intrafield alignment scheme can be used. But, it can have one or more drawbacks. For example, relatively dense measurement of alignment marks would need to be performed, which is likely not possible to achieve without having an effect on throughput. Further, valuable in-die space would need to be occupied by alignment marks. And due to constraints (such as throughput), intrafield alignment may be limited to fewer parameters than that which can be corrected by an apparatus (e.g., the lithographic apparatus) in the device manufacturing process. For example, a model for intrafield alignment may be defined for 6 parameters (e.g., magnification of the patterning device pattern (M), rotation about the z axis (R), translation in x and y (Cx, Cy), magnification in the y direction (My), and scan skew (RI)) per field, even though the lithographic apparatus may be capable of correcting higher orders per device pattern transfer.

Thus, it would be desirable to have a denser alignment fingerprint, e.g., without having to perform more alignment mark measurements (such as a dense intrafield alignment). So, using the techniques described herein, a relatively dense alignment fingerprint (or a hybrid dense alignment map (HDAM)) is computed by combining measured alignment data with context information from relevant contributors to alignment. That is, as similarly described above in the context of other parameters such as overlay and CD, a combination of fingerprints can be combined to obtain a derived fingerprint for alignment.

In particular, in production, local effects, such as substrate height variation due to, e.g., contamination, projection system aberration, patterning device writing error (i.e., the error in creating a pattern on or by a patterning device such as an error in creating a pattern in an absorber layer of a mask), heating, process effects (such as chemical mechanical planarization (CMP), etch, etc.), etc., could cause displacement of at least part of an alignment mark (and of portions of the device pattern). One or more of those local effects can effectively have a fingerprint with a relatively high spatial frequency, but which may not be captured by a typical alignment mark measurement sampling (which is constrained by, e.g., throughput and/or available die/field space for alignment marks) used in production.

So, in an embodiment, the alignment contribution of one or more of these local effects is determined and combined with an alignment measurement at a relatively low density to yield a higher density alignment fingerprint. The contributions to alignment of one or more of the various local effects can be derived from other metrology measurements in the lithocell (e.g., in the lithographic apparatus) and/or be computed/measured "offline" (that is, it need not be computed or measured during the processing of a particular substrate through the lithocell for which the HDAM is being determined).

Figure 18:
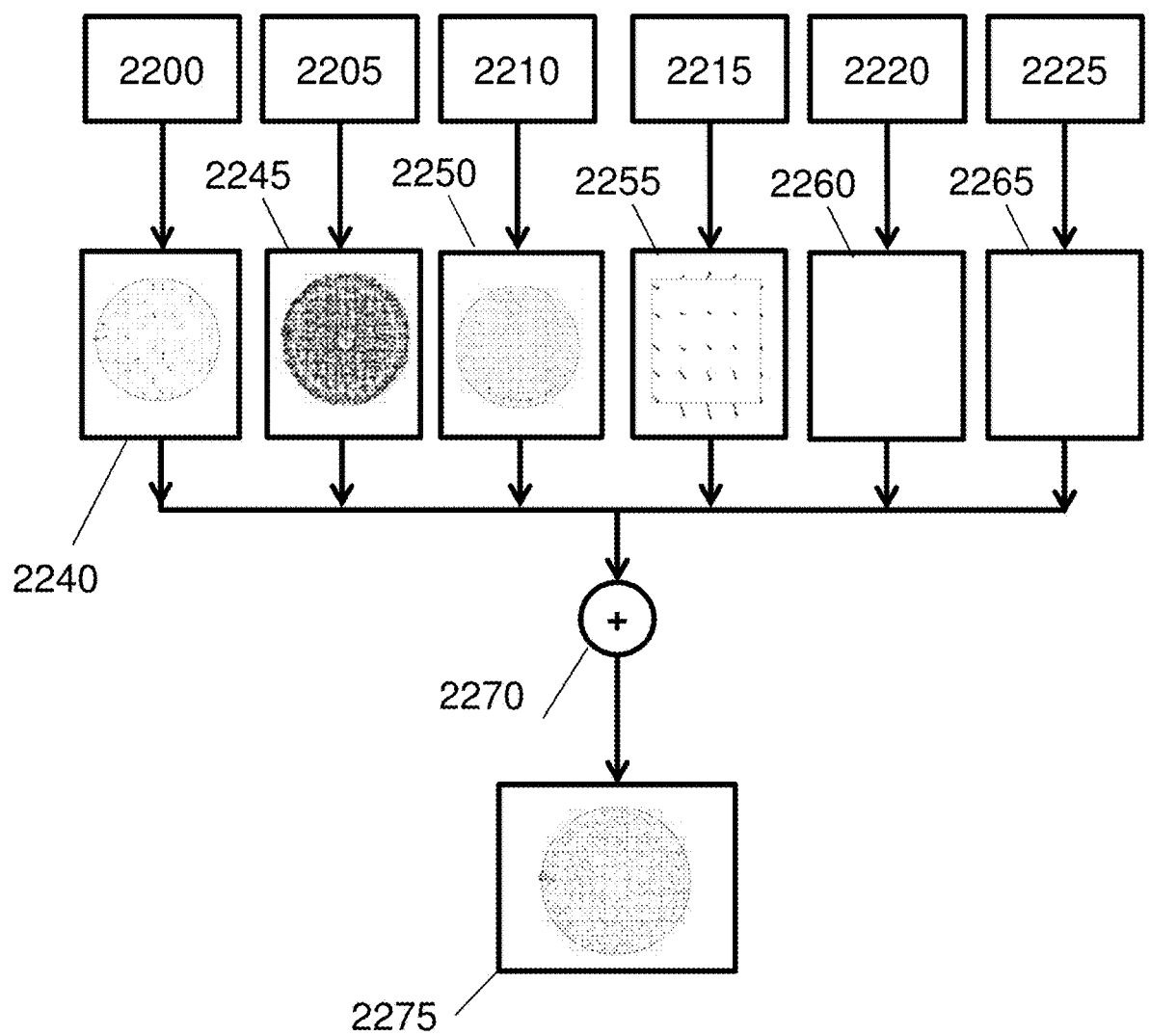
FIG. 18 schematically shows an example of deriving a combined contribution for alignment.

So, FIG. 18 schematically shows an example of obtaining a derived contribution 2275 to alignment of a substrate, the derived contribution being a combination of contributions (one or more of which may be a derived contribution) of multiple processing parameters. So, the derived contribution 2275 can be obtained using the measured contribution from an alignment mark measurement 2200 combined with the contribution of each of one or more processing parameters (e.g., local effect processing parameters) such as substrate height 2205 due to, e.g., contamination, one or more process effects 2210 (such as chemical mechanical planarization (CMP), etch, etc.), heating 2215 (e.g., of the patterning device due to an illumination beam to obtain the patterned beam for exposure of the substrate), projection system aberration 2220, and/or patterning device writing error 2225. Significantly, the processing parameter data can be obtained from the lithographic apparatus or other patterning process apparatus and can be a by-product of producing a substrate as part of a patterning process. None of the contributions associated with these one or more processing parameters necessarily requires a measurement of an alignment mark on the substrate using an alignment sensor.

So, in this alignment case, an example of the alignment fingerprint (A') of an alignment mark measurement 2200 is shown as contribution 2240, an example of the contribution to alignment of substrate height or unflatness (SH) 2205 is shown as contribution 2245 (the schematic depiction shows substrate height data across a substrate which data can be converted to a corresponding effect on alignment as described herein), an example of the contribution to alignment of one or more process effects (PE) 2210 (such as chemical mechanical planarization (CMP), etch, etc.) is shown as contribution 2250 (the schematic depiction shows one or process effects data (such as etch effect data) across a substrate which data, if needed, can be converted to a corresponding effect on alignment as described herein), an example of the contribution to alignment of heating (RH) 2215 is shown as contribution 2255 (the schematic depiction shows mask heating data across an exposure field of the mask which data can be converted to a corresponding effect on alignment at the substrate as described herein), an example of the contribution to alignment of projection system aberration (PA) 2220 is shown as contribution 2260, and an example of the contribution to alignment of patterning device writing error (RWE) 2225 is shown as contribution 2265. As will be appreciated, not all of these contributions 2245-2260 need to be combined with the contribution 2240; rather, one or more contributions 2245-2260 can be combined with the contribution 2240. The contributions can be obtained, as applicable, by simulation, mathematical modeling and/or measurement/experimentation. For example, the contributions can be obtained by simulation based on physical models, empirical modeling and/or dedicated measurements.

Each of one or more of these contributions 2245-2260 can be combined together 2270 with contribution 2240 to realize derived contribution 2275. While element 2270 shows a plus sign, the operation at 2270 need not be addition, e.g., it can be a multiplication, convolution, through use of a neural network etc. The operation may be different for one or more contributions than another one or more contributions (e.g., an addition of contribution 2245 and 2250 with contribution 2240 and a convolution of the sum with one or more contributions 2255 to 2265). In an example, the combined contribution to alignment can be expressed as $A(x,y)=A'(x,y)+b_1*F(SH)(x,y)+c_1*F(PE)(x,y)+d_1*F(RH)(x,y)+e_1*F(PA)(x,y)+f_1*F(RWE)(x,y)\ldots$. The various functions can be obtained by simulation, mathematical modeling and/or experimentation. Moreover, there may be cross terms that are not shown here (such as focus as a function of RH times PA, etc.). To obtain an absolute value of alignment, a nominal value or simulated value of the alignment can be combined with the contributions. The coefficients such as $b_1$, $c_1$, etc. are sensitivities of the alignment with respect to the respective processing parameters or their functions. Some of the contributions are across a substrate (e.g., process effects, substrate height or unflatness, etc.) but in an embodiment, one or more of the contributions may per die/field (which could then be repeated across the substrate depending on, e.g., applicable conditions at each of the instances) such as the contributions of heating (RH) 2215, projection system aberration (PA) 2220, and patterning device writing error (RWE) 2225. As noted above, the contribution 2275 may be characterized as a fingerprint since it can be spatially defined across the substrate/die/field. Further, the contribution's translation into an absolute value may be characterized as a fingerprint since it can be spatially defined across the substrate/die/field. As will be appreciated, data from processing of multiple substrates using the patterning process can be used to derive the respective contributions. This data can already be available since it could be the by-product of processing the substrates.

Returning back to examples of processing parameters related to the local effects, the contribution to alignment of substrate height or unflatness 2205 can be a levelling substrate height map converted to an in-plane displacement within the substrate (e.g., there can be more than 1000, more than 5000, more than 10,000, more than 20,000 or more than 50,000 points per substrate and thus corresponding in-plane displacements corresponding to an alignment contribution). The in-plane displacements affecting alignment and corresponding to a substrate height or unflatness can be obtained by simulation, mathematical modeling and/or measurement/experimentation. So, levelling measurements, which are sensitive to process induced contaminations, converted to in-plane displacement can be used to refine and enrich alignment measurements to a higher density. In an embodiment, the levelling measurements are those for the state of the substrate when an alignment measurement is made. So, in embodiment, the fingerprint associated with substrate height or unflatness may be specific to the particular substrate under consideration.

With particular technology, such as 3D-NAND, a levelling substrate height map could particularly probe alignment displacement at the intrafield level (e.g., a higher amount of levelling points are used), after removing one or more process dependency artefacts. As is known with an optical level sensor, different substrates, and different parts of a substrate, will interact differently with the measurement beams of radiation. In other words, the height measurements obtained by a level sensor are subject to process-dependent effects and do not always give the true height. In particular, an apparent surface depression is known to be caused when light reflected from the substrate is subject to so-called Goos-Haenchen shift. This effect is different for different materials and depends heavily on the structure and materials of several layers. Therefore the apparent surface depression can vary significantly from layer to layer, and between regions across the substrate. A heavily metallized region will reflect light more reliably than a region with predominantly dielectric material, for example. So, one or more techniques, such as described U.S. Pat. No. 7,265,364, United States Patent Application Publication No. US 2010/0233600 and United States Patent Application Publication No. US 2016-0370711, incorporated herein their entireties by reference, can be used to correct for and/or identify the one or process dependency artefacts for removal.

Another contribution due to a processing parameter related to a local effect is a fingerprint associated with one or more process effects (e.g., an effect on alignment marks due to etch, CMP and/or one or more other process steps) from processing other than the lithography pattern transfer step. Data of the one or more process effects can be determined using "offline" measurements using, e.g., a metrology apparatus as depicted and described with respect to FIGS. 3-6. In an embodiment, the fingerprint of the one or more process effects can be a derived contribution determined as described above. The in-plane displacements affecting alignment corresponding to one or more process effects can be obtained by simulation, mathematical modeling and/or measurements/experimentation. In an embodiment, the process effect data is associated with the creation of the alignment mark prior to when an alignment measurement is made for a particular lithography pattern transfer step based on that alignment mark. In an embodiment, the fingerprint associated with a process effect may not be dependent on the particular substrate processed if the substrate(s) under consideration is subject to the same process effect. But, in some case, the fingerprint associated with a process effect may be specific to a particular substrate where different substrates can be subject to different value of the process effect.

A further possible processing parameter is projection system aberration, which can induce a pattern shift. In an embodiment, the projection system aberration can be measured in the lithographic apparatus using a sensor (e.g., ASML's ILIAS sensor which is an interferometer type measurement apparatus used to measure aberrations and other parameters). In an embodiment, the projection system aberration for the alignment mark pattern shift is computed based on an aberration residual measured by a sensor. The in-plane displacements affecting alignment corresponding to the projection system aberration can be obtained by simulation, mathematical modeling and/or measurements/experimentation. In an embodiment, the projection system aberration data is associated with the creation of the alignment mark prior to when an alignment measurement is made for a particular lithography pattern transfer step based on that alignment mark. In an embodiment, the fingerprint associated with projection system aberration can be determined for the die/field and then repeatedly applied for one or more other dies/fields across the substrate. Thus, the fingerprint associated with projection system aberration may not be dependent on the particular substrate processed.

Heating is another possible processing parameter, which can induce a pattern shift. In an embodiment, the heating is the heating of the patterning device (e.g., mask) and/or the heating of the projection system. In an embodiment, the heating is due to the extended exposure of the patterning device and/or projection system to illumination for pattern transfer. In an embodiment, the heating can be measured in the lithographic apparatus using a sensor (e.g., a temperature sensor). In an embodiment, the heating can be calculated based on first principles using one or more patterning device and/or projection system properties (e.g., thermal materials characteristics) and illumination dose and/or computed based on mathematical model calibrated with appropriate data derived from use of the lithographic apparatus. The in-plane displacements affecting alignment corresponding to heating can be obtained by simulation, mathematical modeling and/or measurement/experimentation. In an embodiment, the heating is associated with the creation of the alignment mark prior to when an alignment measurement is made for a particular lithography pattern transfer step based on that alignment mark. In an embodiment, the fingerprint associated with heating can be determined for the die/field and then repeatedly applied for one or more other dies/fields across the substrate. Thus, the fingerprint associated with heating may not be dependent on the particular substrate processed.

Patterning device writing error is a further possible processing parameter, which can induce a pattern shift. In an embodiment, the patterning device writing error is an error associated with forming the pattern in, or by, the patterning device itself. For example, a pattern in an absorber of mask may not be perfectly created and thus the variation from the designed pattern can be characterized as the patterning device writing error. In an embodiment, the patterning device writing error can be obtained by "offline" measurements using a metrology apparatus. The in-plane displacements affecting alignment corresponding to patterning device writing error can be obtained by simulation, mathematical modeling and/or measurement/experimentation. In an embodiment, the patterning device writing error is associated with the creation of the alignment mark prior to when an alignment measurement is made for a particular lithography pattern transfer step based on that alignment mark. In an embodiment, the fingerprint associated with patterning device writing error can be determined for the die/field and then repeatedly applied for one or more other dies/fields across the substrate. Thus, the fingerprint associated with patterning device writing error may not be dependent on the particular substrate processed.

Information regarding one or more other possible processing parameters, when available, can also or alternatively be included such as servo control (moving average (MA) and/or moving standard deviation (MSD) in X, Y and/or Z), patterning device shape (e.g., a bending in the Z direction), impact of a pellicle of patterning device, projection system reference axis variation, etc. The corresponding in-plane displacements affecting alignment can be obtained by simulation, mathematical modeling and/or measurement/experimentation. In an embodiment, one or more of the processing parameters (e.g., patterning device shape, impact of a pellicle, projection system reference axis, etc.) are associated with the creation of the alignment mark prior to when an alignment measurement is made for a particular lithography pattern transfer step based on that alignment mark. The information regarding these one or more other possible processing parameters can be derived from metrology measurement in the lithographic apparatus (or the lithocell), derived from "offline" metrology measurements, or determined by computation (e.g., simulation, calibrated mathematical model, first principles, etc.).

So, by combining alignment measurement data and an effect on alignment due to one or more processing parameters relating to local effects (which processing parameter data can be, e.g., lithographic apparatus or other lithocell metrology data and/or which can be process and application dependent), a hybrid dense alignment map (HDAM) can be computed that is a pre-lithography pattern transfer output for, e.g., control of the lithography pattern transfer. Since the hybrid dense alignment map uses data obtained from separate sources, this computational-based metrology can have an indication from the process and application's contribution separately.

Figure 19:
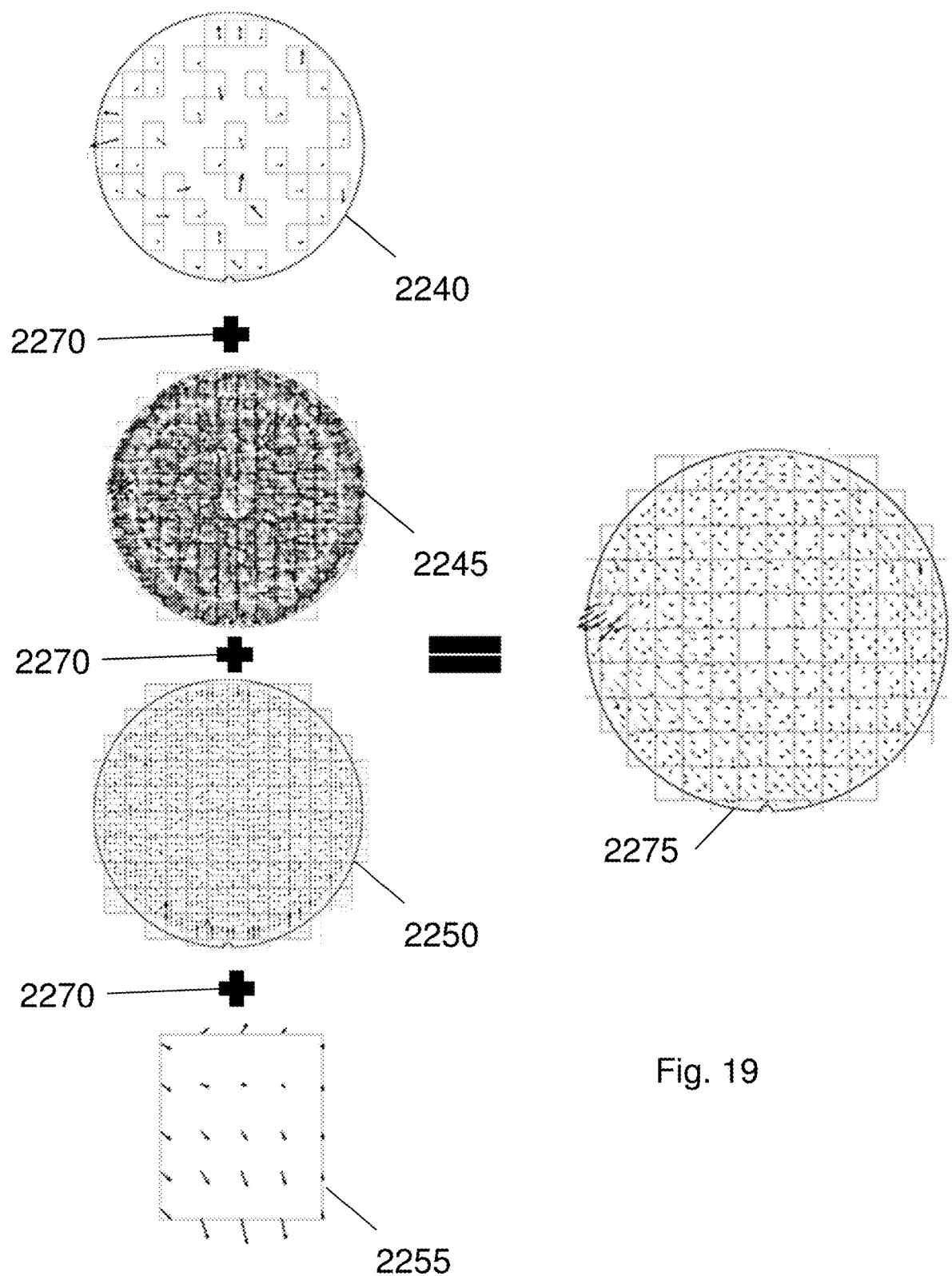
FIG. 19 schematically shows an example of deriving a combined contribution for alignment.

A specific, non-limiting example work flow to compute a HDAM is shown in FIG. 19. That is, FIG. 19 schematically shows an example of deriving a combined contribution for alignment, wherein the example HDAM 2275 is created using the first 4 inputs listed in the example work flow of FIG. 18. In this example, an alignment fingerprint 2240 of an alignment mark measurement of a particular substrate under consideration is combined with three other contributions that are not obtained by alignment measurement but rather converted into an effect on alignment as described above to obtain a HDAM 2275. The other 3 inputs are the contribution 2245 to alignment of substrate height or unflatness 2205 (the schematic depiction shows substrate height data across a substrate which data can be converted to a corresponding effect on alignment as described herein), a contribution 2250 to alignment of one or more process effects, such as chemical mechanical planarization (CMP), etch, etc. (the schematic depiction shows one or process effects data (such as etch effect data) across a substrate which data, if needed, can be converted to a corresponding effect on alignment as described herein), and a contribution 2255 to alignment of patterning device heating (the schematic depiction shows patterning device heating data across an exposure field of the mask which data can be converted to a corresponding effect on alignment at the substrate as described herein and which effect in the die/field can be repeated across the substrate). As will be appreciated, the various contributions can be re-gridded and/or scaled as appropriate to form the HDAM. Further, the density of the various contributions can be adjusted as desired to adjust the overall density of the HDAM. So, by combining alignment data with an alignment effect of one or more processing parameters, a computed alignment map can be created that is significantly denser than the alignment data alone.

The HDAM can be used for various purposes. An example use is as an input to a control of the patterning process. For example, the HDAM can be an input to control of the pattern transfer of the lithographic apparatus. In that respect, it can be used as an input for an interfield and/or intrafield substrate alignment model used for determining corrections in a lithographic apparatus. The combined dense alignment substrate map provides dense metrology information both at the interfield and intrafield level, and therefore could support usage of a high order substrate alignment model as part of the control loop than where the alignment data is used alone.

Figure 20:
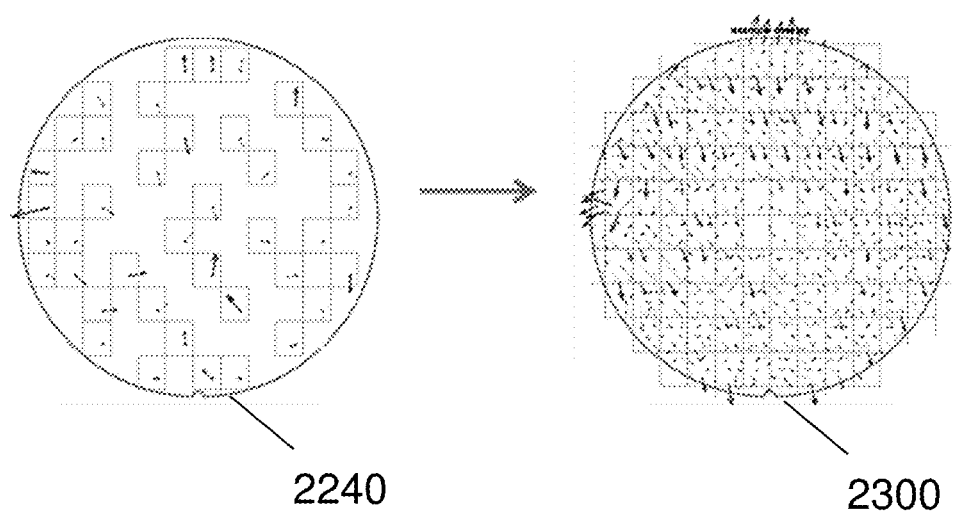
FIG. 20 schematically shows an example of how a patterning process corrected using a fingerprint determined according to an existing alignment measurement scheme translates to an overlay error fingerprint.
Figure 21:
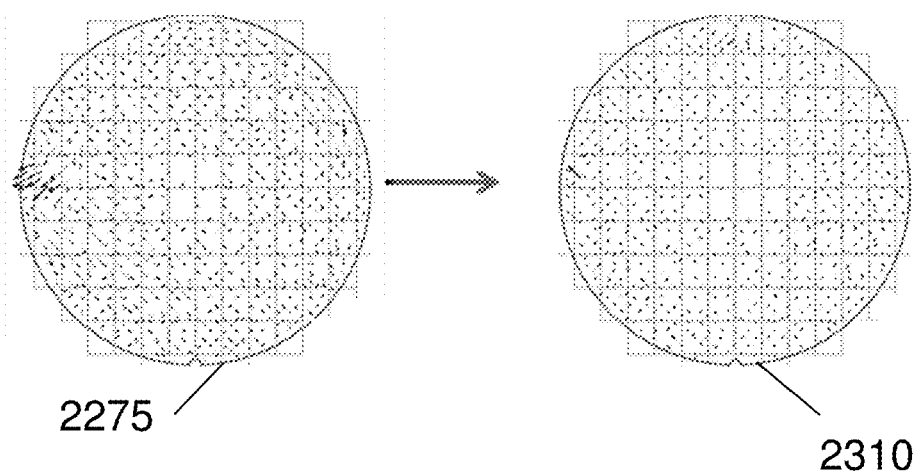
FIG. 21 schematically shows an example of how a patterning process corrected using a derived fingerprint of alignment computed as described herein translates to overlay error.

Depending on the use case and input data, the alignment density can be enhanced as desired both at the interfield and intrafield level. With such higher density metrology compared with a typical alignment technique used in production, a high order interfield and/or intrafield alignment model could have potentially higher accuracy for the model content (if with a high order alignment model), which in turn improves overlay performance at the per substrate level. For example, FIG. 20 schematically shows an example of how a patterning process corrected using a fingerprint determined according to an existing alignment measurement scheme translates to an overlay error fingerprint. The alignment fingerprint 2240 is obtained using an existing alignment measurement technique and used to correct the patterning process using an alignment model. The overlay fingerprint of the corrected patterning process is shown as 2300. As can be seen in the fingerprint 2300, there are quite a number of relatively high magnitude vectors showing that there are relatively significant overlay errors at various locations across the substrate. In comparison, FIG. 21 schematically shows an example of how a patterning process corrected using a derived fingerprint of alignment computed as described herein translates to overlay error. The derived fingerprint or HDAM 2275 is obtained using techniques described herein and used to correct the patterning process using an alignment model (which can be a higher order model than used for alignment fingerprint 2240 alone). In this example, the HDAM has a sampling of about 1000 locations per substrate, which is significantly higher than using alignment measurement alone during production (given the time constraints of production) and is significantly denser with greater on-device pattern coverage than using alignment measurement alone during production (given the in-die/field space constraints of the placement of alignment marks). The overlay fingerprint of the corrected patterning process is shown as 2310. As can be seen in the fingerprint 2310, there are very few relatively high magnitude vectors showing that there are few relatively significant overlay errors at various locations across the substrate. Indeed, in an example, compared with an existing alignment technique, the overlay can be significantly improved (e.g., overlay [mean plus three standard deviations] reduced from 4 nm to 1 nm) after high order corrections calculated from the output of the hybrid dense alignment metrology are used.

In an embodiment, a contribution or the HDAM can be analyzed to identify a possible significant alignment error or residual (e.g., due to a contamination issue). This can be done by, e.g., statistical analysis of the data, by application of a threshold against the data or both. If there is a significant alignment error, the metrology sampling can be re-distributed (e.g., increased, spatial concentrated, etc.) to enable improved computational metrology input and/or refine the complexity of the modelling (e.g., provide a higher order model), with a desired to, e.g., avoid unnecessary rework of a substrate and so enable improved operation of the patterning process. As an example, in the case of a dominant heating contribution at the substrate to substrate level, this computational metrology can help by providing a high metrology density at the intrafield level so that a higher order intrafield substrate alignment model can be used, without a throughput hit and without sacrificing in die space.

So, there is provided, in an embodiment, a computational based alignment metrology that can construct a hybrid dense alignment map based on data from other than an alignment measurement (e.g., data from measurements from other sensors in the patterning process such as data from measurements by a lithographic apparatus sensor other than the alignment sensor). The HDAM can be produced "inline" and can be produced prior to a lithography pattern transfer step in which the HDAM can be used for correction; this can enable use of the HDAM data in, e.g., a feedforward manner and for corrections just prior to or during pattern transfer. In an embodiment, the hybrid dense alignment map can be constructed based on measurements from "offline" metrology (e.g., patterning device writing error, process effect (such as an effect of CMP, etch, etc.) which can be combined with "inline" metrology such as an alignment measurement.

The computational based alignment metrology can construct a hybrid dense alignment map that has increased density of a substrate alignment fingerprint compared to just alignment measurement data and do so, e.g., without causing a decline in substrate processing throughput and/or without sacrificing space within a substrate field/die. The computational based alignment metrology can construct a hybrid dense alignment map that enables higher order intrafield alignment based on the hybrid dense alignment map compared to just alignment measurement data. In an embodiment, one or more of the contributions to the hybrid dense alignment map can be determined using a physical model, thereby can avoid model fitting. For example, a (offline) simulation or model based alignment fingerprint due to heating induced pattern shift can be calculated at the intrafield level, which can enable higher order intrafield substrate alignment to compensate for a dominant displacement at the substrate to substrate level. As a further example, a (offline) simulation or model based alignment fingerprint due to optical aberration induced pattern shift can be calculated to generate dense metrology data at the intrafield level, e.g., for usage of an intrafield substrate alignment model. As another example, a (offline) simulation or model based alignment fingerprint due to patterning device writing error induced pattern shift can be calculated to generate dense metrology data at the intrafield level, e.g., for usage of an intrafield substrate alignment model. Measurements of heating, optical aberration and/or patterning device writing error can be input to the determination of the respective alignment fingerprint.

An advantage of the HDAM is alignment metrology with a higher density compared with an existing alignment measurement process, which is able to, e.g., capture a substrate fingerprint at a higher spatial frequency than with the existing alignment measurement process. An additional or alternative advantage is that this computational metrology with multiple inputs (contributions) enables pre-lithography transfer clustering of errors and a capability to include multiple automatic process control threads with, e.g., different priority in the patterning process. An additional or alternative advantage is that his computational metrology can be performed "inline", i.e., during processing of a substrate and so can be suitable for feedforward correction and/or as a tool for identifying excursion of the process (so that the substrate can be reworked, scrapped, etc.). An additional or alternative advantage is that this computational metrology can enable determination of a more accurate capture of a substrate fingerprint of alignment due to the high sampling density. An additional or alternative advantage is that this computational metrology can enable improved overlay substrate to substrate performance due to a more accurate alignment input.

The results of the methods herein (or another result (e.g., a defect prediction) derived from the results of the methods herein) can be used for various purposes including control of a process in the patterning process or an apparatus therein, monitoring of substrates produced by the patterning process, design of a process or apparatus of the patterning process, etc. For example, the results or another result derived therefrom can be used to alter an apparatus or process of the patterning process for the further processing of the substrate or for the processing of another substrate. For example, the results can be used to predict a defect. Prediction of a defect can be used, for example, to control a metrology tool to inspect the affected area and/or alter an apparatus or process of the patterning process for the further processing of the substrate or for the processing of another substrate. Further, the results can be used to design the patterning process by, e.g., deriving a dose recipe for correction of the lithographic apparatus, enabling design of the patterning device and its pattern, setup of a process, etc. Further, the results can be used in model calibration, e.g., calibration of an optical proximity correction model, a source-mask optimization model, a lithographic manufacturing check model, a resist model, an imaging model, a measurement model (e.g., models the process of measuring), etc. The results can be used to determine one or more variables of a process (e.g., best exposure and/or best dose) which can then be used for various purposes. As will be appreciated, there can be many other uses.

In an embodiment, there is provided a method, comprising: determining a first distribution of a first parameter associated with an error or residual in performing a device manufacturing process; determining a second distribution of a second parameter associated with an error or residual in performing the device manufacturing process; and determining, by a hardware computer, a distribution of a parameter of interest associated with the device manufacturing process using a function operating on the first and second distributions.

In an embodiment, the first parameter, the second parameter and the parameter of interest are the same. In an embodiment, the first distribution is specific to the device manufacturing process but not specific to any particular substrate processed using the device manufacturing process. In an embodiment, the second distribution is specific to a particular substrate processed using the device manufacturing process but not generic to other substrates processed using the device manufacturing process. In an embodiment, the first distribution and/or second distribution comprises one or more selected from: a contribution of a servo error to the respective first and/or second parameter, a contribution of alignment model residual to the respective first and/or second parameter, a contribution of a projection system aberration or image plane deviation to the respective first and/or second parameter, a contribution of a projection system model residual to the respective first and/or second parameter, and/or a contribution of a substrate surface height to the respective first and/or second parameter. In an embodiment, determining the first distribution further comprises obtaining measured data of the first parameter and removing therefrom a contribution of a particular device of the device manufacturing process to the first parameter. In an embodiment, the contribution of the particular device comprises one or more selected from: a contribution of a servo error, a contribution of alignment model residual, a contribution of a projection system aberration or image plane deviation, a contribution of a projection system model residual, and/or a contribution of a substrate surface height. In an embodiment, the measured first parameter data comprises first parameter data measured from a monitor substrate. In an embodiment, the first distribution, the second distribution and/or the distribution of the parameter of interest comprises a spatial substrate fingerprint. In an embodiment, the method further comprises using the distribution of the parameter of interest to perform any one or more selected from: predict a defect for a substrate, control the device manufacturing process, monitor the device manufacturing process, design an aspect of the device manufacturing process, and/or calibrate a mathematical model. In an embodiment, the first parameter, the second parameter and/ or the parameter of interest is one or more selected from: overlay, CD, focus, dose, and/or edge position. In an embodiment, the device manufacturing process comprises a lithographic process and/or a semiconductor manufacturing process. In an embodiment, the function comprises one or more selected from: an arithmetic addition, a convolution and/or a neural network. In an embodiment, the first parameter and/or the second parameter is different than the parameter of interest and further comprising the first parameter and/or the second parameter to the parameter of interest. In an embodiment, the method further comprises determining the first distribution and/or the second distribution using data provided by a lithographic apparatus and/or etching apparatus used in the device manufacturing process.

In an embodiment, there is provided a method comprising: obtaining an underlying contribution of a lithographic apparatus to overlay as part of a patterning process; and combining, by a hardware computer, the underlying contribution with a further contribution to overlay of a substrate to obtain an estimate of overlay for the substrate.

In an embodiment, the further contribution comprises a contribution of a substrate surface height of the substrate to overlay. In an embodiment, the further contribution comprises a contribution of a substrate servo error of the substrate to overlay. In an embodiment, the further contribution comprises a contribution of an alignment and/or projection system model residual. In an embodiment, the method further comprises combining, with the underlying contribution and the contribution of the substrate surface height, a contribution of an etch process to overlay of the substrate. In an embodiment, the etch process contribution is specific to the patterning process but not specific to any particular substrate processed using the patterning process. In an embodiment, the underlying contribution is specific to a particular patterning process but not specific to any particular substrate processed using the patterning process. In an embodiment, obtaining the underlying contribution further comprises obtaining measured overlay data and removing therefrom a contribution of a particular component of the lithographic apparatus to overlay. In an embodiment, the contribution of the particular component comprises one or more selected from: a contribution of a servo error, a contribution of alignment model residual, a contribution of a projection system aberration, a contribution of a projection system model residual, and/or a contribution of a substrate surface height. In an embodiment, the measured overlay data comprises overlay data measured from a monitor substrate. In an embodiment, the contribution comprises a spatial substrate fingerprint. In an embodiment, the method further comprises using the estimate to perform any one or more selected from: predict a defect for the substrate, control the patterning process, monitor the patterning process, design an aspect of the patterning process, and/or calibrate a mathematical model.

In an embodiment, there is provided a method, comprising: determining a first distribution of measured alignment data in performing a device manufacturing process; determining a second distribution of alignment data derived from a processing parameter in the device manufacturing process; and determining, by a hardware computer system, a distribution of alignment data associated with the device manufacturing process as a function of the first and second distributions.

In an embodiment, the processing parameter comprises one or more selected from: a substrate height or unflatness, a process effect, optical element heating, optical aberration, and/or patterning device writing error. In an embodiment, the second distribution is derived from a plurality of processing parameters of the device manufacturing process. In an embodiment, the processing parameters comprise a substrate height or unflatness, a process effect, and optical element heating. In an embodiment, the second distribution is specific to the device manufacturing process but not specific to any particular substrate processed using the device manufacturing process. In an embodiment, the second distribution is specific to a particular substrate processed using the device manufacturing process but not generic to other substrates processed using the device manufacturing process. In an embodiment, the second distribution is derived from a measurement of the processing parameter. In an embodiment, the method further comprises using the distribution of alignment data to perform any one or more selected from: predict a defect for a substrate, control the device manufacturing process, monitor the device manufacturing process, design an aspect of the device manufacturing process, and/or calibrate a mathematical model. In an embodiment, the method further comprises altering a sampling of metrology data based on the distribution of alignment data. In an embodiment, the method further comprises using a higher order alignment model with the distribution of alignment data compared to that used with only the measured alignment data. In an embodiment, the method further comprises determining the first distribution and/or the second distribution using data provided by a lithographic apparatus used in the device manufacturing process. In an embodiment, the first distribution, the second distribution and/or the distribution of the parameter of interest comprises a spatial substrate fingerprint. In an embodiment, the device manufacturing process comprises a lithographic process and/or a semiconductor manufacturing process. In an embodiment, the function comprises one or more selected from: an arithmetic addition, a convolution and/or a neural network.

In an embodiment, there is provided a method comprising: obtaining an alignment data distribution across at least part of a substrate processed using a patterning process, based on measured alignment data; and combining, by a hardware computer, the alignment data distribution with an alignment fingerprint attributable to a processing parameter other than measured alignment to obtain an estimate of alignment data for the substrate.

In an embodiment, the alignment fingerprint comprises a contribution of a substrate height or unflatness of the substrate to alignment. In an embodiment, the alignment fingerprint comprises a contribution of a process effect, due to a part of the patterning process other than a lithography pattern transfer, of the substrate to alignment. In an embodiment, the alignment fingerprint comprises a contribution of heating of the substrate to alignment. In an embodiment, the alignment fingerprint is specific to the patterning process but not specific to any particular substrate processed using the patterning process. In an embodiment, the alignment fingerprint is specific to a particular substrate processed using the patterning process but not generic to other substrates processed using the patterning process. In an embodiment, the alignment fingerprint is derived from a measurement of the processing parameter. In an embodiment, the alignment fingerprint comprises a spatial substrate fingerprint. In an embodiment, the method further comprises using the estimate to perform any one or more selected from: predict a defect for the substrate, control the patterning process, monitor the patterning process, design an aspect of the patterning process, and/or calibrate a mathematical model.

Input contributors for computational metrology (CM) of overlay may be measurements collected by exposure sensors of a scanner and inspection tools. For instance, they may include level sensor and alignment sensor measurements, stage dynamic servo logging, overlay and other offline metrology measurements.

If we take alignment input as an example contributor, a high-order alignment model, e.g. based on a 3rd order polynomial, is used to calculate model content from alignment measurements. Such model content may be dominated by a wafer deformation contribution together with alignment mark deformation. But for accurate overlay metrology monitoring, control or defect prediction, only the wafer deformation contribution is a true signal. Alignment mark deformation is not relevant and is a source of error (or 'noise') that should be excluded. The consequence of including such incorrect model content is inconsistent performance of computational metrology (CM). For wafers suffering only from minor alignment mark deformation, alignment input with a high-order model can improve the metrology accuracy due to higher signal-to-noise ratio. For wafers suffering from severe alignment mark deformation, this input can degrade metrology accuracy due to low signal-to-noise ratio. The error (or 'noise') is proportional to the order of the model being used. Typically, it occurs at locations, e.g. at wafer edges, where alignment marks deform the most due to process-induced effects. Such limitations leads to a lower-order model being chosen to limit the amplitude of the 'noise', but then performance of CM is limited because the true wafer deformation signal, which is only captured by the high-order model, is missing from the input.

Note that these limitations generally exist for other input contributors, e.g. level sensor measured wafer height map, scanner dynamics, offline metrology measured etching induced overlay, bottom grating asymmetry measurement, CD measurement, etc.

When including measurements from scanners or offline metrology as input contributors to CM, the orthogonality between the contributors is a useful assumption. With this assumption, the contributors can be added and correlated without cross talk with the parameters of interest, e.g. patterning process parameters such as after-develop overlay, after-etch overlay, or SEM-measured CD or overlay. However, these contributors may still interfere with each other, particularly at specific spatial frequency conditions.

Depending on the parameters of interest, these contributors can also correlate with the parameters of interest at different conditions.

In a frequency distribution of multiple input contributors for CM, at a high (>100 Hz) frequency range, scanner metrology input (e.g. level sensors that measure wafer height map) may predict overlay content with minor crosstalk from other contributors (e.g. scanner dynamics servo error).

However, at a low (<100 Hz) frequency range, contributors share common frequency windows. These contributors include for example, wafer alignment model content, monitor wafer model content, level sensor measurement, dynamic servo data. This implies that such model content could interfere with each other. But also it indicates that these contributors could correlate with a specific part of overlay content for a particular frequency condition, here called a frequency window. For the signal outside of these frequency windows, unwanted contributions may become part of 'noise' and may decrease the accuracy of the CM. Therefore, it would be advantageous to exclude such 'noise' from the input contributors of CM, via for instance frequency low/high/band pass filters, to increase the signal-to-noise ratio. Embodiments described below provide a methodology for CM to exclude such "noise".

Such functionality is also useful to calibrate the outcome of CM for different parameters of interest for generalized data usage of other applications. For instance, between optically-measured overlay and SEM-measured device feature dependent overlay, targets respond differently to patterning processing due to different dimensions and design. Such functionality is useful to exclude the un-correlated overlay content between optically-measured contributors and the response of features of actual devices, from a defect prediction point of view.

In an embodiment, a model or NCE (non-correctable error) model may act as a frequency low/high pass filter, and a set of specific model parameters can act as a frequency band pass filter. This means as long as pairs of specific model parameters deduced from any of the two input data (i.e. contributors or any patterning process parameters) show correlation within each pair, weights between the two input data, herein called calibration factors, can be determined accordingly.

In an embodiment, a methodology is provided to deduce the calibration factors for the correlating model parameters between any of the two input contributors or parameters of interest. To aid understanding, we describe the methodology in terms of predicting one domain from another other domain. The input contributor used for a prediction are defined as Domain A. The parameter of interest is defined as Domain B.

The input contributor Domain A may be processing variables as described with reference to FIG. 7, such as alignment variables. The parameter of interest Domain B may be a patterning process parameter as described with reference to FIGS. 7 and 8, such as overlay.

Figure 22:
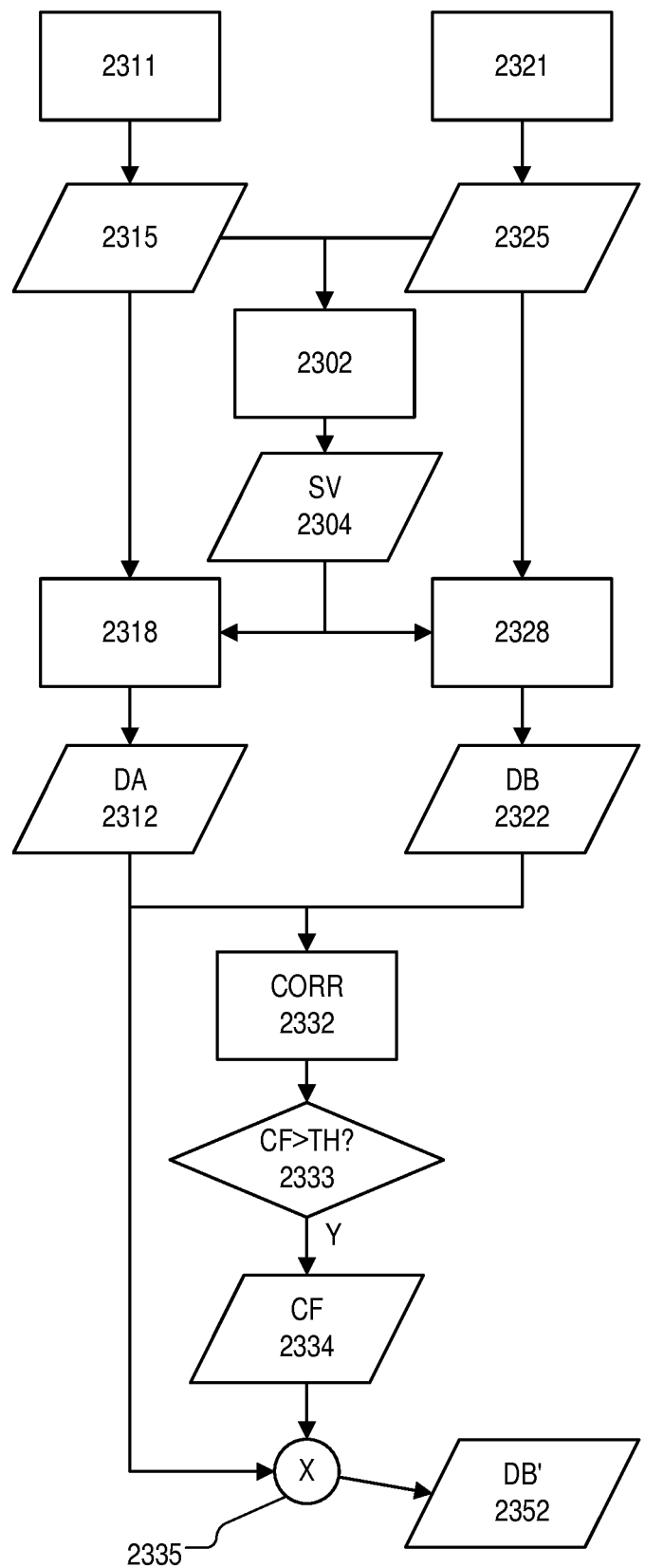
FIG. 22 schematically shows a flow for a method, according to an embodiment.

FIG. 22 schematically shows a flow for a method, according to an embodiment.

The parameter of interest distribution 2322 (DB), such as an overlay distribution, is determined. This is the first distribution 2322 of a first parameter 2321 associated with an error or residual in performing a device manufacturing process. To determine the distribution 2322, a first distribution of values 2325 of the first parameter 2321 is obtained. The first distribution of values 2325 is then modeled 2328 to obtain the first modeled distribution of values 2322 (DB).

Thus, in this embodiment, the determined first distribution (parameter of interest) comprises a first modeled distribution of values 2322 (DB).

An input contributor distribution 2312 (DA), such as an alignment distribution, is determined. This is the second distribution 2312 of a first parameter 2311 associated with an error or residual in performing a device manufacturing process. To determine the distribution, a second distribution of values 2315 of the first parameter 2311 is obtained. The first distribution of values 2315 is then modeled 2318 to obtain the second modeled distribution of values 2312 (DA). Thus, in this embodiment, the determined second distribution (input contributor) comprises a first modeled distribution of values 2312 (DA).

For the modelling 2328, 2318, a scale of variation 2304 (SV) (e.g. frequency<100 Hz) is determined 2302 for which a correlation between values of the first distribution 2325 and values of the second distribution 2315 exceeds a threshold. The first and second distribution of values are then modeled 2328, 2318 in dependence of the determined scale of variation 2304 (SV) to obtain the first modeled distribution and second modeled distribution of values 2322 (DB), 2312 (DA).

Next, a distribution of the parameter of interest (which, in this embodiment, is the first parameter, e.g. overlay) is determined, by a hardware computer, using a function operating on the first and second distributions 2322 (DB), 2312 (DA). The function in this embodiment comprises a correlation 2332 (CORR) operating on the first and second distributions 2322, 2312.

Determination of the distribution of the parameter of interest 2352 (DB') is based on scaling 2335 the modeled second distribution 2312 (DA) using a scaling factor 2334 (Calibration Factor CF) obtained by mapping 2332 (CORR) between the first model coefficient associated with the first modeled distribution of values 2322 (DB) and the second model coefficient associated with the second modeled distribution of values 2312 (DA). The scaling factor 2334 (Calibration Factor, CF) may be used to exclude a modeled component from the step of determining the distribution of the parameter of interest 2352. For example, if the scaling factor is below or equal to a threshold 2333, then a model coefficient associated with the first modeled distribution of values 2312 (DA) may be excluded from the scaling.

Figure 23:
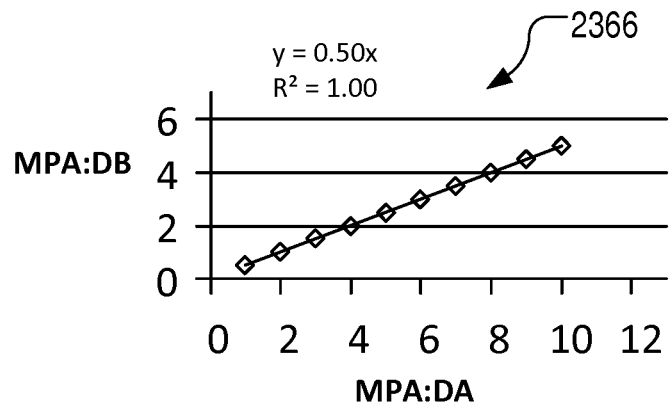
FIGS. 23 and 24 schematically show adjusting calibration factors to predict distribution.
Figure 24:
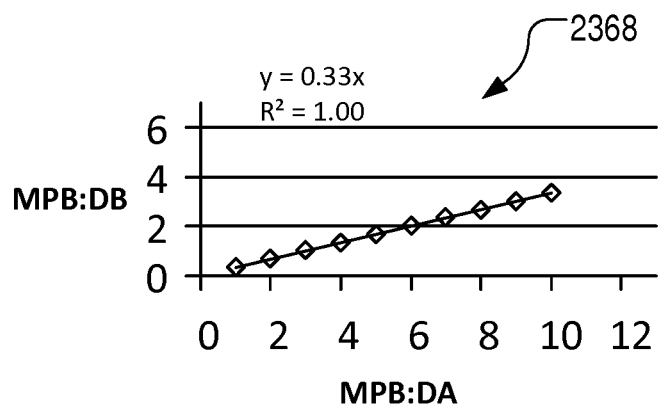

FIGS. 23 and 24 schematically shows adjusting calibration factors to predict a distribution of a parameter of interest. A correlation between two domains Domain A (alignment) and Domain B (overlay) may be defined. For two domains which can be described by the same set of parameters, e.g. linear, high-order or combined polynomial coefficients, a set of scaling factors or calibration factors can be defined for the correlating coefficients, by dividing a coefficient of Domain B with a coefficient of Domain A using simple linear algebra.

In the case of one domain receiving correction from the other domain, there is a high probability of good correlation existing between these two domains, with a large number of data points given. For example, a scanner corrects a substrate grid (deformation) using information from an alignment measurement. There is an assumption that there is a strong correlation between alignment and overlay for parameters up to $5^{th}$ order polynomial components used within an alignment model. In other words, Domain B (overlay) receives correction from Domain A (alignment) and there is a strong correlation between Domain A and Domain B.

FIGS. 23 and 24 illustrate predicting one domain DB' by projecting the other domain DA with calibration factors for all model parameters. First, all model parameters are calculated for each domain. Two model parameters MPA and MPB each have eight of their points P1 to P8 tabulated.

With respect to FIG. 23, table 2362 shows values of MPA for Domain A (DA) and Domain B (DB). Graph 2366 is a plot of MPA for Domain A versus MPA for Domain B, including the data points in table 2362. Correlation is determined by fitting a linear model (y=a*x) to determine a calibration factor between the sets of parameters for the model parameter MPA, here 0.50 (y=0.5*x).

With respect to FIG. 24, table 2364 shows values of MPB for Domain A (DA) and Domain B (DB). Graph 2368 is a plot of MPB for Domain A versus MPB for Domain B, including the data points in table 2364. Correlation is determined by fitting a linear model (y=a*x) to determine a calibration factor between the sets of parameters for the model parameter MPB, here 0.33 (y=0.33*x).

The calibration factors are used to predict the model parameters of the parameter of interest DB' (e.g. overlay) from the Domain A parameter values, as shown in tables 2370 in FIGS. 23 and 2372 in FIG. 24, for model parameters MPA and MPB respectively.

Even though there may be a perfect correlation between Domain A and Domain B, it does not guarantee that the weights between two set of parameters are 1. For instance, a wafer-to-wafer translation value of an alignment measurement can be two times bigger than that of a translation observed in the context of the overlay error. In this case, even though there are perfect correlations between two set of parameters, scales are not always 1. In other words, if there are strong correlations between two set of parameters, Domain B can be more precisely predicted by adjusting the calibration factor for the parameters which are to be multiplied with those of Domain A. Note that to have a good quality of prediction, the input sampling of Domain A and Domain B preferably is to be constrained to avoid cross-talk between model parameters due to asymmetric layout of input sampling.

If alignment and overlay correlate with scale 1, it means that overlay correction is based on information representative of real wafer deformation. in this case alignment information which is true and real. In this case, the calibration factors from two sets of parameters are all 1 which is same as the observed scale.

If alignment measurement suffers from alignment mark asymmetry or metrology measurement uncertainty, it means that for the alignment, there is false information coming from deformed alignment marks. If the alignment model is calculated with this false information, such errors induced from mark deformation will be dialed into overlay prediction. In an embodiment, by only looking at those correlated model parameters between alignment and overlay for which correlation is good enough, a calibration factor between alignment and overlay can be calculated per parameter. By applying these selected calibration factors to the alignment data, overlay prediction induced by false alignment mark deformation can be calibrated (filtered) for all parameters.

Due to the deformation of metrology overlay targets, usually there is an offset between metrology target overlay and device overlay. This offset budget can be separated into 'batch' and 'wafer-to-wafer' (W2W) categories. While 'batch' offset is calculated based on real device overlay measurement, in case of W2W, if there is a stable correlation between metrology and device overlays, calibration factors can be defined and used to calibrate/predict this offset as W2W in the way described above. This can be understood by replacing Domain A with 'metrology overlay' and Domain B with 'device overlay'.

Calibration/prediction of overlay may be extended using context information; using the concept of context-based grouping. For the case where production lots are split into a few groups and each group is processed separately with different process tools, the fingerprint of each group (or degree of wafer/mark deformation/asymmetry) would be different from each other. In this case, the total dataset can be grouped into sub-datasets and correlation/calibration factor can be calculated again per group. The calibration/prediction calculated would be applied to each group separately leading better calibration/prediction results.

Figure 25:
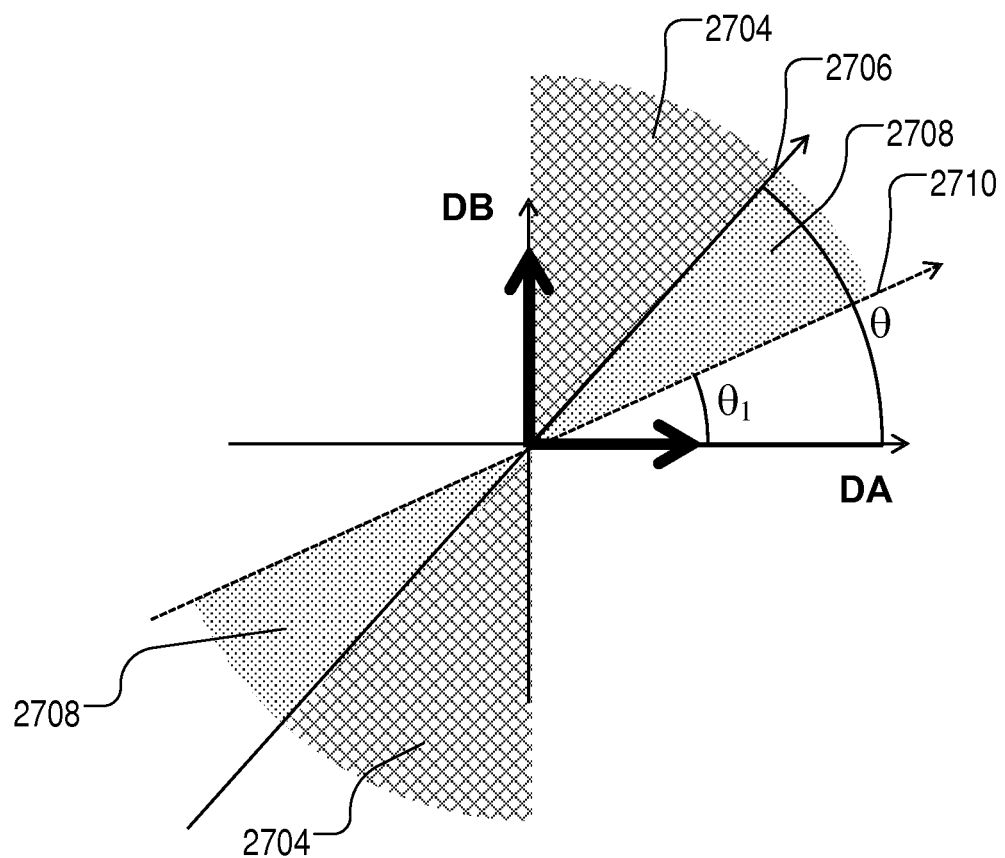
FIG. 25 schematically shows the determination of the possibility of correct prediction.

FIG. 25 schematically shows the determination of the possibility of correct prediction. The vertical axis DB is Domain B model parameter value and the horizontal axis DA is Domain A model parameter value.

While calculating the calibration factor for each dataset, a possibility of correct prediction can be defined using the framework as described below, with an assumption that data points are distributed evenly.

(1) If a certain data point is in the region 2704 between the slope of the correlation factor line 2706 and axis of Domain B (DB), the predicted value is always bigger than zero and less than the value of Domain B. Then, a certain portion of Domain B can be projected/predicted correctly.

(2) If a data point is exactly on the slope 2706, projection/prediction are perfect.

(3) If a point is in the region 2708 between slope 2706 and half of the slope 2710, prediction is possible. But the prediction value is larger than the value of Domain B. Calibration to this data point changes the sign of the calibrated result.

(4) For data points located in other regions than these three (2704, 2706 and 2708) calibration of Domain B using the method described herein makes the result worse than original value.

With this, an area of correct prediction can be defined below with the angle θ between the axis Domain A axis and the slope 2706. As the slope becomes closer to the x-axis, the possibility of correct projection/prediction becomes its maximum value of 50%, at the angle of $\theta_1$. But the benefit of using this projection becomes closer to zero as the calibration factor is close to zero. Therefore, finding a specific frequency window or conditions with good correlation between the two domains is very important (e.g. using separation of the total dataset into subsets). This will make a distribution of data points which is concentrated on the slope which would be within the three regions (2704, 2706 and 2708) explained above. Also, a trade-off between calibration factor and correction possibility is possible. Calibration factors which are defined during a correlating (setup) phase may be adjusted to be smaller than their originally defined values. This will increase the number of data points correctly predicted/calibrated, but the benefit will be smaller than it would have been.

The calibration factor $(F_{cal})$=tan(θ). The prediction possibility=area of arc divided by that of circle with $$\text{infinite radius} = \frac{1}{2} - \frac{1}{\pi}\left(\tan^{-1}\frac{F_{cal}}{2}\right).$$

Embodiments provide a generalized methodology to determine calibration factors between filtered frequencies, here called correlating model parameters, from any of the domains and to project one domain to the other domain for metrology prediction/calibration purposes, with the capability to correct domain projection with respect to the value of a calibration factor.

Embodiments are capable of calibrating overlay prediction from wafer deformation/alignment mark asymmetry with domain projection, across the multiple wavelengths (colors) in sensors, multi-reference measurements in time (wafers) and multiple spatial frequencies within the measurement (locations).

Embodiments separate the data into subsets increasing correlation between two domains and prediction accuracy.

Embodiments are capable of de-selecting the content from un-correlating model parameters of both domains, to suppress the noise of prediction induced from input contributors.

Embodiments are capable of providing indications of wafers needing real production measurement. For example, if measured scanner metrology from a new Domain A does not fall into the previously observed population any more, actions can be triggered to measure the actual wafer in Domain B to update the previously defined population.

Embodiments calibrate out a portion of false content measured by scanner or any overlay metrology from prediction, i.e., alignment mark asymmetry, mis-corrected wafer deformation, or any un-correlating content within the input contributors.

Embodiments can be used for any of the input data and parameters of interest, i.e. offline wafer shape measurement or SEM measurement.

For wafer-to-wafer variation feedforward, embodiments are able to predict wafer-to-wafer corrections for a subsequent layer from a previous layer's alignment when there is a correlation between these two. For example, for a layer that has had Litho-Etch-Litho-Etch processing.

Figure 26:
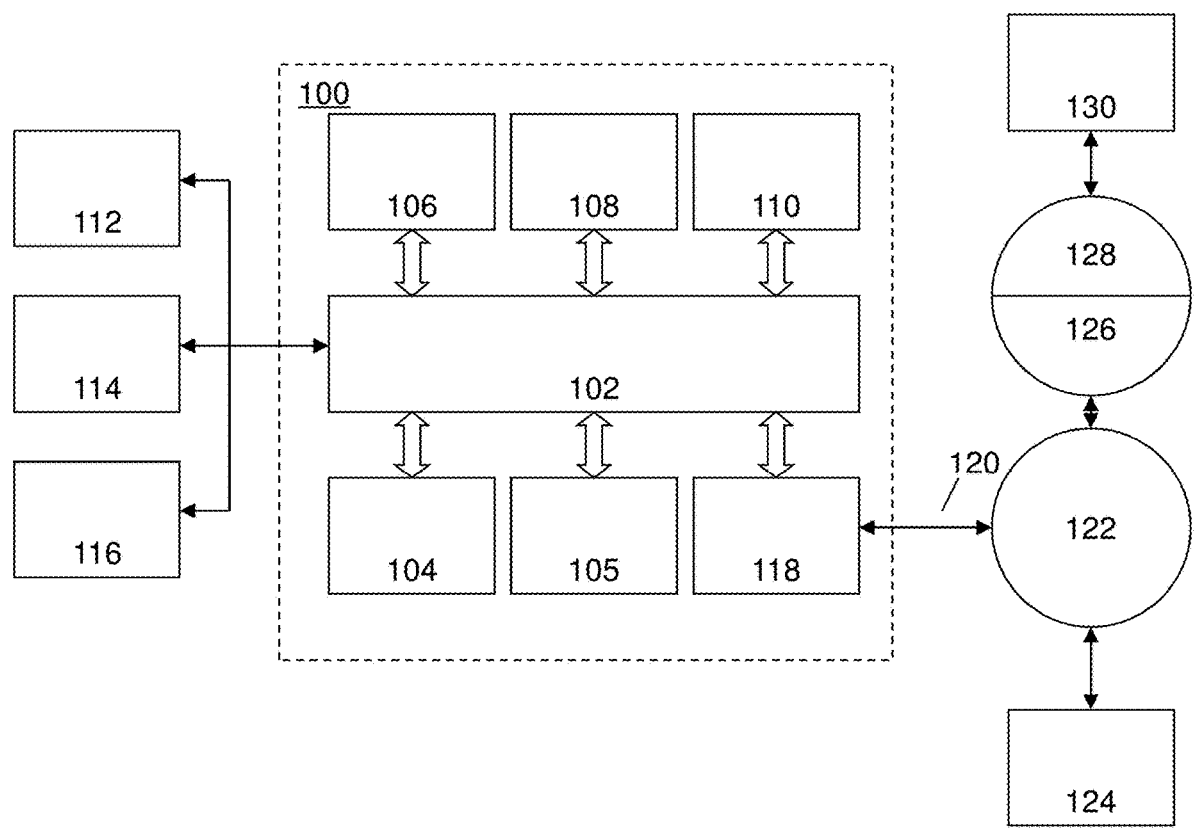
FIG. 26 is a block diagram of an example computer system.

FIG. 26 is a block diagram that illustrates a computer system 100 which can assist in implementing methods and flows disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of the process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also preferably includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented.

In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide for the illumination optimization of the embodiment, for example. The received code may be executed by processor 104 as it is received, and/or stored in storage device 110, or other non-volatile storage for later execution. In this manner, computer system 100 may obtain application code in the form of a carrier wave.

Further embodiments are disclosed in the list of numbered embodiments below:

1. A method, comprising:
determining a first distribution of a first parameter associated with an error or residual in performing a device manufacturing process;
determining a second distribution of a second parameter associated with an error or residual in performing the device manufacturing process; and
determining, by a hardware computer, a distribution of a parameter of interest associated with the device manufacturing process using a function operating on the first and second distributions.

2. The method of embodiment 1, wherein the first parameter, the second parameter and the parameter of interest are the same.

3. The method of embodiment 1, wherein the first distribution is specific to the device manufacturing process but not specific to any particular substrate processed using the device manufacturing process.

4. The method of embodiment 1, wherein the second distribution is specific to a particular substrate processed using the device manufacturing process but not generic to other substrates processed using the device manufacturing process.

5. The method of embodiment 1, wherein the first distribution and/or second distribution comprises one or more selected from: a contribution of a servo error to the respective first and/or second parameter, a contribution of alignment model residual to the respective first and/or second parameter, a contribution of a projection system aberration or image plane deviation to the respective first and/or second parameter, a contribution of a projection system model residual to the respective first and/or second parameter, and/or a contribution of a substrate surface height to the respective first and/or second parameter.

6. The method of embodiment 1, wherein determining the first distribution further comprises obtaining measured data of the first parameter and removing therefrom a contribution of a particular device of the device manufacturing process to the first parameter.

7. The method of embodiment 6, wherein the contribution of the particular device comprises one or more selected from: a contribution of a servo error, a contribution of alignment model residual, a contribution of a projection system aberration or image plane deviation, a contribution of a projection system model residual, and/or a contribution of a substrate surface height.

8. The method of embodiment 6, wherein the measured first parameter data comprises first parameter data measured from a monitor substrate.

9. The method of embodiment 1, wherein the first distribution, the second distribution and/or the distribution of the parameter of interest comprises a spatial substrate fingerprint.

10. The method of embodiment 1, further comprising using the distribution of the parameter of interest to perform any one or more selected from: predict a defect for a substrate, control the device manufacturing process, monitor the device manufacturing process, design an aspect of the device manufacturing process, and/or calibrate a mathematical model.

11. The method of embodiment 1, wherein the first parameter, the second parameter and/or the parameter of interest is one or more selected from: overlay, CD, focus, dose, and/or edge position.

12. The method of embodiment 1, wherein the device manufacturing process comprises a lithographic process and/or a semiconductor manufacturing process.

13. The method of embodiment 1, wherein the function comprises one or more selected from: an arithmetic addition, a convolution and/or a neural network.

14. The method of embodiment 1, wherein the first parameter and/or the second parameter is different than the parameter of interest and further comprising converting the first parameter and/or the second parameter to the parameter of interest.

15. The method of embodiment 1, further comprising determining the first distribution and/or the second distribution using data provided by a lithographic apparatus and/or etching apparatus used in the device manufacturing process.

16. The method of embodiment 1, wherein the function comprises a correlation operating on the first and second distributions.

17. The method of embodiment 16, wherein:
the determined first distribution comprises a first modeled distribution of values; and
the determined second distribution comprises a second modeled distribution of values; and
the parameter of interest is the first parameter, and the method comprises:
obtaining a first distribution of values of the first parameter;
obtaining a second distribution of values of the second parameter;
modeling the first and second distribution of values to obtain the first modeled and second modeled distribution of values; and
determining the distribution of the parameter of interest based on scaling the modeled second distribution using a scaling factor obtained by mapping between a first model coefficient associated with the first modeled distribution of values and a second model coefficient associated with the second modeled distribution of values.

18. The method of embodiment 17, comprising:

determining a scale of variation for which a correlation between values of the first distribution and values of the second distribution exceeds a threshold; and modeling the first and second distribution of values in dependence of the determined scale of variation to obtain the first modeled and second modeled distribution of values.

19. The method of embodiment 17, comprising using the scaling factor to exclude a modeled component from the step of determining the distribution of the parameter of interest.

20. A method comprising:

obtaining an underlying contribution of a lithographic apparatus to overlay as part of a patterning process; and combining, by a hardware computer, the underlying contribution with a further contribution to overlay of a substrate to obtain an estimate of overlay for the substrate.

21. The method of embodiment 20, wherein the further contribution comprises a contribution of a substrate surface height of the substrate to overlay.

22. The method of embodiment 20, wherein the further contribution comprises a contribution of a substrate servo error of the substrate to overlay.

23. The method of embodiment 20, wherein the further contribution comprises a contribution of an alignment and/or projection system model residual.

24. The method of embodiment 20, further comprising combining, with the underlying contribution and the contribution of the substrate surface height, a contribution of an etch process to overlay of the substrate.

25. The method of embodiment 24, wherein the etch process contribution is specific to the patterning process but not specific to any particular substrate processed using the patterning process.

26. The method of embodiment 20, wherein the underlying contribution is specific to a particular patterning process but not specific to any particular substrate processed using the patterning process.

27. The method of embodiment 20, wherein obtaining the underlying contribution further comprises obtaining measured overlay data and removing therefrom a contribution of a particular component of the lithographic apparatus to overlay.

28. The method of embodiment 27, wherein the contribution of the particular component comprises one or more selected from: a contribution of a servo error, a contribution of alignment model residual, a contribution of a projection system aberration, a contribution of a projection system model residual, and/or a contribution of a substrate surface height.

29. The method of embodiment 27, wherein the measured overlay data comprises overlay data measured from a monitor substrate.

30. The method of embodiment 20, wherein the contribution comprises a spatial substrate fingerprint.

31. The method of embodiment 20, further comprising using the estimate to perform any one or more selected from: predict a defect for the substrate, control the patterning process, monitor the patterning process, design an aspect of the patterning process, and/or calibrate a mathematical model.

32. A method, comprising:

determining a first distribution of measured alignment data in performing a device manufacturing process;

determining a second distribution of alignment data derived from a processing parameter in the device manufacturing process; and determining, by a hardware computer system, a distribution of alignment data associated with the device manufacturing process as a function of the first and second distributions.

33. The method of embodiment 32, wherein the processing parameter comprises one or more selected from: a substrate height or unflatness, a process effect, optical element heating, optical aberration, and/or patterning device writing error.

34. The method of embodiment 32, wherein the second distribution is derived from a plurality of processing parameters of the device manufacturing process.

35. The method of embodiment 34, wherein the processing parameters comprise a substrate height or unflatness, a process effect, and optical element heating.

36. The method of embodiment 32, wherein the second distribution is specific to the device manufacturing process but not specific to any particular substrate processed using the device manufacturing process.

37. The method of embodiment 32, wherein the second distribution is specific to a particular substrate processed using the device manufacturing process but not generic to other substrates processed using the device manufacturing process.

38. The method of embodiment 32, wherein the second distribution is derived from a measurement of the processing parameter.

39. The method of embodiment 32, further comprising using the distribution of alignment data to perform any one or more selected from: predict a defect for a substrate, control the device manufacturing process, monitor the device manufacturing process, design an aspect of the device manufacturing process, and/or calibrate a mathematical model.

40. The method of embodiment 32, further comprising altering a sampling of metrology data based on the distribution of alignment data.

41. The method of embodiment 32, further comprising using a higher order alignment model with the distribution of alignment data compared to that used with only the measured alignment data.

42. The method of embodiment 32, further comprising determining the first distribution and/or the second distribution using data provided by a lithographic apparatus used in the device manufacturing process.

43. The method of embodiment 32, wherein the first distribution, the second distribution and/or the distribution of the parameter of interest comprises a spatial substrate fingerprint.

44. The method of embodiment 32, wherein the device manufacturing process comprises a lithographic process and/or a semiconductor manufacturing process.

45. The method of embodiment 32, wherein the function comprises one or more selected from: an arithmetic addition, a convolution and/or a neural network.

46. A method comprising:

obtaining an alignment data distribution across at least part of a substrate processed using a patterning process, based on measured alignment data; and combining, by a hardware computer, the alignment data distribution with an alignment fingerprint attributable to a processing parameter other than measured alignment to obtain an estimate of alignment data for the substrate.

47. The method of embodiment 46, wherein the alignment fingerprint comprises a contribution of a substrate height or unflatness of the substrate to alignment.
48. The method of embodiment 46, wherein the alignment fingerprint comprises a contribution of a process effect, due to a part of the patterning process other than a lithography pattern transfer, of the substrate to alignment.
49. The method of embodiment 46, wherein the alignment fingerprint comprises a contribution of heating of the substrate to alignment.
50. The method of embodiment 46, wherein the alignment fingerprint is specific to the patterning process but not specific to any particular substrate processed using the patterning process.
51. The method of embodiment 46, wherein the alignment fingerprint is specific to a particular substrate processed using the patterning process but not generic to other substrates processed using the patterning process.
52. The method of embodiment 46, wherein the alignment fingerprint is derived from a measurement of the processing parameter.
53. The method of embodiment 46, wherein the alignment fingerprint comprises a spatial substrate fingerprint.
54. The method of embodiment 46, further comprising using the estimate to perform any one or more selected from: predict a defect for the substrate, control the patterning process, monitor the patterning process, design an aspect of the patterning process, and/or calibrate a mathematical model.
55. A computer program product comprising a non-transitory computer readable medium having instructions recorded thereon, the instructions when executed by a computer implementing the method of any of embodiments 1-54.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g. carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims.

Modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, change in order or omitted, certain features may be utilized independently, and embodiments or features of embodiments may be combined, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an" element or "a" element includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every.

To the extent certain U.S. patents, U.S. patent applications, or other materials (e.g., articles) have been incorporated by reference, the text of such U.S. patents, U.S. patent applications, and other materials is only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference herein.

While specific embodiments of the disclosure have been described above, it will be appreciated that the embodiments may be practiced otherwise than as described.

What is claimed is:

1. A method for computational metrology, the method comprising:
    obtaining a first distribution of a first parameter associated with a residual or error associated with a lithographic apparatus used in performing a device manufacturing process;
    obtaining, from a metrology result, a second distribution of a second parameter associated with an error or residual in performing the device manufacturing process; and
    determining, by a hardware computer, a distribution of a parameter of interest associated with the device manufacturing process based on combining the first and second distributions.

2. The method of claim 1, wherein the first parameter, the second parameter and the parameter of interest are the same type of parameter.

3. The method of claim 1, wherein the first distribution is specific to a particular substrate processed using the device manufacturing process but not generic to other substrates processed using the device manufacturing process.

4. The method of claim 1, wherein the first distribution comprises one or more selected from: a contribution of a servo error to the first parameter, a contribution of an alignment model residual to the first parameter, a contribution of a projection system aberration or image plane deviation to the first parameter, a contribution of a projection system model residual to the first parameter, and/or a contribution of a substrate surface height to the first parameter.

5. The method of claim 1, wherein the metrology result comprises focus metrology data and the first distribution comprises a contribution of a substrate surface height to the first parameter.

6. The method of claim 5, wherein the focus metrology data is obtained by relatively sparse sampling of locations on a substrate and the distribution of the parameter of interest comprises a relatively dense spatial distribution of a focus parameter across the substrate.

7. The method of claim 1, wherein the metrology result comprises critical dimension (CD) metrology data and the first distribution comprises a contribution of a substrate surface height to the first parameter.

8. The method of claim 7, wherein the CD metrology data is obtained by relatively sparse sampling of locations on a substrate and the distribution of the parameter of interest comprises a relatively dense spatial distribution of a focus parameter across the substrate.

9. The method of claim 1, wherein the metrology result comprises overlay metrology data.

10. The method of claim 9, wherein the overlay metrology data is obtained by relatively sparse sampling of locations on a substrate and the distribution of the parameter of interest comprises a relatively dense spatial distribution of an overlay parameter across the substrate.

11. The method of claim 1, further comprising using the distribution of the parameter of interest for predicting a hot spot on a substrate.

12. The method of claim 11, wherein the hotspot is predicted based on at least a first parameter of interest being a CD and a second parameter of interest being an overlay parameter.

13. The method of claim 1, further comprising predicting a shape and/or a size of one or more contours of a pattern using the distribution of the parameter of interest.

14. The method of claim 1, wherein the first parameter and/or the second parameter is different than the parameter of interest and further comprising converting the first parameter and/or second parameter to the parameter of interest.

15. The method of claim 1, wherein the first distribution is based on data from the lithographic apparatus and the second distribution is based on data from an inspection and/or metrology apparatus.

16. A computer program product comprising a non-transitory computer readable medium having instructions therein, wherein the instructions, when executed by a computer system, are configured to cause the computer system to at least:
    obtain a first distribution of a first parameter associated with a residual or error associated with a lithographic apparatus used in performing a device manufacturing process;

obtain, from a metrology result, a second distribution of a second parameter associated with an error or residual in performing the device manufacturing process; and determine a distribution of a parameter of interest associated with the device manufacturing process based on combining the first and second distributions.

17. The computer program product of claim 16, wherein the metrology result comprises focus metrology data and the first distribution comprises a contribution of a substrate surface height to the first parameter.

18. The computer program product of claim 16, wherein the metrology result comprises critical dimension metrology data and the first distribution comprises a contribution of a substrate surface height to the first parameter.

19. The computer program product of claim 16, wherein the instructions are further configured to cause the computer system to predict a hot spot on a substrate using the distribution of the parameter of interest.

20. The computer program product of claim 19, wherein the instructions configured to cause the computer system to predict the hotspot are configured to do so using at least two parameters of interest as input: a first parameter of interest being a critical dimension and a second parameter of interest being an overlay parameter.

21. The computer program product of claim 16, wherein the instructions are further configured to cause the computer system to predict a shape and/or a size of one or more contours of a pattern using the distribution of the parameter of interest.

22. The computer program product of claim 16, wherein the first parameter and/or the second parameter are different from the parameter of interest and wherein the instructions are further configured to cause the computer system to convert the first parameter and/or second parameter to the parameter of interest.

* * * * *